United States Patent [19]
Schwartz et al.

[11] Patent Number: 5,557,438
[45] Date of Patent: * Sep. 17, 1996

[54] SCANNING AND TRACKING USING ROTATING POLYGONS

[76] Inventors: Nira Schwartz, 1314 Wellington Pl., Aberdeen, N.J. 07747; Arie Shahar, 14 David Street, Moshav Magshimim 56910, Israel

[*] Notice: The portion of the term of this patent subsequent to Feb. 2, 2010, has been disclaimed.

[21] Appl. No.: 155,889

[22] Filed: Nov. 23, 1993

[51] Int. Cl.$^6$ .................................. G02B 26/08
[52] U.S. Cl. .................. 359/204; 359/205; 359/216; 359/900; 250/234; 347/242; 347/261
[58] Field of Search .................. 359/196–205, 359/216–219, 900, 209–210; 250/234–236, 578.1; 347/256–261, 233, 241–244; 358/296, 299, 302, 474, 490, 491; 356/384–387

[56] References Cited

U.S. PATENT DOCUMENTS

| | | | |
|---|---|---|---|
| 4,753,498 | 6/1988 | Saitoh et al. | 359/216 |
| 5,170,279 | 12/1992 | Schwartz et al. | 359/217 |
| 5,177,632 | 1/1993 | Schwartz et al. | 359/216 |
| 5,184,246 | 2/1993 | Schwartz et al. | 359/218 |

OTHER PUBLICATIONS

Donald & Uhey, RCA Technical Notes #865 May 5, 1970.

Primary Examiner—James Phan
Attorney, Agent, or Firm—David Pressman

[57] ABSTRACT

A system for scanning or tracking, which includes a polygon rotatable about a rotational axis. The system further includes a fixed radiation source directing radiation at the polygon along a path whose extension would intersect the rotational axis of the polygon. The intersection of the extended path with the rotational axis of the polygon constituting an original imaginary intersection point. Finally, the system includes a scanned region onto which the radiation is projected, the projection being characterized in that radiation emanating from the radiation source is reflected from the polygon and is made to propagate, prior to impinging on the scanned region, along a path which includes at least one additional path segment with the additional path segment passing through or directed at an additional intersection point, the additional intersection point being a real or imaginary image of the original intersection point.

72 Claims, 26 Drawing Sheets

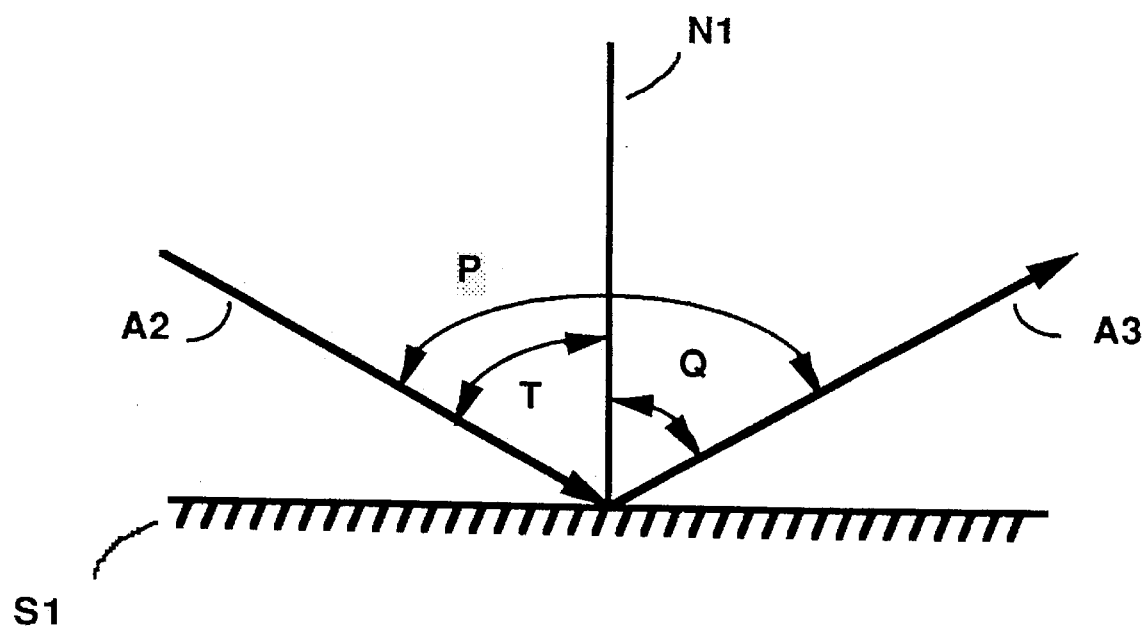
FIG 1 - Prior Art

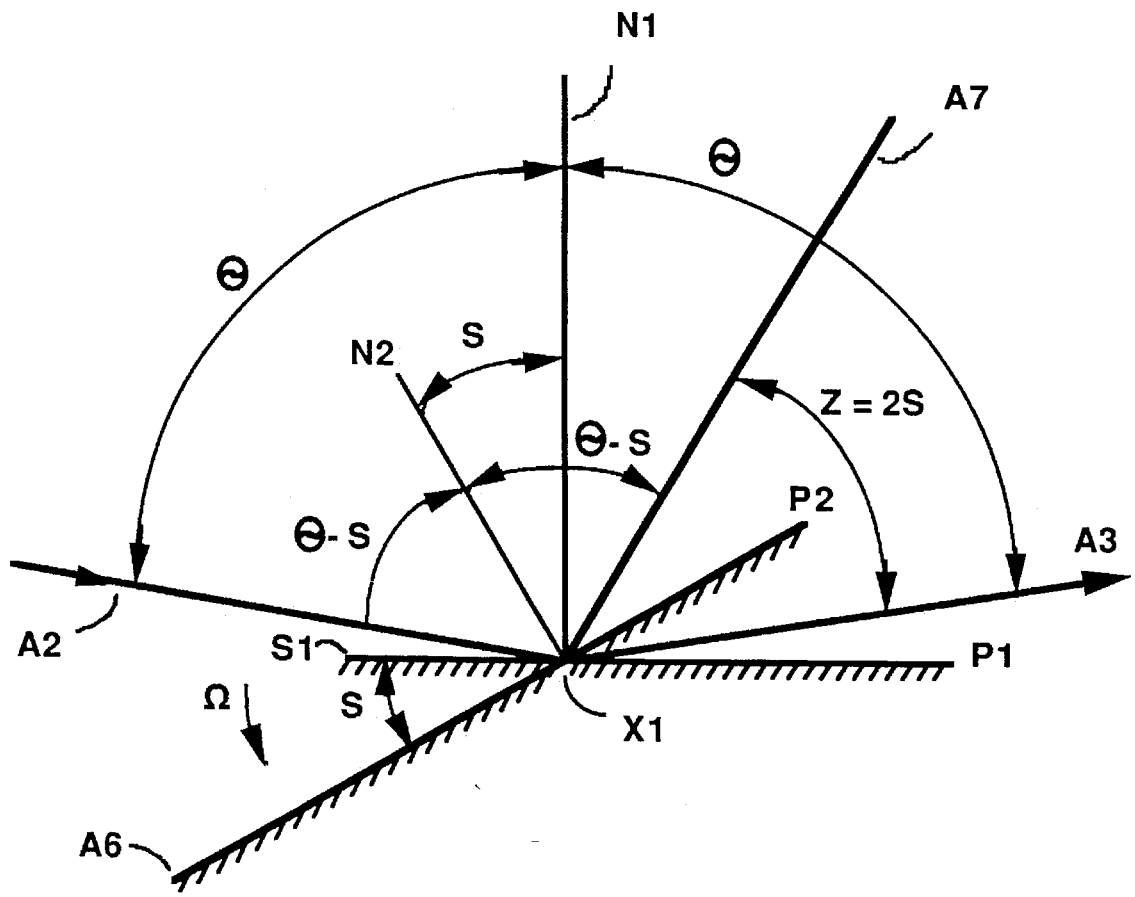
FIG 2 - Prior Art

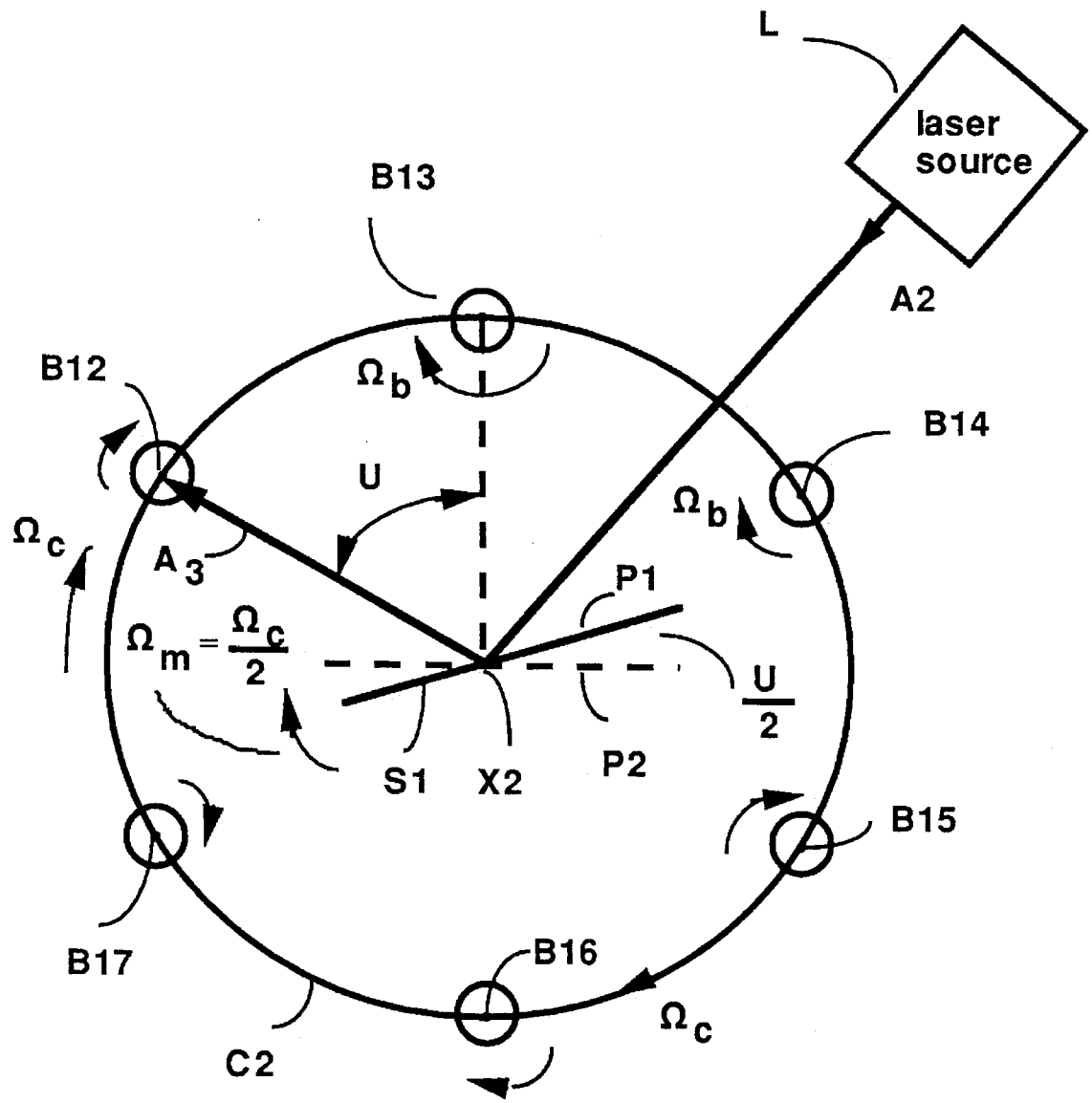
FIG 3 - Prior Art

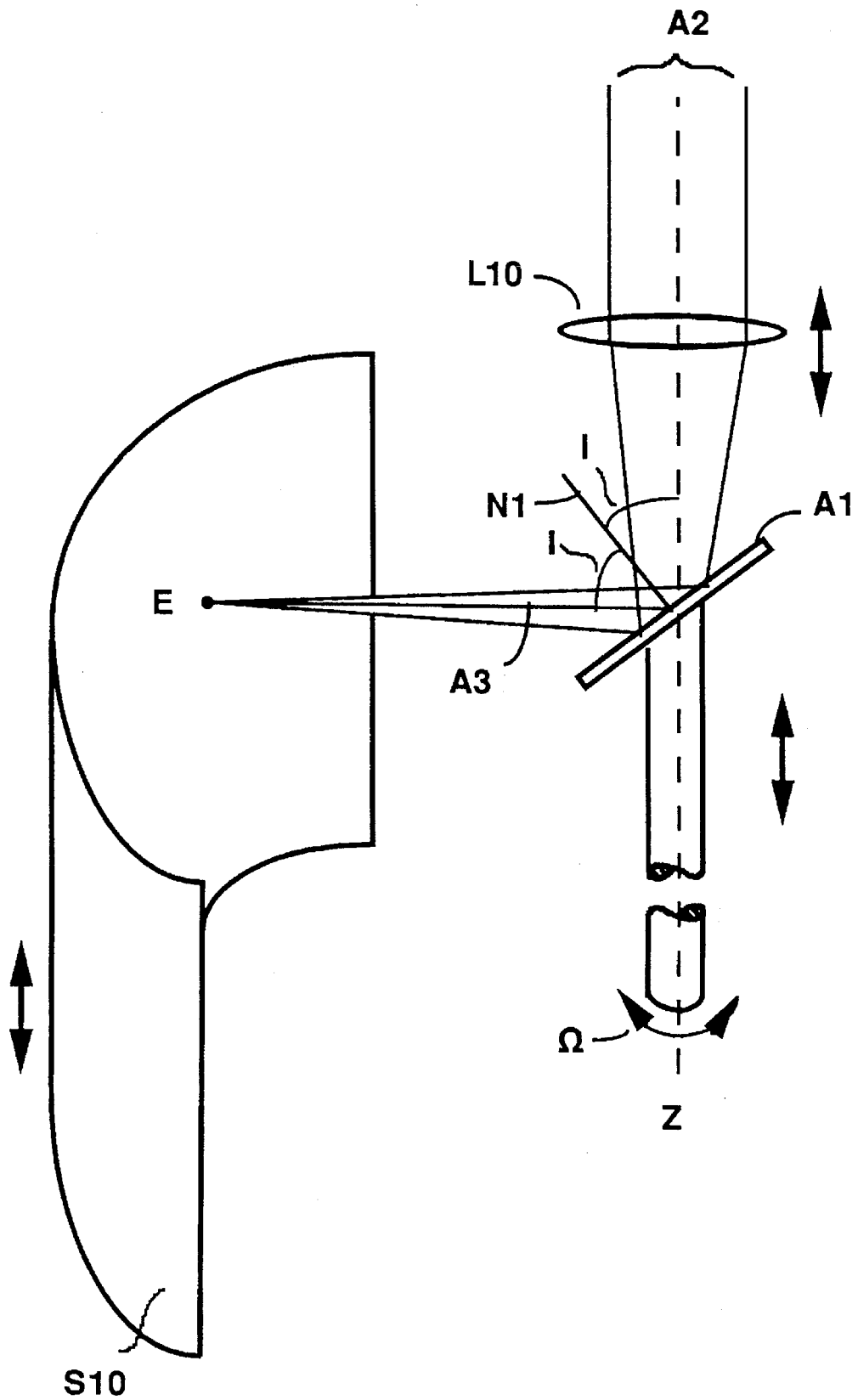
FIG 4 - Prior Art

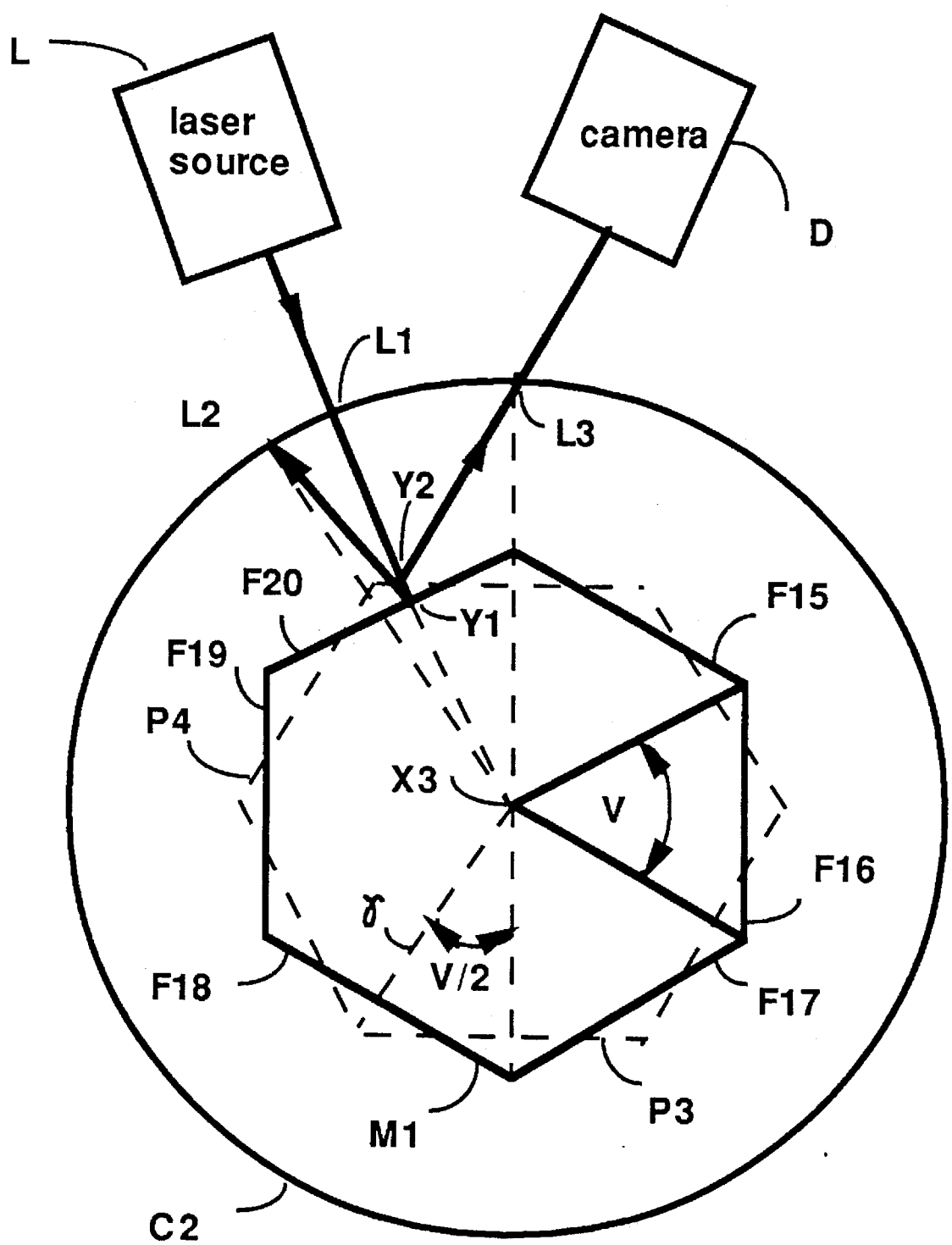
FIG 5 - Prior Art

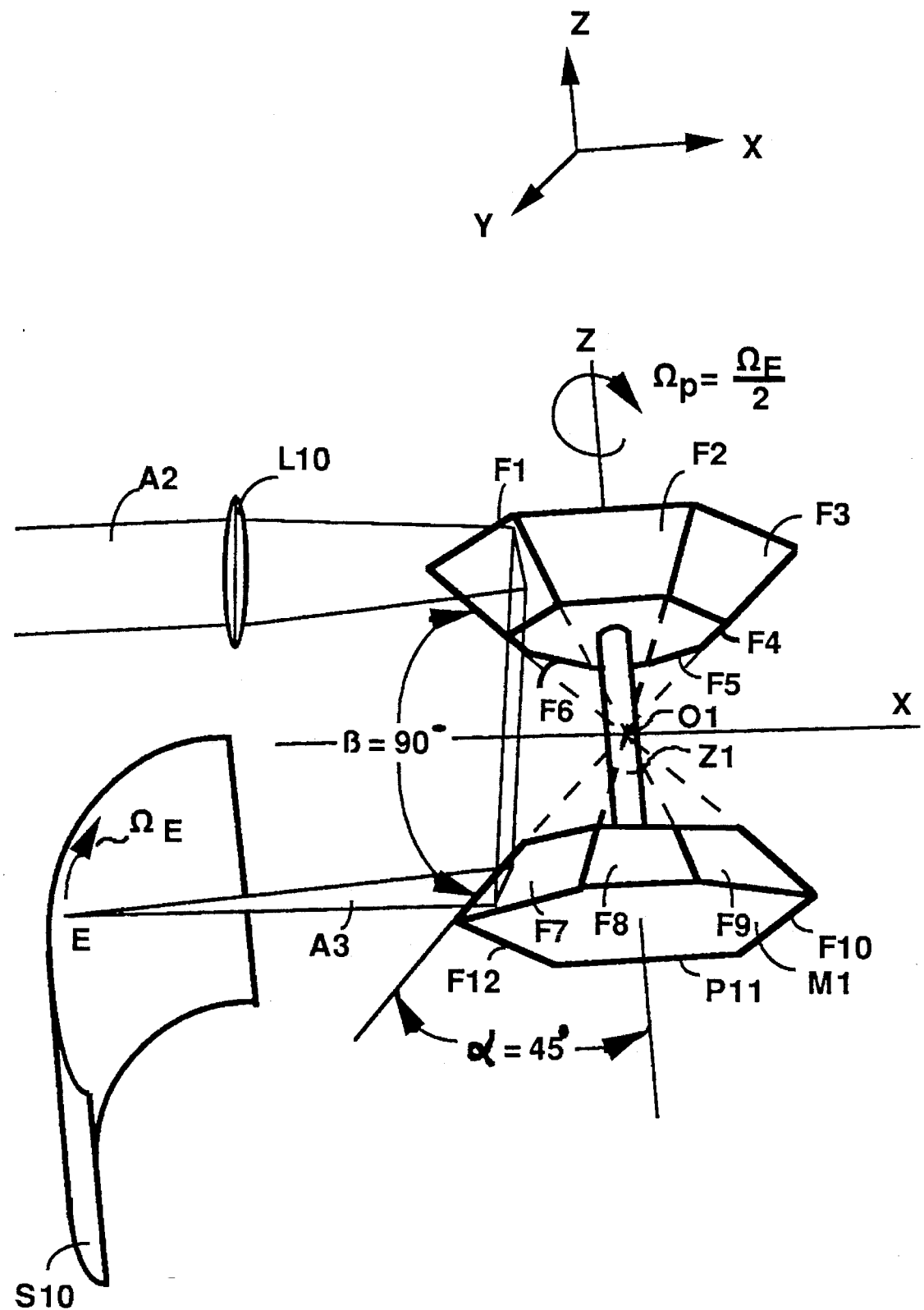
FIG 6 - Prior Art

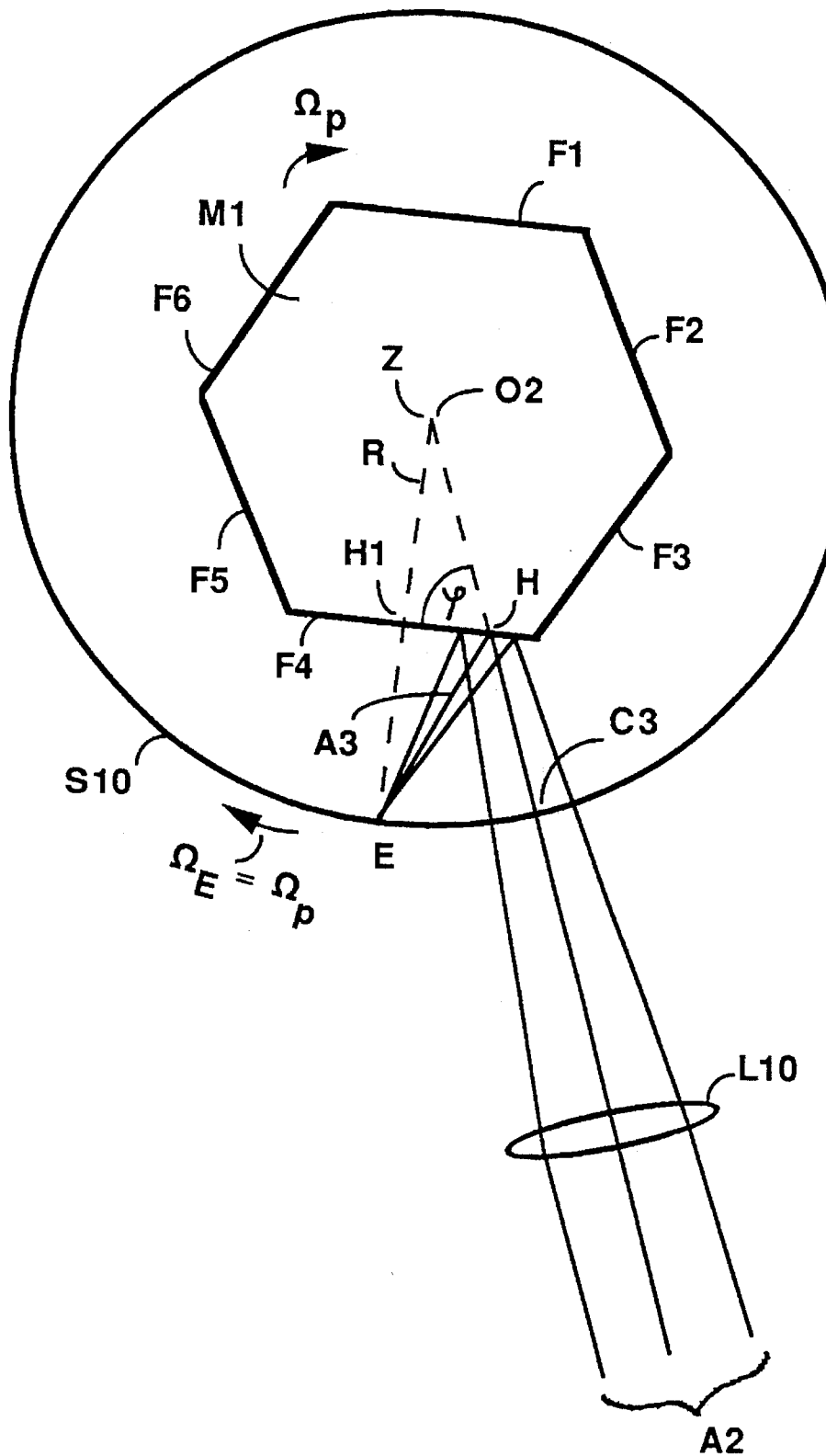
FIG 7 - Prior Art

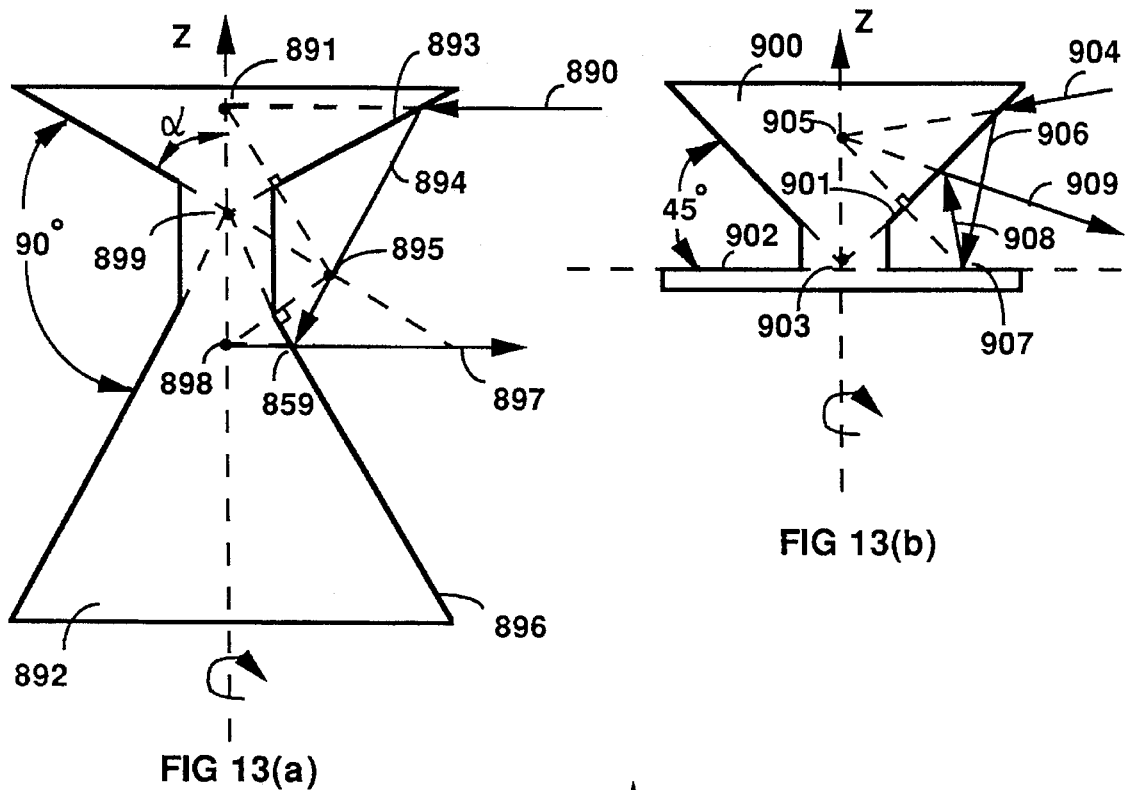
FIG 13(a)
FIG 13(b)
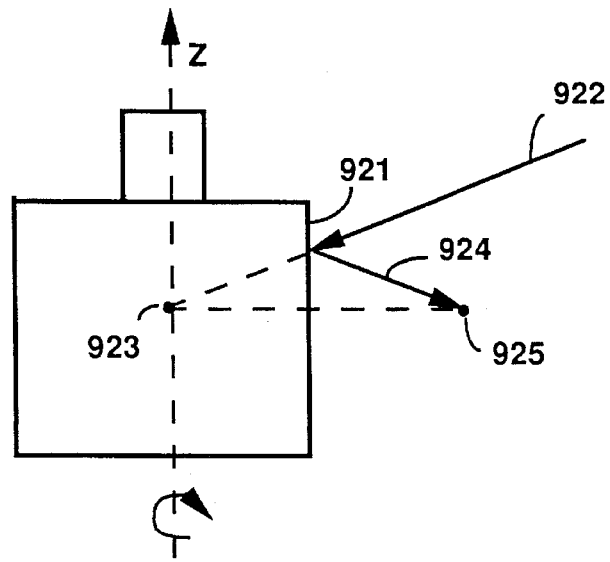
FIG 13(c)

SCANNING AND TRACKING USING ROTATING POLYGONS

BACKGROUND—FIELD OF THE INVENTION

The present invention relates generally to the field of optics and in particular to optical polygons which are used to manipulate light beams for reading, writing, printing, plotting, engraving, tracking and inspecting various surfaces.

BACKGROUND—PRIOR ART

A wide variety of optical systems for the scanning of surfaces with light beams are known in the art. Some of these employ flat mirrors while others employ polygonal mirrors. Many of these systems are reading (or inspecting) machines which typically include a camera in a fixed position. The information, i.e., the image, is transferred to the camera from different locations by a scanning mirror.

Other types of systems are writing (printing plotting or engraving) machines. These have a design which is similar to that described above but where a laser, mounted in a fixed position, puts out a writing beam which illuminates a scanning mirror which causes it to scan across a surface.

Examples of basic optical systems which will aid in understanding such scanning systems are shown in FIGS. 1–5. Examples of more sophisticated scanning systems are illustrated in FIGS. 6 and 7. Certain of the examples appear, or are described, in U.S. Pat. Nos. 5,170,279, 5,177,632 and 5,184,246 by the present inventors, which are incorporated herein in their entirety for every purpose as if fully set forth herein. FIGS. 1–7 are described and serve as an introduction to the present invention and as indication of the state of known systems.

FIG. 1: BASIC OPTICS

A planar mirror S1 is mounted so that its reflecting surface faces upward. An incident beam A2 from a laser, or other source, travels at an angle of incidence T from the normal N1 of mirror S1. Angle of incidence T is equal to the angle of reflection Q between the normal N1 and the reflected beam A3. Beam A3 may be sent to a suitable reading means or to a writing surface (not shown). The angle P between incident beam A2 and reflected beam A3 is equal to two times the angle T, i.e., to twice the incident or the reflected angle.

FIG. 2: ROTATING OPTICS

Assume it is desired to have mirror S1 (FIG. 1) scan the internal surface of a circular body (not shown) which surrounds the mirror S1. This can be effected by mounting mirror S1 directly onto a rotating axis X1 (FIG. 2) which rotates with an angular velocity $\Omega$. It can be shown that, as long as incident beam A2 is able to reach mirror S1, reflected beam A3 has an angular velocity $2 \times \Omega$. For example, rotating mirror S1 counterclockwise to a new position A6 through an angle S, results in an angle $Z=2 \times S$ between the new position of the reflected beam A7 and its old position A3. It is to be noted that normal N1 is perpendicular to the initial position of mirror S1 while normal N2 is perpendicular to new mirror position A6. The result is a linear relationship between the rotation angle of the mirror and the angle of the corresponding reflected beams.

FIG. 3: SCANNING BY MIRROR—U.S. Pat. No. 5,184,246

One of the most important potential commercial applications of scanning optics of the type described herein involve tracking of industrial products located on a rotating carousel. The scanning system of FIG. 2, shown in our previous U.S. Pat. No. 5,184,246, granted 1993 Feb. 2 can be used for this purpose as described next. Assume that carousel C2 (FIG. 3) is rotated at an angular velocity $\Omega_c$ around an axis X2. Each of a group of objects, for example, various industrial products like glass or plastic bottles, is mounted on carousel C2 and is initially centered at points B12 to B17. The bottles are to be inspected and/or to be written upon or engraved using a laser scanning beam to track the engraved bottles while they are spinning around their axis with spinning velocity $\Omega_b$.

In the tracking process there is no relative movement between the tracking beam and the tracked bottle. In this situation the spinning of the bottle is needed for exposing the whole circumference of the bottle to the tracking or engraving beam allowing engraving all around the bottle.

To scan the bottles, a laser source L emits an incident beam A2 which is reflected as tracking beam A3 from mirror S1. The beam hits a point B12 at which a bottle is mounted. Mirror S1 tracks the bottle from starting point B12 to its new position B13. This occurs while the carousel and the bottles on it are moving at an angular velocity $\Omega_c$ through the desired tracked interval around the circle.

All this occurs while a special mechanism rotates the mirror with an angular velocity $\Omega_m=\Omega_c/2$ through angle U of the circle, i.e., the mirror is moved from initial position P1 to new position P2 through an angle U/2. At that point a special mechanism returns the mirror quickly, with an angular velocity much higher than $\Omega_m$) to its initial position P1 to put the mirror in position to scan and track the next bottle on the carousel.

A new cycle of tracking starts with a different bottle at position B12. The bottle at position B12 was initially located at position B17 and has since rotated to the new position B12. Incident tracking beam A2 is reflected as beam A3 from mirror S1 which is at position P1, toward the new bottle at position B12.

The entire tracking procedure demands a cyclic back-and-forth rotation or oscillation of the mirror from position P1 to position P2 at an angular velocity $\Omega_m$ and then back from P2 to P1 at a much higher angular velocity than $\Omega_m$. This back-and-forth motion creates vibrations, resulting in optical distortions. The back-and-forth movement also creates accelerations which cause deviations from the linear relationship:

Mirror's rotational speed= ½carousel's rotational speed.

The cycle time required to return the scanning mirror to its initial position P1 reduces the length of the useful scanning interval. Furthermore, in many configurations, the centerpoint of the carousel includes an axle with a significant radius which occupies the space at and near the centerpoint and prevents the mounting of the scanning mirror at the center of the carousel. Tracking the product on the carousel with the scanning mirror mounted off center involves use of a non-linear relationship between the rotational speed of the carousel and the rotational speed of the scanning mirror.

Theoretically, such tracking can be achieved through computerizing the scan system. In practice, this technique is inadequate since the motor which drives the mirror cannot respond fast enough to positioning commands from a computer. The scanning system used in conjunction with the carousel illustrated in FIG. 3 can, with minor modifications, be used for inspecting (reading) the bottles for flaws detections. In this situation the laser source is replaced by a camera (such as CCD camera) and the optical propagation is achieved in the reverse direction from the tracked bottle through the scanning mirror to the camera. The image of the bottle is transferred to the camera by collecting the light beams which propagate along the lines between the tracked points and a point on the rotating axis of the scanning mirror. These beams are reflected from the scanning mirror toward the camera in a fixed orientation and thus the tracking is accomplished while the camera is in a static position.

FIG. 4: ROTATING MIRROR WITH TILTED ANGLE

FIG. 4 illustrates a scanning system having an optical design which is superior to the scanning systems illustrated in FIGS. 2 and FIG. 3. The mirror plane at the scanning mirror of FIGS. 2 and 3 contains the axis of rotation of the mirrors. In this design the scanning angle of the mirror depends on the range of angles through which the incident beam can impinge on the mirror. For scanning a complete circle, the incident beam must hit the scanning mirror along 180°. For producing the scan by continuous rotation of the mirror (without back and forth motion) and maintaining such an angle interval, both of mirror's faces must be used and must contain the axis of rotation. In this situation, the width of the mirror has to be of infinitesimally small width, which is impractical. It is therefore impossible to scan a complete circle using this design.

By contrast, the system in FIG. 4 is especially designed to be able to scan a complete circle. This system is a writing (printing, plotting or engraving) system. An incident parallel beam A2 propagates along the axis of rotation Z of scanning mirror A1 and is converted by focusing lens L10 into a focused beam which is directed toward scanning mirror A1. The normal N1 to mirror A1 is tilted at an angle I relative to the rotation axis Z. The angle I is also the incident angle of the focused beam which is reflected from scanning mirror A1 as a reflected beam A3. The reflection angle between beam A3 and normal N1 equals the incidence angle I.

The reflected beam A3 is focused onto a spot E on an internal cylindrical surface S10. S10 represents a part of a complete surface of an internal cylinder. When the scanning mirror A1 rotates about its rotational axis Z with its tilted angle I there is no change in the value of the incident and the reflected angles and they equal to I all along the scan. The normal N1 rotates with the scanning mirror A1 with the same angular velocity $\Omega$ and causes reflected beam A3 to rotate also with angular velocity $\Omega$ around the axis of rotation Z with a tilted angle of 2I between it and the rotation axis Z.

Using this design it is possible to scan a part or a complete circle. The focused point E slides on surface S10 with the same angular velocity $\Omega$ as the scanning mirror. For scanning of internal cylindrical surface, a vertical movement at the scanned surface S10 (or the scanning mirror A1 together with focusing lens L10) has to be carried out while the scanning mirror rotates around its axis of rotation Z.

The major advantage of this system is the ability to scan a complete circle (internal cylindrical surface when vertical movement is applied). On the other hand, such a system suffers from two significant disadvantages: (a) For periodic scanning of an arc which is part of a circle, the rotation has to be done using back-and-forth movements, which is disadvantageous as was discussed in the context of FIG. 3; and (b) For maintaining linear relationships between the angular velocities of the scanning focused point E and the scanning mirror A1 and for maintaining a fixed optical length between focusing lens L10 and the scanned surface S10 (maintaining the point E in a focused position), the incident beam A1, in case of writing, or the collected beam, in case of reading, must be aligned along the axis of rotation Z. In this situation only one light source, in case of writing, or only one camera, in case of reading, can be coupled to the scanning system. Thus, it is impossible to use more than one beam for simultaneously scanning several locations on the circle or surface. The use of only a single light source or camera limits the scanning speed of the system.

FIG. 5: ROTATING POLYGON—U.S. Pat. No. 5,184,246

The oscillating planar mirror of FIG. 3 can be replaced by a continuously rotating polygonal mirror M1 (FIG. 5), as also shown in our above U.S. Pat. No. 5,184,246 patent. The sides of the polygon are plane mirrors. The scanning range of the polygon is determined by the symmetrical rotation angle V which is the angle needed to bring the polygon back to its initial position. V is determined in accordance with the formula:

$$V = (360°/\text{number of sides of the polygon})$$

This system is compounded in that a superposition of two movements is involved. One movement is the rotating of the carousel around its axis while the second movement is the spinning of the bottles around their own axes (not shown). Proper tracking makes it possible to read or write around the product's spinning surface while the products are simultaneously moving on the carousel. To periodically track a plurality of N items distributed uniformly on a carousel, there should be an arc or tracking angle between each adjacent pair of products. In that case the tracking angle along the carousel arc is:

$$\text{Tracking angle} = 360°/N$$

The orientational angle of the polygon should be half the tracking angle along the carousel, resulting in the following:

$$\text{Number of polygon sides} = 2 \times \text{number of items on the carousel}$$

The side mirrors of the polygon are spaced away from the carousel's axis (off-axis) which causes a difference in the optical path lengths of the incident and reflected beams for two successive positions of the polygon. The first polygon position is depicted in solid lines and the optical path length of the incident and reflected beams is L1-Y1-L2. The second polygon position is shown in broken lines and the optical path length for the incident and reflected beams is L1-Y2-L3.

The difference between the two optical path lengths is clear. Using simple mathematics, it is also clear that the difference in the two optical paths increases with increasing polygon radius r. The difference in the two optical paths is termed a pupil shift and is known to result in bowed distortions at a camera D, or other light receptor, and does not allow to maintain fixed optical conditions (such as constant focusing) in the system along the scan region.

Since polygons are very convenient for scanning purposes, many techniques have been developed to overcome the limitations described above. In the example of FIG. 5, the off-axis mirrors of the polygon shift the corner of the scanning angle out of the carousel's center. This shift is coupled with an additional pupil shift, thereby destroying, or deviating from, the linear relationship between the position angle of the rotating carousel and the rotational angle of the polygon.

This deviation effectively increases with increasing polygon radius. The deviation approaches zero when the polygon's radius approaches zero. Were it possible to have a polygon of zero radius, the polygon would, in effect, be a mirror mounted directly on the rotating axis.

Some techniques for overcoming the problem of non-linear angular velocity relationships make use of small radius polygons and/or optical pixel computer correction lookup tables. The use of only small-radius polygons limits scanning applications to scanning narrow stripes, such as those scanned by line scan camera, or to writing with narrow laser beam. However, in many situations, high-speed scanning systems with large-radius polygons must be used for tracking large images or for writing with wide laser beams. For these applications, the side mirrors of the polygon should be very large, resulting in a large-radius polygon. When large-radius polygons are used, deviation of the scanning point from the correct position is large and position corrections must be performed by a computer.

However, the requirement of high speed does not leave enough time for both processing the image and correcting the beam's position using computer lookup tables. In addition to these problems, large-radius polygons have a large mass which makes the response of the scanning system too slow to respond to computer commands at the required speed of the system.

FIG. 6: IMPROVED POLYGON—U.S. Pat. No. 5,184,246

FIG. 6 illustrates in perspective view one version of improved polygon according to the invention also described in our U.S. Pat. No. 5,184,246 patent. This polygon has all the advantages of a conventional polygon as discussed below in the description to the system shown in FIG. 5, namely, the ability to produce periodic scans by continuous and fixed motion of rotation, the ability to scan a complete circle by adding all its segments which are scanned periodically, the ability to couple more than one light source (or camera) to the scanning system in order to produce scan in several different locations simultaneously. All these advantages are achieved without the limitations which exist in conventional polygons.

This polygon is superior to a conventional polygon in several respects. Such a polygon produces a scanning of a circle (internal cylindrical surface) with a linear relationship between the angular velocity of the polygon and the angular velocity of the scanned region (1:2). The polygon maintains a fixed optical length between the scanned area and the light source (or camera) and it exhibits a non-bowed scan-line.

These advantages are achieved by the special design derived from the theory that when two mirrors are placed in a tilted angle they distribute a set of images. Choosing the correct angle between the two mirrors and limiting the optical aperture to a certain view angle, permits the creation of only the view of the image which is symmetric to its generating objects with respect to the axis which passes through and normal to the intersection line between the mirror planes. The two mirror systems behaves effectively like a single mirror mounted directly on the axis of rotation.

FIG. 6 illustrates a six-sided polygon M1 each of whose sides contains two mirrors, namely, a side mirror and its corresponding secondary mirror. The planes of the sides mirrors are at 90° angles to their corresponding secondary mirrors. The upper part of the polygon consists of six side mirror facets F1, F2, F3, F4, F5 and F6. The lower part of the polygon consists of the corresponding secondary mirror facets F7, F8, F9, F10, F11 and F12.

All the planes of the mirror facets in the upper part F1–F6 intersect at a single point O1 in the (X,Y) plane which is normal to the axis of rotation Z. All the planes of the lower part of the polygon also intersect in a single point. The axis of the polygon Z1 has a very precise length to separate the upper part of the polygon and its lower parts by a very accurate space which assures that the intersection points of the planes of the mirrors of the upper part and the corresponding intersection point of the lower part of the polygon are both located exactly at the same point O1 in the (X,Y) plane. Each side of the polygon (consisting of a side mirror and its corresponding secondary mirror) behaves effectively like a single flat mirror whose plane consists of the axis Z and also produces a vertical displacement.

When the polygon rotates around its axis Z, which serves as an axis of rotation, each side of the polygon exhibits scanning like that of a mirror mounted directly on the axis of rotation Z with the additional vertical displacement. In the specific example shown in FIG. 6 the tilted angle $\alpha$ of all the facets F1–F12 is 45° with respect to the axis of rotation Z, but there is no limitation on the value of angle $\alpha$ when the angle $\beta$ between the side mirrors and their corresponding secondary mirrors is equal to 90°.

An incident beam A2 is focused by a lens L10 and is directed toward facet F1 which is the side mirror in the upper part of the polygon. The beam is reflected from side facet F1 toward its corresponding secondary facet mirror F12 located in the lower part of the polygon. F12 reflects the beam as scanning beam A3 that is focused into a small point E on the internal cylindrical surface S10.

The point E scans the surface S10 with angular velocity $\Omega_E$ which is twice the angular velocity $\Omega_p$ of the scanning polygon M1. This linear relationship between these angular velocity remains fixed all along the scan. The motion of the focused spot E is along an arc which forms part of a circle. The angle of the scanned arc along which the point E moves, is twice the rotation angle of the polygon. During the scanning of the focused point E the optical length between lens L10 and surface S10 remains constant and so does the focusing conditions of the spot E. Scanning of a complete surface is done by the coupling of several incident beams to several side mirror facets. The conversion of line scan along an arc of a complete circle into a scan of the surface of internal cylinder, or part of it, is done by vertical motion in the Z direction of the polygon with its optical system (lens L10, light source—not shown) or alternatively, by a vertical motion in the Z direction of the scanned surface.

In many applications, the scanned surface S10 has a large radius. This requirement necessitates the use of focus lens L10 with long focal length. In addition, the common requirement of high writing resolution necessitates working conditions which are in the range of diffraction limit. The minimum size of the spot E given by this diffraction limit is:

$$d = (\lambda) \times f/D$$

where d is the diameter of the Arry disk of spot E, ($\lambda$) is the wavelength of the light radiation, f is the focal length of the focusing lens L10 and D is the diameter of the beam A1 on lens L10. For achieving small values of d when f is very large D must also be large which means that the diameter of the light spot on the mirror facets F1 and F12 is also large and results in the usage of relatively large polygons. When it is desired to use a very accurate scanning, as is the case in the printing industry, the requirement of a large polygon with the additional requirement of high precision of the polygon structure (to assure that all its mirror facets have exactly one intersection point O1 which is located on the axis of rotation Z of the polygon M1) makes the production of the polygon very difficult and expensive.

In the situation of very accurate scanning on large radius surfaces with high resolution, the use of this polygon is not attractive in spite of all its advantages. On the other hand, this polygon is still attractive in other fields such as the field of inspection of industrial products which move on a rotating carousel or are transferred on conveyors having an arc shape.

FIG. 7: SCANNING WITH A POLYGON HAVING UNIQUE DIMENSION—U.S. Pat. No. 5,177,632

FIG. 7 is a top view of a scan system consisting of a rotating polygon with design based on the method described in U.S. Pat. No. 5,177,632 (1993 Jan. 5) to the present inventors. The polygon described in FIG. 7 creates a linear relationship between the angular velocities of the scanning polygon and the angular velocity of the scanning spot which moves along an arc which is a part of a circle similar to the polygon described in FIG. 6. This polygon also maintains a constant optical length between the focusing lens and the scanning point on the scanned area. The scanning system illustrated in FIG. 7 consists of a six-sided polygon (M1) with mirror facets F1, F2, F3, F4, F5 and F6. An incident beam A2 is directed along the optical axis of focusing lens L10 which is oriented to pass through the center O2 of polygon M1.

Incident parallel beam A2 is converted by focusing lens L10 into a focused beam which propagates toward facet F4 of polygon M1 and is reflected from facet F4 to be focused into a small point E located on the circle S10. Polygon M1 rotates around its axis Z with an angular velocity $\Omega_p$. The interval between Z and H1 equals the interval H1 to E and they both equal R/2. The facet F4 passes through the middle point H1 and is normal to the radius R. In this configuration the interval Z,H equals the interval H,E for any angle $\psi$. In addition, for any angle $\psi$, the beam which is reflected from facet F4 always passes through point E which is the intersection point between the radius R and the circle S10. When the polygon M1 rotates with angular velocity $\Omega_p$ around its axis Z, the angle $\psi$ changes its value but this does not affect the operation of the scanning system and the reflected beam from facet F4 will pass through the intersection point between the radius R and the circle S10. This point rotates with the polygon at the same angular velocity $\Omega_p$ and results with scanning velocity $\Omega_E$ of the point E which equals $\Omega_p$.

The optical length between focusing length L10 and the scanning point E on the scanned surface S10 equals the sum of the intervals L10,C3 plus C3,H plus HE. This sum equals the sum of the intervals L10,C3 plus C3,H plus HZ which equals L10,C3 plus R. Each of the intervals L10,C3 and R is constant and neither is dependent on the rotation of the polygon. Therefore, the sum of the intervals, which equals the optical length of the scanning system, is fixed all along the scanning. This polygon differs from the polygon illustrated in FIG. 6 in several respects: (a) The ratio of the angular velocities $\Omega_p$ and $\Omega_E$ of the polygon M1 and of the scanning point E on circle S10 is 1:1 (In FIG. 6 this ratio is 1:2); (b) This polygon does not maintain a fixed angle orientation in which the scanning beam A3 passes through the scan point E. By contrast, in the embodiment of FIG. 6, it is always oriented along the radius of the scanned circle (surface) S10.

The main advantage of this polygon is its simple structure and the fact that there is no relative angular velocity between the polygon and the scanning spot $\Omega_p = \Omega_E$. Its most significant disadvantage is that its facets must be located at a distance R/2 from the center of the scanned circle S10. This requirement, especially when the scanned surface S10 has a large radius R, makes this polygon too big to be used for some applications. In other situations, where the large size of the polygon is not critical, it is a very attractive option.

OBJECTS OF THE INVENTION

Accordingly, it is an object of the present invention to provide scan systems which are more accurate, simpler to activate, free of physical dimensional limitations, free of real-time correction iterations, and easy to construct.

Another object is to provide a scanning polygon which exhibits line scan which is formed when the scanning spot moves along the course of a complete circle or a part of it. The scanned circle or arc (which is part of it) are formed by a set of line segments which are joined together and each of them is scanned periodically while the polygon rotates in a continuous motion.

Another object is to provide a scanning polygon which exhibits surface scan of a complete internal cylindrical surface or a part of the surface when the scanned internal cylindrical surface of the arc is formed by a set of surface segments which are joined together and each of them is scanned periodically and is formed from a set of arc lines which are scanned periodically and are joined together to form the segment.

Another object is to provide a scanning system consisting of a scanning polygon which is coupled to multiple light sources or multiple light sensitive devices.

Another object is to provide a scanning system, including a scanning polygon, for performing simultaneous scanning in more than one location using multiple light sources or cameras.

Another object is to provide a scanning polygon which produces a linear relationship between its angular velocity and the angular velocity of the scanned spot.

Another object is to provide a scanning polygon which maintains a constant optical length of the scanning system all along the scanned region.

Another object is to provide a scanning polygon which maintains the same focusing conditions of the scanned spot all along the scanned region.

Another object is to provide polygons which are insensitive to pupil shift and which can exhibit a non-bowed scan line without wobble while scanning and tracking circles, arcs, internal cylindrical surfaces or part of them and products which are located or move along a complete circle or part of it.

Another object is to produce a scanning polygon such that each of its side mirrors behaves effectively like a mirror and whose plane contains the axis of rotation of the polygon and produces a scan like that of a mirror mounted directly on the axis of rotation.

Another object is to produce a scanning polygon such that each of its sides effectively produces scanning like that of a mirror mounted directly on the axis of rotation and is combined with vertical displacement.

Another object is to provide a general method and apparatus for accurately scanning and tracking circles, arcs, internal cylindrical surfaces or parts of them and objects located or moving along such circles, arcs, internal cylindrical surfaces while the scanning spot produces scanning and tracking in an angular velocity which is either twice the polygon's angular velocity or equals the polygon's angular velocity while the optical length of the system and the focusing spot conditions are constant all along the scan and the axis of rotation of the polygon is located at the center of the scanned and tracked region.

Another object is to provide a scanning system including a scanning polygon for accurate scanning and tracking of objects located on or moving along a circle, an arc or an internal cylindrical surface when the circle or the arc consists of the circumference of rotating carousel, a linear conveyor which is bent into a shape of a circle or an arc and the internal cylindrical surface is formed by the side walls of the objects which are located on or which move along the circle or the arc.

Another object is to provide a scanning system for accurately scanning and tracking for the purpose of reading and inspecting objects, lines and surfaces placed along circles, arcs, internal cylindrical surfaces or parts of them.

Another object is to provide a scanning system including a scanning polygon for accurately scanning and tracking for purposes of writing, printing, plotting and engraving of objects, lines and surfaces placed along circles, arcs, internal cylindrical surfaces or parts of them.

Another object is to provide a scanning system for accurately scanning and tracking which includes a scanning polygon whose axis of rotation is located at the center of the scanned and tracked region for producing writing on a printer drum, plotter drum, films, foils, masks and templates for the printing industry which are coated with light sensitive material and are circularly or arc-like bent and writing and engraving directly on internal cylindrical surfaces or parts of them for uses such as direct or semi-direct printing, writing, engraving and mask production.

Another object is to provide a scanning system for accurately scanning and tracking including a scanning polygon for reading and inspecting circles, arcs and internal cylindrical surfaces or parts of them for uses such as inspection machines for quality control of industrial products which are located or which move along a circle or an arc and their side walls form an internal cylindrical surface and to read and inspect objects which have internal cylindrical-like shapes.

Another object is to provide accurate scanning and tracking systems for writing, engraving, reading, and inspection machines based on static or moving circles, arcs, internal cylindrical surfaces or part of them, especially using polygons which rotate with a fixed speed which is half of the rotational speed of the carousel which are easy to produce, with lower requirement for accuracy, that have the capability of being corrected to compensate for their production tolerances by a static optical component, such that not all of their mirror planes must be intersect in a single point on the rotational axis of the polygon, such that their height can be reduced and their dimensions are independent of the radius of the scanned region.

Another object is to provide accurate scanning and tracking system for writing, reading, inspecting and engraving machines based on static or moving objects which have the shape or move along shapes such as circles, arcs, internal cylindrical surfaces or parts of them using polygons which rotate with a fixed speed which equals the rotational speed of the scanned or traced region which is easy to produce and whose production tolerances can be corrected by static optical elements.

Other objects are to provide polygons with large side mirrors which rotate at a fixed velocity for accurate tracking of products which move along circles, arcs, internal cylindrical surfaces using linear scanning or area-scanning cameras, to provide polygons with large side mirrors which rotate with fixed velocities for accurate writing on products located on rotating carousels, to provide such polygons for use with narrow or wide laser beams so as to provide large or small mirror systems mounted on all or part of the space determined by the polygon, to provide such a system which rotates with a fixed velocity for accurate reading of products located on, or moving along, circle, arc, internal cylindrical surfaces or parts of them using a linear or a matrix camera, and to provide polygons with large side mirrors for accurate writing and reading without blocking the field of view during the scan.

Another object is to provide scanning polygons which are acceptable also in situations of non perfect scanning and tracking (i.e., non perfect linear relationships between the angular velocities of the scanning polygon and the scanning point and non constant focusing conditions for the scanning spot on the scanned surface). The scanned and the traced region is adjusted to fit the scanning and tracking intervals of the polygons.

Still further objects and advantages will become apparent from a consideration of the ensuing description and accompanying drawings.

SUMMARY

These and other objects are accomplished by using polygons each of whose sides consists of a set of mirrors or a combination of mirrors and optical lenses which are defined as the polygon side system. The beam which is launched toward the polygon, in case of writing, or which is collected from the polygon, in case of reading, passes through several points which rotate with the polygon in the same angular velocity without any relative movement between the polygon. These points are defined as intersection points.

For any rotational position and its corresponding optical path, the beams in the polygon side system pass through the intersection points and their orientation changes in an amount which equals the angle of rotation of the polygon. Each of the sides of these polygons behaves like a mirror mounted directly on the axis of rotation of the polygon, or behaves like such a mirror with additional vertical displacement when the following conditions are satisfied: (a) The intersection point through which the scanning (or tracking) beam or its extension passes is imaged on the axis of rotation of the polygon; (b) Aligning the incident/collected and the scanning/tracking beam at an equal angle to the polygon's axis of rotation or form equal angles which are symmetric to each other.

The polygons which are designed according to the above method are easy to produce, require less accuracy, have reduced dimensions, are capable of being corrected for production errors using a static optical component and produce scanning/tracking with twice the angular velocity of the polygon's angular velocity.

Another version of the present invention which performs the scan with the same angular velocity of the polygon rotational speed is achieved by imaging the intersection point of the polygon's side system on the scanned/tracked region. This version is easy to produce and is capable of being corrected for the production limitations. Though the method and the polygon design are capable of perfect scanning/tracking, they offer a technique and apparatus for adjusting the scanning/tracking interval to the deviations of the polygons from the conditions that are required for perfect scanning and tracking.

The present scanning system overcomes the problems caused by the off-axis mirrors of conventional polygons and maintains constant optical length and focusing conditions and linear relationships between the angular velocity of the polygon and the scanning point along the scanned region, i.e., circle, arc, internal cylindrical surface or parts of it. The scanning is performed without pupil shift or bowed scan lines by using a polygon each of whose side mirrors behaves effectively like a mirror which is mounted directly on the rotating axis with or without vertical displacement.

The scanning system is capable of tracking the spinning axis of the products (or any other fixed point). This tracking can be carried out without bowed scan lines (even when the incident beam and the reflected beam are out of the rotation plane—X,Y, determined as a plane which is perpendicular to the rotational axis of the polygon—Z), and without any correction for the scan position. This enables an accurate scan with large polygons using a fixed rotational speed, which is half the rotational speed of the carousel, and enables the usage of scanning large images or writing with wide laser beams for high resolution.

BRIEF DESCRIPTION OF THE DRAWINGS

The invention is herein described, by way of example only, with reference to the accompanying drawings, wherein each related sets of Figs. { e.g., FIGS. 8(a) to 8(c)} is sometimes referred to as a single Fig. (e.g., "FIG. 8") and an individual Fig. of a set is sometimes referred to as a part of a Fig. (e.g., "part (a) [of FIG. 8]").

FIG. 1 is a prior art diagram showing the basic angles of beam reflection.

FIG. 2 is a prior art diagram showing the effects of a moving mirror.

FIG. 3 is a prior art diagram relating the moving mirror to scanned objects.

FIG. 4 is a prior art diagram demonstrating an internal cylindrical scanning using tilted mirror.

FIG. 5 is a prior art diagram depicting the principles of operation of multi-sided polygons.

FIG. 6 is a prior art diagram illustrating an improved polygon demonstrating an internal cylindrical scanning.

FIG. 7 is a prior art diagram showing a scanning polygon with unique dimensions demonstrating a line scan along a circle.

FIGS. 13(a)–(c) depict examples shown in U.S. Pat. Nos. 5,184,246 and 5,177,632 of polygon designs derived according to the present invention.

DESCRIPTION OF THE PREFERRED EMBODIMENTS

Figure 8A:
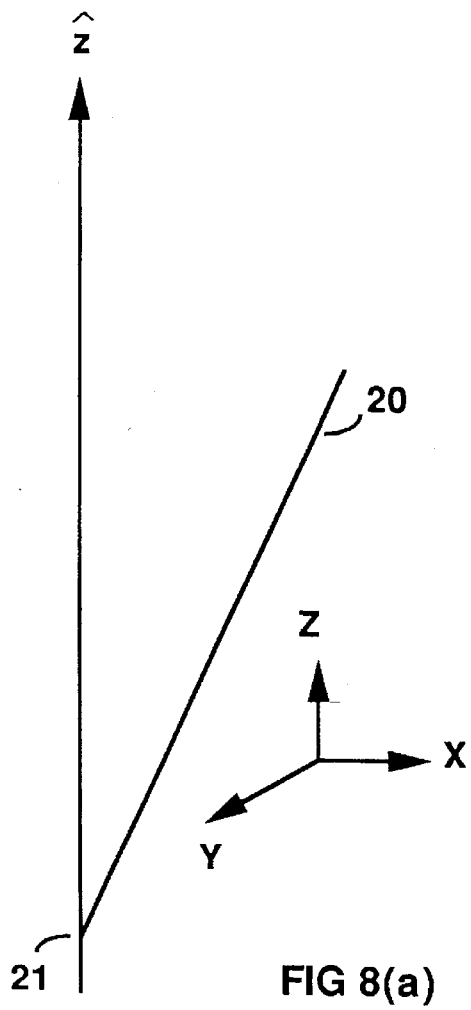
FIGS. 8(a)–(c) show side and top views of a light beam as it appears in a static and rotating coordinate systems.

The principles and operation of the present invention may be better understood with reference to the drawings and the accompanying description below.

FIG. 1—Prior Art—Basic Optical System

As previously discussed, FIG. 1 demonstrates one of the basic rules of optics for a reflecting surface S1. An incident beam A2 from a source light or laser beam travelling at an angle T is reflected at an angle Q. N1 is a perpendicular to reflecting surface S1. T is equal to Q.

FIG. 2—Rotated System

FIG. 2 demonstrates the action of a reflecting surface S1, which is initially at position P1 and which rotates to a second position P2 about an axis Z1. A2 is the incident beam. A3 is the reflected beam for the first position, and A7 is the reflected beam for the second position. Normal N1 is a perpendicular to mirror S1 at position P1 and normal N2 is a perpendicular to new mirror position P2. Angle S is between perpendiculars N1 and N2.

FIG. 3—Plane Mirror Tracking System

FIG. 3 illustrates motion of products centered initially at points B12 to B17 on carousel C2. The products rotate on their own axes B12 to B17 with an angular velocity $\Omega_b$. At the same time the carousel rotates with an angular velocity $\Omega_c$ about axis X2. Mirror S1 rotates through an angle U/2 to position P2.

FIG. 4—Tilted Mirror Scanning System

FIG. 4 shows a scanning system including a rotating tilted mirror which is capable of scanning along a complete circle or parts of it. Incident parallel beam A2 is oriented along the rotational axis of tilted mirror A1 along Z direction. Beam A2 is converted by lens L10 into a focusing beam which propagates toward tilted mirror A1 and is reflected from mirror A1 as scanning beam A3. The incident angle between N1, the normal to mirror A1 and the focusing beam equals the reflected angle between N1 and the tracking beam A3 and they both equal I. While mirror A1 rotates around its axis, the normal N1 rotates with mirror A1 without any change in the magnitude of the angles I, resulting with tracking beam A3. Its projection on the rotational plane, defined as the plane X,Y which is perpendicular to the rotational axis of the tilted mirror, is oriented along the radius of the scanned internal cylindrical surface S10 so that its axis of symmetry coincides with the rotational axis of mirror A1. Tracking beam A3 is focused on surface S10 into a small focused point, or spot, E which scans the surface S10 with the same angular velocity $\Omega$ of tilted mirror A1. The optical length between lens L10 and spot E via mirror A1 and the focusing conditions of spot E on surface S10 are constant all along the scanning.

FIG. 5—Polygon Tracking System

FIG. 5 shows a top view of a regular polygon with six facets F15 to F20. The polygon is rotated from a first position P3, shown in solid lines, to a second position P4, shown in broken lines. The polygon rotates on axis X3 of carousel C2. In the polygon's first position, a laser source L emits an incident beam L1 which hits the polygon at point Y1 and is reflected as a tracking beam L2. In the polygon's second position, incident beam L1 hits the polygon at point Y2 and is reflected path as beam L3. The polygon's two positions are separated by a rotational angle V/2. Reflected beam L2 and L3 can be collected by a camera D or by a sensor (not shown). The system is reversible, i.e., a light source can be mounted in place of the camera and the light can be collected at the laser's location by a camera. The two cases describe a write and a read situation, respectively. The write function can engrave a code on the surface of the object and the read function can collect an image of the object for analyzing defects.

FIG. 6—Internal Cylindrical Scanning Using Improved Polygon

FIG. 6 illustrates an internal cylindrical scanning system using a rotating polygon designed according to the invention described in U.S. Pat. No. 5,184,246. This patent demonstrates that when the following relationships are satisfied, each of the polygon sides behaves effectively as a mirror mounted directly on the rotational axis of the polygon:

$$\beta = \alpha/n$$

where $\alpha$ is the tilted angle of the side mirror of the polygon, $\beta$ is the angle at which the secondary mirror is placed with respect to its side mirror and all the mirrors plane intersect in one point located on the rotational axis of the polygon. U.S. Pat. No. 5,184,246 also presents a special case where $\beta = 90°$ and $\alpha$ is arbitrary. In this special case, each of the polygon's sides behaves effectively as a mirror mounted directly on the rotational axis of the polygon with additional vertical displacement. The polygon M1 which is illustrated in FIG. 6 consists of two parts. The upper part which operates as tilted side mirrors and the lower part which operates as tilted secondary mirrors. The function of the upper part of the polygon can be interchanged with that of the lower part of the polygon. The polygon M1 shown in FIG. 6 has angle $\beta = 90°$ and $\alpha = 45°$. All the planes of its mirrors (side mirrors and secondary mirrors) intersect at point O1 on the polygon rotational axis Z. The upper side of the polygon which consists of facets F1–F6 is separated from the lower part of the polygon which consists of facets F7–F12 by the axis of the polygon Z1 which is placed along coordinate Z and is normal to the plane of rotation X,Y. The rotational axis Z of the polygon M1 coincides with the axis of symmetry of the scanned internal cylindrical surface S10. Incident parallel beam A2 is converted by lens L10 into a focused beam which propagates toward side mirror F1 and is reflected from it toward secondary mirror F7. From secondary mirror F7 the beam is reflected as scanning beam A3 toward the scanned surface S10. Scanning beam A3 is focused into a small scanning spot E on surface S10. The spot E periodically scans the surface S10. Scanning beam A3 is focused into a small scanning spot E on surface S10. The spot E periodically scans the surface S10 with angular velocity $\Omega_E$ which is twice the angular velocity $\Omega_p$ of the polygon M1. The optical length between focusing lens L10 and the scanning point E via the mirrors of polygon M1 is constant all along scan.

FIG. 7—Scanning System Consists of a Polygon with Unique Dimensions

FIG. 7 illustrates a top view of a six-sided polygon according to the invention described in our above U.S. Pat. No. 5,177,632. The facets F1–F6 of the polygon M1 are normal to the radius R of the scanned surface S10 and pass through the middle point H1 of this radius. The rotational axis of the polygon is oriented along coordinate Z and is vertical to the scanning plane of the polygon M1. The rotational axis of the polygon and the axis of symmetry O2 of the scanned surface S10 are placed along the same line. Incident parallel beam A2 is focused by focusing lens L10 and hits the polygon M1 as focusing beam at point H. From point H the beam is reflected as scanning beam A3 and is focused into a small spot E on the scanned surface S10. The angle $\phi$ between the facet F4 and the extension of focusing beam which passes through the center O2 of polygon M1 depends on the rotation position of the polygon M1 which rotates with angular velocity $\Omega_p$. The spot E is always located at the intersection point between surface S10 and the radius R of this surface that passes through the center H1 of facet F4 independent of angle $\phi$. In this configuration, the spot E rotates with the polygon M1 with the same angular velocity with no relative motion between spot E and polygon M1. Thus the angular velocities $\Omega_E$ and $\Omega_p$ of the spot E and the polygon M1, respectively, are equal. The optical length between focusing lens L10 and the scanning spot E on the scanned surface S10 via the polygon mirror F4 is fixed and equals the distance between focusing lens L10 and the polygon center O2.

Figure 8B:
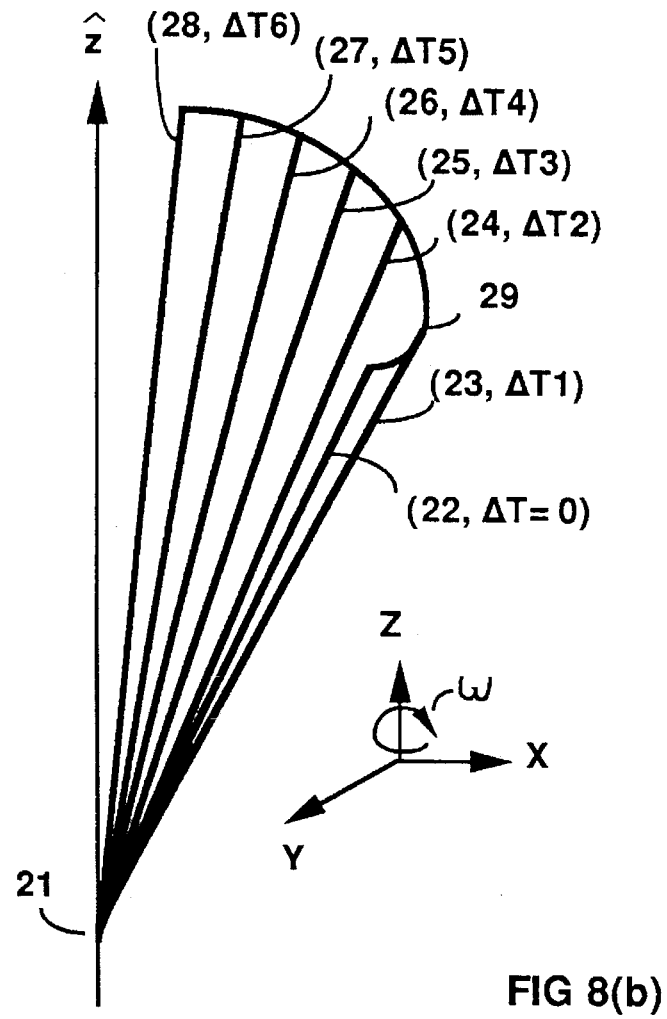
Figure 8C:
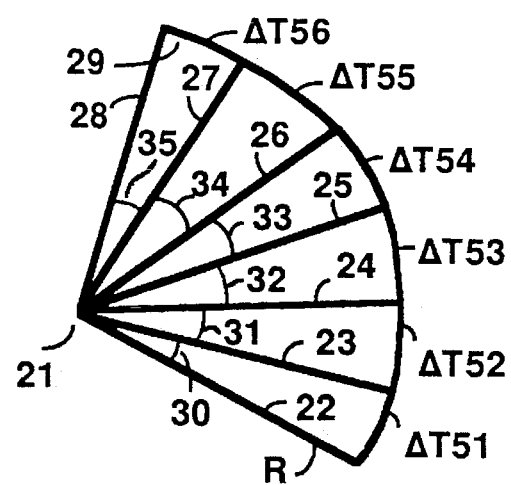

FIG. 8—Top and Side Views of Incident Beam in Relative Coordinate Systems

FIG. 8 is provided as a preliminary aid is assisting the understanding of the present invention and depicts top and side views of a single incident beam in relative coordinate systems. Part (a) of FIG. 8 shows a side view of an incident beam 20 which is oriented toward coordinate Z of a static coordinate system X,Y,Z and passes through a point 20 on coordinate Z. Part (b) of FIG. 8 shows a side view of the same incident beam 20, as it appears at different times in a coordinate system X,Y,Z which spins with angular velocity $\Omega$ around its coordinate Z, serving as the rotational axis of the rotating coordinate system X,Y,Z. In such a rotating coordinate system the coordinate Z remains static while the coordinate system spins clockwise with angular velocity $\Omega$. The incident static beam 20 appears in the system as moving counterclockwise. The position of beam 20 in this rotating coordinate system depends on the rotating velocity $\Omega$ and the rotating time. The initial position of beam 20 is the position 22 which is illustrated for $\Delta T=0$, when $\Delta T$ is the difference of time that is measured from the starting time. The positions of beam 20 for different times is indicated as $(i,\Delta Tj)$ where i is the position number and $\Delta Tj$ is the time difference between the starting time and the actual time corresponding to the position i. Thus the illustrated beams at positions 22, 23, 24, 25, 26, 27 and 28 are related to the time differences $\Delta T=0$, $\Delta T1$, $\Delta T2$, $\Delta T3$, $\Delta T4$, $\Delta T5$ and $\Delta T6$, respectively. The arc 29 is the line which beam 20 appears as moving along to and it is located in plane X,Y which is defined as a rotational plane which is vertical to coordinate Z. All beams 22–28 which represent a general position of beam 20 which corresponds to a general location of the coordinate system intersect at one point 21 on coordinate Z and that point is defined as intersection point. Part (c) of FIG. 8 is a top view of the diagram shown in part (b) of FIG. 8. Arc 29 consists of the segments $\Delta S1$, $\Delta S2$, $\Delta S3$, $\Delta S4$, $\Delta S5$, $\Delta S6$ such that their lengths equal $R\times\Omega\times\Delta T1$, $R\times\Omega\times\Delta T2$, $R\times\Omega\times\Delta T3$, $R\times\Omega\times\Delta T4$, $R\times\Omega\times\Delta T5$ and $R\times\Omega\times\Delta T6$, respectively, where R is the radius of the arc 29 whose center is located at point 21. R equals the projection length of beam 21 (22–28) on the rotational plane X,Y. The rotational angles 30, 31, 32, 33, 34 and 35 equal $\Omega\times\Delta T1$, $\Omega\times\Delta T2$, $\Omega\times\Delta T3$, $\Omega\times\Delta T4$, $\Omega\times\Delta T5$ and $\Omega\times\Delta T6$. The rotating coordinate systems illustrated in parts (b) and (c) of FIG. 8 and the way in which static beam 20 appears (as a rotating beam) are similar to a coordinate system of a rigid body such as polygonal mirrors with rotational axis along coordinate Z when a static incident beam oriented to its rotational axis appears as a rotating beam relative to the polygon coordinates X,Y,Z which rotate with the polygon.

FIG. 9—Images of Intersection Points Produced by Mirrors

FIG. 9 illustrates the creation of the images of intersection points by mirrors and is provided as a preliminary aid to assist in understanding the present invention. The extensions of incident beams 40–42 in part (a) of FIG. 9 intersect in a single intersection point 43 which is similar to the intersection point 21 illustrated in FIG. 8. Since point 43 is the intersection point of the extensions of beams 40–42 themselves, it is defined as an imaginary intersection point. Incident beams 40–42 are reflected by mirror 44 and they all intersect in a single point 45. Point 45 is the intersection point of the real reflected beams (not their extensions) and thus it is defined as real intersection point. Incident beams 50–52 in part (b) of FIG. 9 originate from the intersection point. If the beams themselves would have originated from this point, then point 53 would have been a real intersection point. If the extension of beams 50–52 originate at point 53 as shown in part (b) of FIG. 9 then point 53 would be an imaginary intersection point. Incident beams 50–52 are reflected from mirror 54 as beams 55–57. The extensions of the reflected beams 55–57 have an imaginary intersection point 58. From the examples shown in parts (a) and (b) of FIG. 9 it is clear that regardless on whether the original intersection point is real or imaginary, its image which is produced by a mirror will always be placed on the other side of the mirror.

Figure 9A:
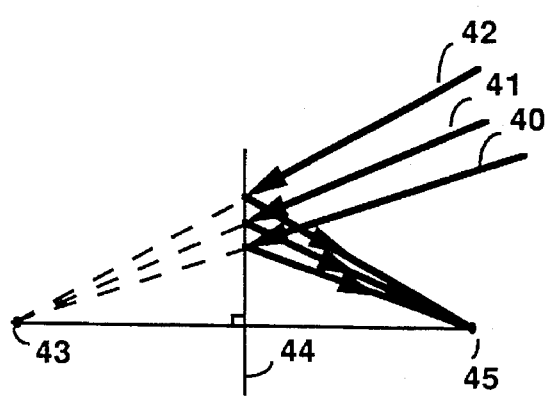
FIGS. 9(a)–(e) show geometrical relationships between intersection-points their images and the mirrors that produce those images.
Figure 9B:
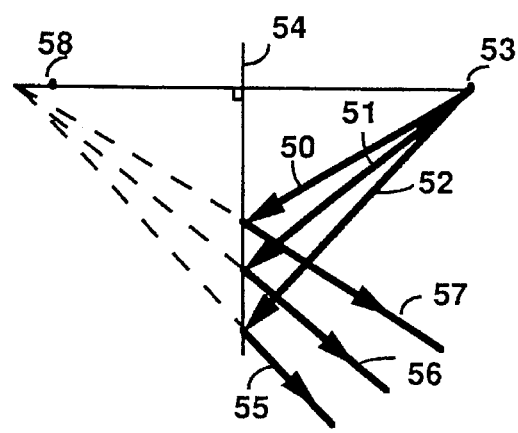
Figure 9C:
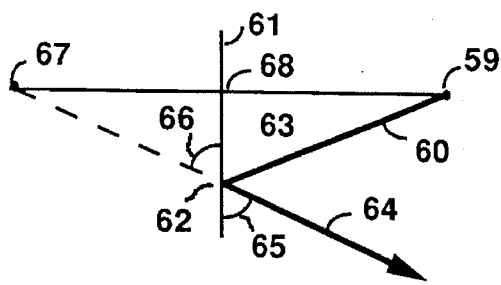
Figure 9D:
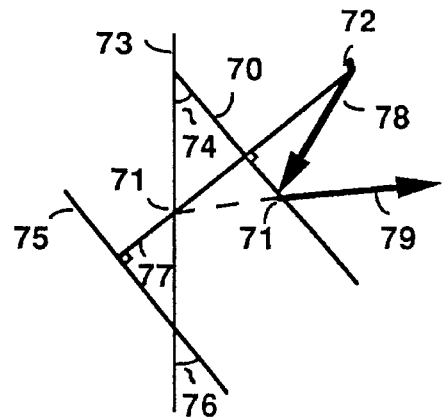
Figure 9E:
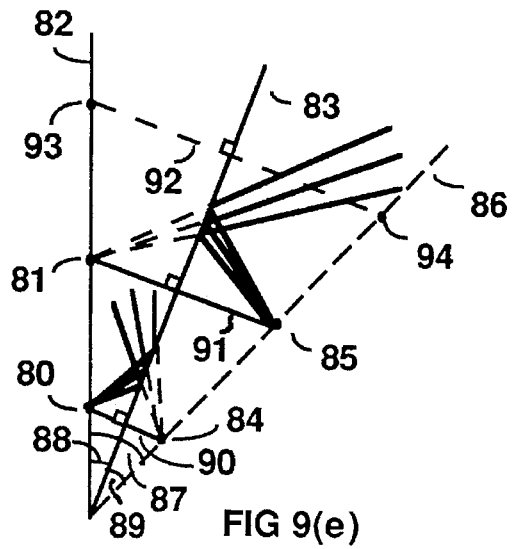

FIG. 9(c) demonstrates the geometrical relationships between the original intersection point and its image which is produced by a mirror. Original intersection point can be a point such as point 21 in part (a) of FIG. 9 or any other intersection point which serves as an object placed toward a mirror for producing its image. In particular, original intersection point can be an image of a previous intersection point whose image (real or imaginary) serves as an object (original intersection point) for the mirror illustrated in part (c) of FIG. 9. The original intersection point 59 in FIG. 9(c) is the origin of many incident light beams of which, for the simplicity of the drawing, only one is shown and is indicated as incident beam 60 which strikes mirror 61 at point 62 with an incident angle 63 and is reflected from mirror 62 as beam 64 having reflected angle 65. Angle 63 equals angle 65 according to the reflection rules of light beams from a mirror which state that the incident angle equals the reflected angle. The extension of angle 65 equals angle 66 due to simple geometric relationships and thus angle 63 equals angle 66. In this situation mirror 61 is the angle bisector of the angle defined by points 59, 62, 67.

The discussion below is completely general and is valid for any light beam which originates at intersection point 59 and is reflected from mirror 61 at a point such as point 62 which means that mirror 61 serves as an angle-bisector of all the angles between the reflected beams such as beam 64 and their extensions. All the extensions of the beams such as beam 64 pass through intersection point 67 (the image of intersection point 59). In this case, for any incident beam originating at intersection point 59 there exists a corresponding triangle such as triangle 59, 62, 67. All these triangles have a common base 59, 67 and their corner lies on mirror 61 which is also the angle bisector of all the top angles of these triangles. Under these conditions all these triangles are isosceles triangles and mirror 61 is normal to their common base 59, 67 and cross this base at its middle point 68 which makes mirror 61 both a perpendicular bisector and an angle bisector.

The distance 59,68 of the original intersection point from mirror 61 equals the distance 67,68 of its image from mirror 61. The geometric relationships which are discussed and demonstrated above indicate the following important relationships which will be used later to assist in understanding the present invention: (a) The original intersection point and its image produced by a mirror are placed on both sides of the mirror at equal distance from the mirror; (b) The mirror which produces the image of the original intersection point is a perpendicular bisector of the interval between the original intersection point and its image; (c) The mirror which produces the image of the original intersection point is the angle bisector at the angle between a beam which is reflected from it and its extension which passes through the image of the original intersection point; (d) The triangles which are defined by the lines along the incident beams, the extension of the reflected beams and the interval between the original intersection point and its image (serves as the base of such triangles) are all isosceles triangles.

Part (d) of FIG. 9 demonstrates a technique used in the present invention according to the above discussion for producing an image of original intersection point onto a given line where the position of the original intersection point and the orientation of the mirror are pre-determined and the position of the mirror has to be defined. The pre-determined orientation of mirror 70 which produces the image 71 of a given original intersection point 72 onto a line 73 is defined relative to this line by angle 74. The position of mirror 70 is found graphically (it also can be found analytically) by drawing a line 75 having an angle 76 relative to line 73. Angle 76 equals angle 74 and the position of line 75 is arbitrary since line 75 is parallel to mirror 70 which is the perpendicular bisector of the interval between points 71 and its image 72. Therefore line 75 is also perpendicular to the line which passes through the original intersection point 72 and its image 71. The location of the image 71 on line 73 is found by the cross-point between line 73 and line 77 which is drawn normal to line 75 and passes through intersection point 72. The position of mirror 70 is found by drawing a perpendicular bisector to the interval between point 71 and 72. The given pre-determined orientation angle of the mirror 70 is found by drawing a perpendicular bisector to the interval between point 71 and 72. The given pre-determined orientation angle of the mirror 70 is equivalent to given orientations of incident and reflected beams 78 and 79 respectively.

Part (E) of FIG. 9 shows that according to the discussion which accompanies part (c) of FIG. 9, the mirror which produces the image of the original intersection point is the angle bisector of the angles between the beams reflected from the mirror and their extensions. According to these relationships, any original intersection point which is located on a line will be imaged onto another line which is symmetric to it with respect to a line along which the mirror is oriented.

A real intersection point 80 and an imaginary intersection point 81 are located on line 82 and are imaged by mirror 83 as imaginary intersection point 84 and real intersection point 85 corresponding to their original intersection points 80 and 81, respectively. Points 84 and 85 are imaged onto line 86. Mirror 83 is the angle bisector of angle 87 which is placed between lines 82 and 86 and divides the angle 87 into two equal angles 88 and 89. Mirror 83 is also the perpendicular bisector of the intervals between the original intersection point 80 and its image 84 and the interval between original intersection point 81 and its image 85. According to the discussion above, it is clear that the location of the image 94 of intersection point 93 (either real or imaginary) can be found graphically (or analytically) without the necessity of drawing the traces of the optical beam. The image 94 is located at the cross section point between line 86 and a line 92 which passes through point 93 and is normal to mirror 83.

Figure 10A:
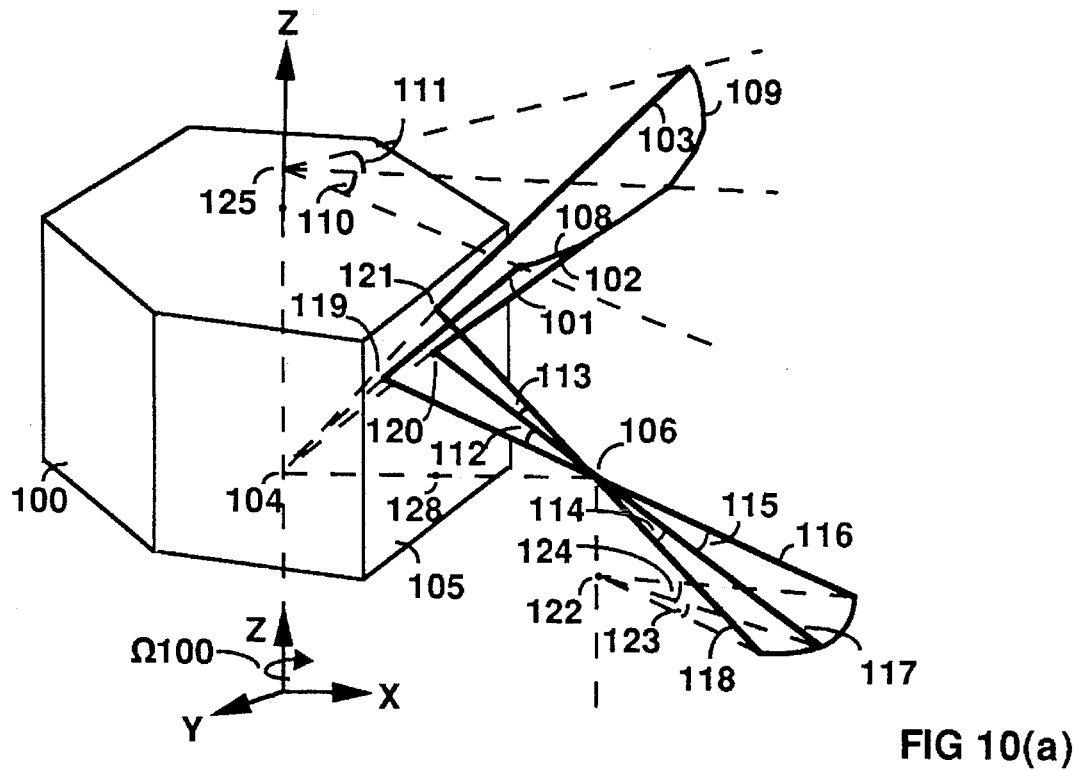
FIGS. 10(a)–(b) show geometrical relationships between original intersection point, its image and the mirror that produces the image.

FIG. 10—Geometrical Relationships between the Imaged Intersection Point and the Polygon's Facet which Produces It FIG. 10 illustrates an original intersection point which is imaged by a facet of a conventional rotating polygon onto another intersection point. Part (a) of FIG. 10 shows the original intersection point, its image and the optical beams which pass through these intersection points as they appear in a rotating coordinate system at different times corresponding to different positions of the polygon as they appear in a static coordinate system. Part (b) of FIG. 10 is a top view of the same image of the intersection point which is shown in part (a) of FIG. 10, and the optical beams which pass through it as they appear in a static coordinate system at different times corresponding to different positions of the rotating polygon. FIG. 10(a) illustrates a scanning system in X,Y,Z coordinates which rotate clockwise around its Z coordinate at an angular velocity which is identical to the angular velocity $\Omega 100$ of the rotating conventional polygon 100 and with the same speed and direction.

The rotating polygon 100 appears to be in a static position and optical beam 101 which is launched toward the rotational axis of polygon 100 appears as a rotating beam which rotates counterclockwise at an angular velocity $\Omega 100$ in the way previously discussed in the context of FIG. 8(a) and forms a surface with cone-like shape during its motion.

Beams 102 and 103 are actually the beam 101 as it appears at different times corresponding to different positions of the polygon in a static coordinate system. Beams 101, 102 and 103 are all aligned toward point 104 on the polygon rotational axis Z and are reflected by the polygon facet 105 and all pass through point 106. Point 104 is the original imaginary intersection point (all the extensions of beams 101, 102 and 103 pass through it) so that its image produced by mirror 105 is the real intersection point 106 (all the reflected beams 116, 117 and 118 pass through it). Angles 108 and 109 are the angles between beams 101 and 102 and between beams 102 and 103, respectively. Angles 110 and 111 are the projections of angles 108 and 109 on a plane which is parallel to the rotational plane X,Y which is vertical to coordinate Z. Angles 113 and 114 are between reflected beams 117 and 118 and angles 112 and 115 are between reflected beams 117 and 116.

From simple geometric relationships it is clear that angles 108, 112 and 115 are all equal and that angles 109, 113 and 115 are all equal. Incident beams 101, 102 and 103 are symmetric to their corresponding reflected beams 116, 117 and 118 with respect to planes which are parallel to rotational plane X,Y and these planes contain the corresponding normals (not shown) to mirror 105 at the corresponding contact points 119, 120 and 121. In this situation, the projection of the imaged intersection point 106 and the reflected beams 116, 117 and 118 on a plane parallel to the rotational plane X,Y produces the point 122 and the angles 123 and 124 which are equivalent to point 125 and angles 111 and 110, respectively, which are projected to another plane parallel to the rotational plane X,Y and mirror facet 105 is the perpendicular bisector at the interval between intersection point 104 and its image 106 which passes through point 128. Mirror 105 is also the angle bisector of the angles between the extensions of incident beams 101, 102 and 103 and their corresponding reflected beams 116–118 which pass through intersection point 106.

From the discussion above it is clear that when $\Delta T126$ and $\Delta T127$ are the time differences between the corresponding positions of beams 101 and 102 and the corresponding positions of beams 102 and 103, respectively, then the values of the following angles is given by:

Angle 110= angle 124= $\Omega 100 \times \Delta T126$

Angle 111= angle 123= $\Omega 100 \times \Delta T127$

As was discussed in the description of FIG. 9, the triangle which is determined by the three points (1) the original intersection point, (2) its image and (3) the hitting point on the mirror, is a isosceles triangle. In this case it is clear that the optical path between the origin of the incident beam and the imaged intersection point via the mirror equals the constant distance between the origin of the optical beam and the original imaginary intersection point located on the rotational axis of the polygon.

Figure 10B:
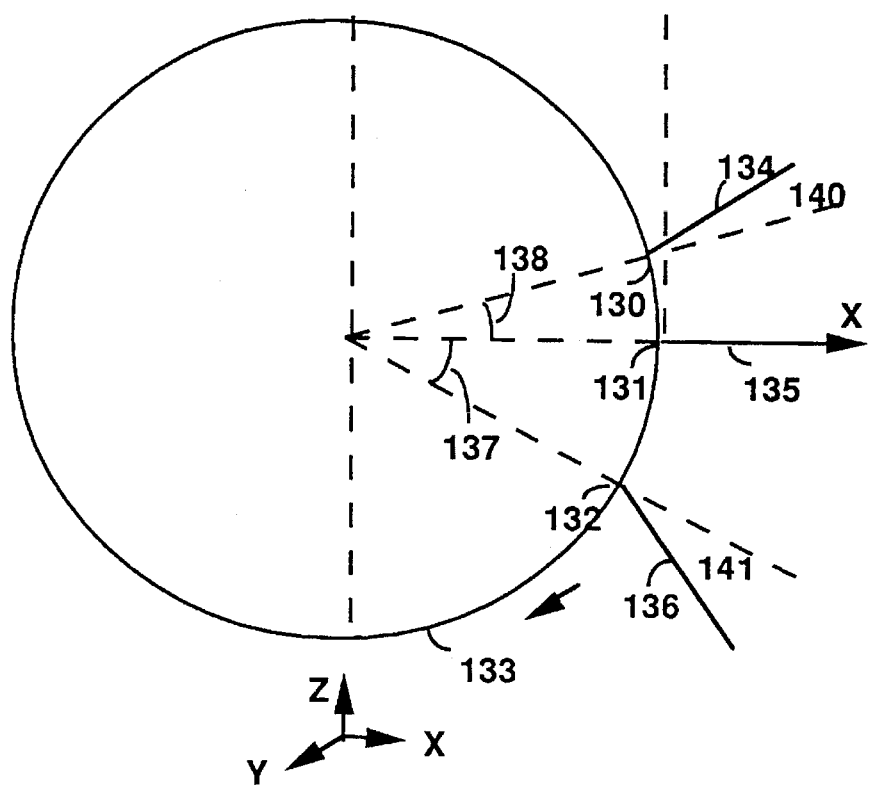

FIG. 10(b) illustrates, in a static coordinate system, a top view of point 122 which is the projection of the imaged intersection point 106 onto a plane parallel to rotational plane X,Y as shown in FIG. 10(a). FIG. 10(b) also illustrates the projection of the reflected beams which pass through this point as they appear in a static coordinate system in a plane parallel to the rotational axis X,Y. In the static coordinate system illustrated in FIG. 10(b), point 122 is in a static position in the rotating coordinate system of FIG. 10(a) which appears in FIG. 10(b) as a clockwise rotating point whose positions corresponding to the time differences ΔT= 0, ΔT126 and ΔT127 are indicated as points 130, 131 and 132. The polygon which rotates in such a coordinate system and the incident beam which is static in such a coordinate system are not shown. The points 130, 131 and 132 are located on a circle 133 which is the top projection of the circle produced by the movement of imaged intersection-point 106. Beams 134, 135 and 136 are the projections of reflected beams 116, 117 and 118, respectively, in FIG. 10(a). The position of points 130, 131 and 132 on circle 133 is indicated by the angles 137 and 138 which are measured between the radius of circle 133, relative to axis X. Angles 137 and 138 equal angle 123 and 124, thus:

Angle 137= Ω100×ΔT127

Angle 138= Ω100×ΔT126

The relative orientations indicated by the angles 140 and 141 which are located between the radius which passes through points 130, 131 and 132 and their corresponding projected beams 134, 135 and 136 is the same as the relative orientations between point 122 and the reflected beams 116, 117 and 118 which are indicated by the angles 123 and 124. Since angles 137 and 138 also equal angles 123 and 124, respectively, it is clear that angle 137 equals angle 141 and that angle 138 equals angle 140.

From the illustration of FIG. 10 and the above description, the following relationships are derived:

(a) The imaged intersection point rotates with the polygon along a circle with the same angular velocity of the polygon.

(b) The angle formed between the radius of the circle along which the imaged intersection points move (and which passes through these intersection points) and the corresponding projection of their reflected beam (which also passes through this point in a plane parallel to rotational plane X,Y) equals the rotational angle of the polygon which is measured between the radius passing through the moving imaged intersection point and the X coordinate.

(c) The optical path between the origin of the incident beam and the imaged intersection point equals the distance between the origin of the incident beam and the imaginary original intersection point on the rotational axis of the polygon. This distance remains constant all along the scanning.

FIG. 11—Geometrical Relationships between the Imaged Intersection Points and the Mirror System of the Polygon Side Which Produces Them FIG. 11 illustrates an original intersection point which is imaged by a side of rotating polygon consisting of two reflecting mirrors. Part (a) of FIG. 11 illustrates in perspective the rotating polygon, the incident beam which hits the polygon and the reflected beam in a rotating coordinate system which rotates around its Z coordinate and which also serves as the rotational axis of the polygon. Part (b) of FIG. 11 is a top view of the last intersection point which is imaged by the polygon as it appears in a plane parallel to rotational plane X,Y in a static coordinate system.

Figure 11A:
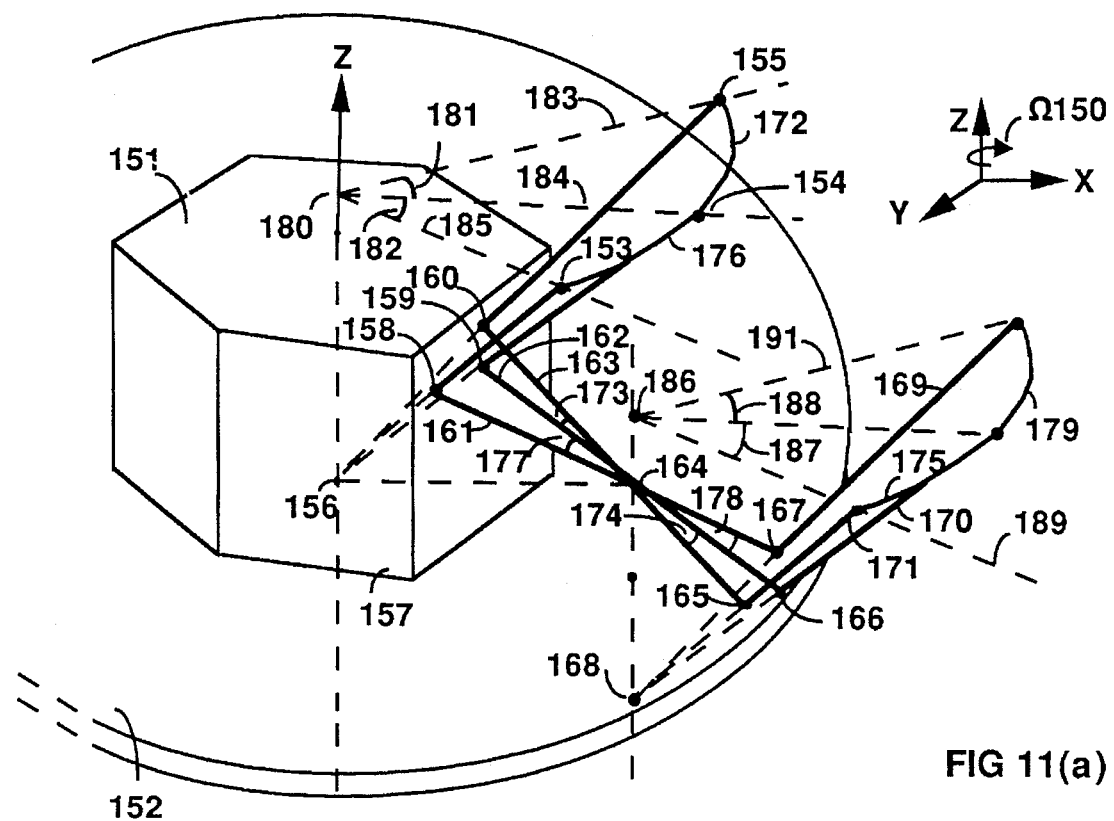
FIGS. 11(a)–(b) show geometrical relationships between original intersection point, its images and the mirrors that produce the images.

The coordinate system in FIG. 11(a) rotates clockwise around its Z axis at the same angular velocity Ω150 as that of polygon 151 around the same axis Z which serves also as the rotational axis of the polygon. The polygon 151 consists of a conventional polygon having six sides which are combined with a reflecting surface which rotates with the polygon and is parallel to the rotational plane X,Y and is perpendicular to axis Z. The polygon 151 appears stationary in this rotating coordinate system. The incident beam which is stationary in a static coordinate system appears as a rotating beam which rotates counterclockwise with the same angular velocity Ω150.

The incident beam is shown in different positions 153, 154 and 155 corresponding to different times which are related to their corresponding positions of the polygon when it rotates in a static coordinate system. Incident beams 153, 154 and 155 are all aligned toward axis Z and their extensions pass through imaginary original intersection point 156. Incident beams 153, 154 and 155 hit the polygon facet 157 at point 158, 159 and 160, respectively, and are reflected from facet 157 as reflected beams 161, 162 and 163. Reflected beams 161, 162 and 163 all pass through the imaged intersection point 164. Beams 161, 162 and 163, after passing through intersection point 164, continue to propagate and hit mirror 152 at the corresponding points 167, 166 and 165, respectively. The real intersection point 164, which is the image of the original imaginary intersection point 156, serves as an original intersection point for mirror 152 which images this point into imaginary intersection point 168. The beams 169, 170 and 171 which are reflected from the corresponding points 165, 166 and 167, respectively, are all aligned toward the intersection point 168 and their extensions pass through this point. Mirror 152 is the perpendicular bisector of the interval between points 164 and 168. This interval is also the base of the isosceles triangles defined by the groups of triple points 164,168,165, 164,168,166 and 164,168,167. Simple geometrical relationships indicate that angles 172 between beams 154 and 155, angles 173 and 174 between reflected beams 162 and 163 and angle 175 between beams 171 and 170 all equal each other. Similarly, angles 176 between beams 153 and 154, angles 177 and 178 between reflected beams 161 and 162 and angle 179 all equal each other. Mirrors 157 and 152 are placed in 90° to each other and operate as retro-reflectors that reflect beams 169, 170 and 171 parallel to their corresponding incident beams 153, 154 and 155, respectively. In this situation, point 180, angle 181 between line 183 and 184 and angle 182 between lines 184 and 185 which are projections of point 156 and angles 172 and 176 onto a plane parallel to rotational plane X,Y are equivalent to point 186, angle 188 between lines 190, 191 and angle 187 between lines 189 and 190 which are the projection of point 164 and angles 178 and 174 onto a plane that is parallel to rotational plane X,Y. If the time differences which it takes the polygon 151 to rotate between two positions (in a static coordinate system) which correspond to the difference which it takes for polygon 151 to rotate between the two positions correspond to the positions between incident beams 154, 155 is ΔT192 and the time differences which it takes for polygon 152 to rotate between two positions correspond to the positions between incident beams 153 and 154 is ΔT193 then the following mathematical relationships are satisfied:

Angle 181= angle 187= Ω150×ΔT192

Angle 182= angle 188= Ω150×ΔT193.

All intersection points 156, 164 and 168 are static in the rotating coordinate system of FIG. 11(*a*) and there is no relative movement between these points and polygon 152. FIG. 11(*b*) is a top view as it is projected onto a plane which is parallel to rotational plane X,Y in a static coordinate system X,Y,Z which illustrates the projection of imaginary intersection point 168 (in FIG. 11(*a*)) in different positions corresponding to different positions of the rotating polygon 151 (not shown). Point 200 is the projection of coordinate Z which is also the rotational axis of the rotating polygon 151 in FIG. 11(*a*). Point 200 is the center of circle 201 along which points 202, 203 and 204 move. Points 202, 203 and 204 move with the same angular velocity Ω150 of polygon 151 and they indicate the position of the last imaged intersection point 168 in FIG. 11(*a*). Intersection point 168 is the point as to which all the beams which are reflected out of polygon 151 are aligned and its location is illustrated in a static coordinate system X,Y,Z in FIG. 11(*b*) by points 202, 203 and 204.

Lines 205, 206 and 207 are the projections of lines along which beams 169, 170 and 171 in FIG. 11(*a*) propagate. Angles 208 between radii 210 and 211 and angle 209 between radii 211 and 212 which are measured relative to coordinate X represent the location of points 202, 203 and 204 and equal angles 188 and 187 and also equal the rotational angles of the polygon corresponding to their positions. The same relative orientation between point 186 and lines 189, 190 and 191 indicated by angles 187 and 188 in FIG. 11(*a*) exist between points 202, 203 and 204 and the lines 205, 206 and 207 which pass through them, respectively. Thus angle 213 between radius 210 and line 205 equals angle 188 (in FIG. 11(*a*)) and angle 214 between radius 212 and line 207 equals angle 187 (in FIG. 11(*a*)).

Since angles 208 and angle 213 equal angle 188 they equal each other and since angles 209 and angle 214 equal angle 187, they equal each other. These relationships indicate that in a plane parallel to rotational plane X,Y the following relationships are satisfied: (a) the imaged intersection points rotate with the polygon along a circle with the same angular velocity of the polygon. (b) The beams which are reflected are oriented relative to the radius which passes through this point with an angle which equals the rotational angle of the polygon.

For achieving several important objects of the invention such as maintaining linear relationships between the angular velocities of the polygon and the scanning spot and maintaining constant optical length between the origin of the incident beam and the scanning spot, it is necessary to satisfy certain conditions which are derived from the previous discussion including FIGS. 8–11 and their descriptions. The conditions which have to be satisfied can be derived by two complementary analyses. The first is based on part (a) of FIGS. 8, 10, 11 and their descriptions and the second is based on part (b) of FIGS. 10 and 11.

According to the first analysis the original cone-like shape which the incident beam produces during its rotation in a rotating coordinate system as illustrated in FIG. 8(*a*) wherein its corner lies on the rotation axis and having circular base in a plane parallel to the rotational plane X,Y is imaged by the sides of the rotating polygon.

Each side of the polygon consists of a mirror system and each mirror in this system images the cone shape into another orientation as demonstrated in FIGS. 10(*a*) and 11(*a*). The imaging of the cone shape into another orientation also shifts the corner of the cone. The corner of the cone is the intersection point and the way that it is imaged is illustrated in FIG. 9. The first mirror in the mirror system of the polygon side crosses the optical path of the incident beams on their propagation path which is oriented toward the corner of the original cone (intersection-point) located on the polygon rotational axis. According to the present invention, in certain designs of the mirror system of the polygon sides the orientation of the imaged cones changes and the shift displacement of their corners performed by the mirrors system results in the following situations: (a) The last position of the cone-corner as it is reflected out of the polygon from the last mirror in the mirrors system of the polygon side is placed back onto the rotational axis of the polygon. (b) The last orientation of the last cone as it is reflected out of the polygon form the last mirror in the mirrors system of the polygon side is aligned parallel to the orientation of the original cone which is produced by the incident beams. Or it is aligned symmetrically to the original cone orientation with respect to a plane which is parallel to the rotational plan X,Y.

When these conditions are satisfied, the cone base of both the original and the last cone is circular in a plane which is parallel to rotational plane X,Y and in these configuration the optical path from the center is constant. The scanning speed in static coordinate system is the sum of the angular velocities of the beam on the surface of the last cone which is reflected out of the polygon (as shown in FIG. 10(*a*) and 11(*a*) in rotating coordinate systems) and the angular velocity of the polygon (that is in static position in FIGS. 10(*a*) and 11(*a*). These two angular velocities equal each other, thus the scanning speed is twice the rotational speed of the polygon as it is done by a mirror mounted directly on the axis of rotation. When the last cone which is reflected out of the polygon is aligned parallel to the original cone the mirror system of the polygon side behaves effectively as a mirror which is mounted directly on the rotational axis with an additional vertical displacement. If the last cone is aligned symmetrically to the original cone with respect to a plane parallel to rotational plane X,Y this side of the polygon behaves effectively as a mirror mounted directly on the rotational axis without any vertical displacement.

In this configuration the polygon maintains constant optical path between the original point of the incident beam and the location of the scanning point and a linear relationship exists between the angular velocity of the polygon which is half of the rotational speed of the scanning spot.

Another version of a design which also maintains constant optical path all along the scan and also satisfies linear relationship between the rotational speeds of the polygon and the scanning spot, is achieved by appropriate design of the mirrors system of the polygon side. In this design the last cone which is reflected out of the polygon is placed in a position such that the center of its circular base is imaged on the rotational axis of the polygon and its corner (intersection point) lies on the scanned circle (cylinder). The scanning speed in this version equals the rotational speed of the polygon. This scanning version is also illustrated in FIG. 12.

Figure 11B:
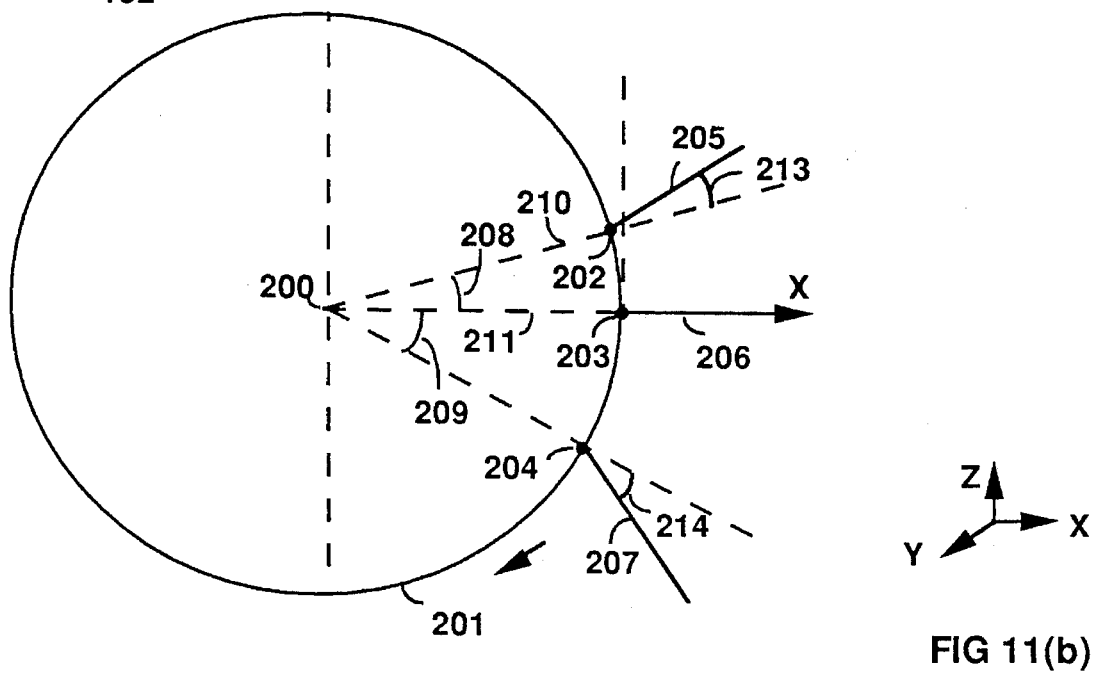

The second analysis is based on FIGS. 10(*b*) and 11(*b*). In these Figures the scanning/tracking beams and the intersection points are illustrated in a plane parallel to rotational plane X,Y. According to these figures, for certain designs carried out according to the present invention, the intersection point which is imaged by the last mirror in the mirrors system of the polygon side is placed in the center of the rotational axis of the polygon and has a constant distance to any circle around it. The imaged intersection point in the center spins around itself in the same angular velocity of the polygon. The scanning beam passes through this point and is oriented relative to this spinning point at an angle which equals the rotational angle of the polygon. Thus, the rotational angle of the scanning beam is twice the rotational angle of the polygon and the mirror system of the polygon side behaves effectively as a mirror which is mounted directly on the axis of rotation as illustrated in FIG. 12. The other version of scanning a circle with the same angular velocity of the polygon is very simple, all that is needed is to adjust the radius of the scanned circle to coincide with the circle along which the intersection point moves as illustrated in FIGS. 10(b) and 11(b).

FIG. 12—Geometric Relationships Satisfied According to the Present Invention FIG. 12 illustrates in parts (a), (b) and (c) the first and the last mirror of a mirror system of polygon side and the incident and scanning beam in a rotating system having angular velocity which equals the polygon's rotating speed (in static coordinate system), similar to the coordinate system in FIGS. 10(a) and 11(a). FIG. 12(d) illustrates the scanning beam in rotational plane (or plane parallel to it) in static coordinate system similar to the illustrations in FIGS. 10(b) and 11(b).

Figure 12A:
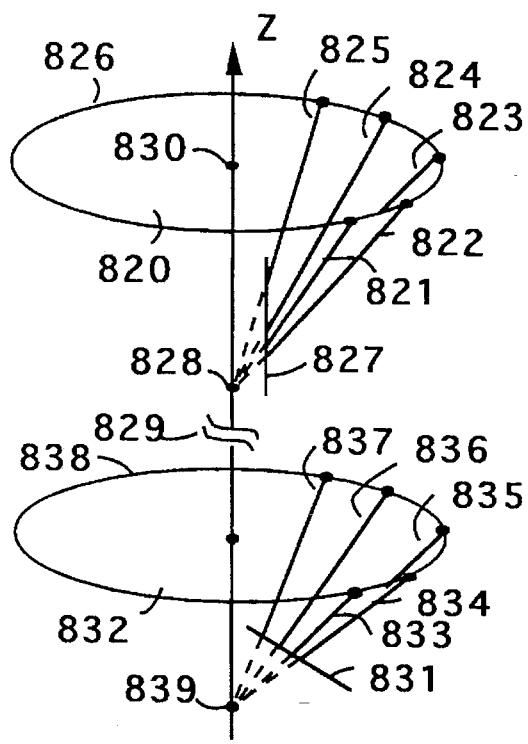
FIGS. 12(a)–(d) show geometrical relationships satisfied according to the present invention.

FIG. 12(a) illustrates the original cone 820 which is produced by the incident beam which appears as a rotating beam in a rotating coordinate system. The different positions of the rotating incident beam are indicated as beams 821–825 located on part of the surface of cone 820 and their position corresponding to the rotation angle of the polygon as it appears in a static coordinate system. The base of the cone is a circle 826 located in a plane parallel to rotational plane (X,Y). The center 830 of circle 826 lies on the Z axis around which the coordinate system rotates, and which serves also as the rotational axis of the polygon in a static coordinate system.

All the incident beams hit the first mirror 827 and are aligned toward the cone corner 828 (original intersection point) which their extensions pass through. The beams which are reflected from mirror 827 are not shown and all the rest of the mirror system of the polygon side are also not shown except for the last mirror. The mirrors of the polygon side which are not shown and the images of the cone which they produce which are also not shown are indicated in the drawing as the missing part 829. The last mirror 831 reflects the last image of the cone which is produced by the scanning beam which appears as rotating beam in the rotating system. The different positions 837–833 of the scanning beams correspond to the positions 821–825 of the incident beam. Cone 832 is aligned parallel to cone 820 and its base is also a circle 838 in a plane parallel to rotational plane X,Y. The center of circle 838 and the cone corner 839 (last intersection point) which all the extensions of the scanning beam 833–837 that are reflected out of the polygon pass through lie on the rotational axis Z.

In this configuration, the scanning spot moves along a circle and its distance from the axis of rotation is fixed (equivalent to a constant optical path). The incident beam has the same angular velocity as the scanning but at a different direction. The incident beam rotates at the same speed as the polygon (in a static coordinate system) but in opposite direction while the scanning beam rotates with the same speed and direction as the polygon (in static coordinate system).

Figure 12B:
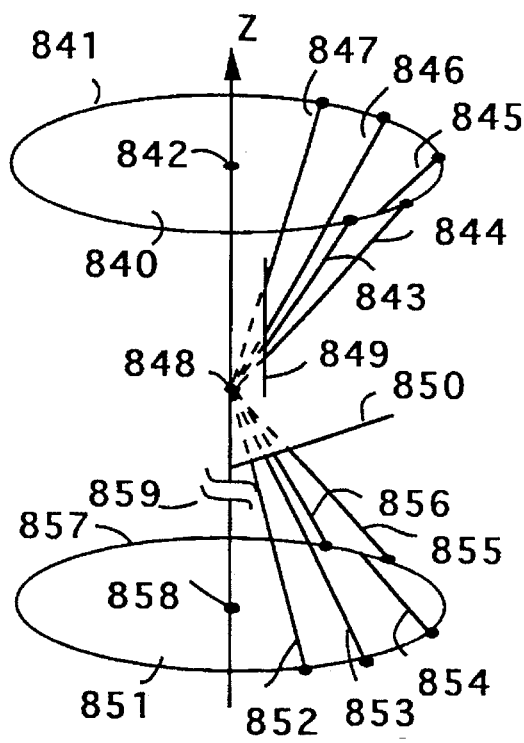

To analyze the way in which the beams behave in a static coordinate system, the angular velocity of the rotating system (which equals the polygon speed in its value and direction) has to be added to each of them. In this situation, the incident beam has zero angular velocity and is in a static position (as expected) and the angular velocity of the scanning beam is twice the angular velocity of the polygon. This linear relationship between the scan speed and the polygon speed is similar to effective scanning done by a mirror which is mounted directly on the rotational axis. The scan of the mirror system of the polygon side differs from the scan of a mirror mounted directly on the rotational axis in its additional vertical displacement which equals the distance between the corners 828 and 839 of the cones 820 and 832 respectively (the distance between the original intersection point and the last imaged intersection point). FIG. 12(b) illustrates an original cone 840 having circular base 841 (in a plane parallel to rotational plane X,Y) whose its center 842 is located on rotational axis Z. The positions 843–847 of the incident beam corresponding to the rotational positions of the polygon (in static coordinate system) are located on part of the surface of the original cone 840. Incident beams 843–847 are all aligned toward the cone corner 848 (original intersection point) and hit the first mirror of the mirrors system of the polygon side. Only the first and the last mirror 849 and 850, respectively, of the polygon side are shown. The rest of the mirrors and the images of the original cone which they produce are not shown and they are represented by the missing part 859.

The last imaged cone is reflected out of the polygon from the last mirror 850 in the mirrors system of the polygon side. The scanning beam in all its positions 856–852 corresponding to the positions 843–847 of the incident beam, respectively is oriented toward the cone corner 848 (original and last imaged intersection point) on rotational axis Z. Cone 851 is aligned symmetrically to original cone 840 with respect to a plane parallel to rotational axis X,Y and thus also have in such plane a circular base 857 whose its center 858 lies on rotational axis Z. In this case the same consideration and analysis carried out for the last image cone 832 in FIG. 12(a) are valid for the last imaged cone 851 in FIG. 12(b) and thus the scanning beam in this case also maintains constant optical path between the origin of the incident beam and the scanning spot on circle 857. Also, the same linear relationships exist between the angular velocity of the scanning spot which is twice the rotational speed of the polygon. In the situation of FIG. 12(b) the two cones share the same corner (original intersection point and last imaged intersection point are in the same point) and thus the mirror system of the polygon side behaves effectively as a mirror mounted directly on the axis of rotation without vertical displacement.

It is clear that in a situation where the side system of the polygon behaves effectively as a mirror mounted directly on rotational axis (with or without vertical displacement) the following relationships exist for every beam (not necessarily directed toward the original intersection point:

(a) The scanning beam rotates at twice the rotational speed of the polygon;

(b) The length of the optical path between the origin of the incident beam and the scanning point does not change during the scan.

Figure 12D:
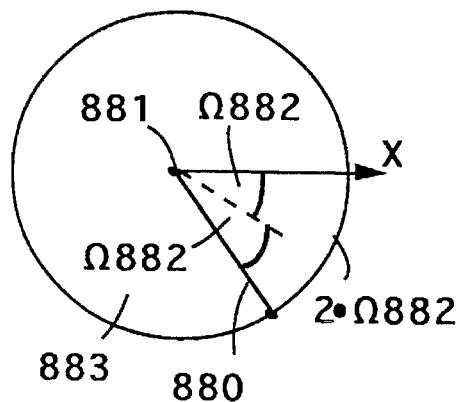
Figure 12C:
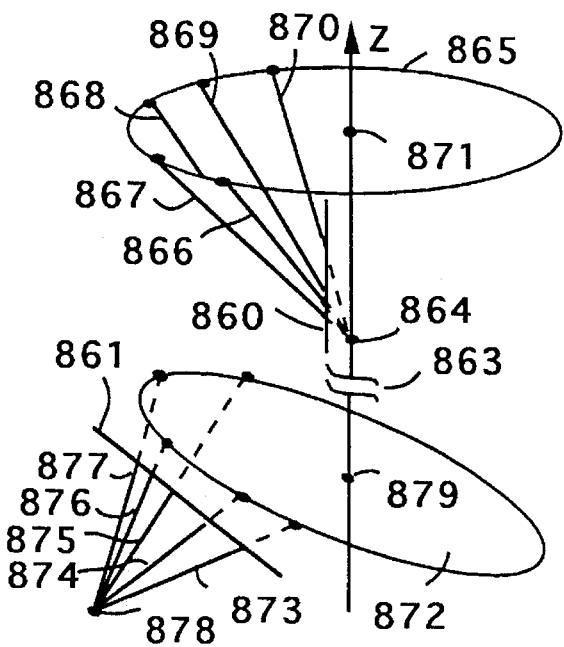

FIG. 12(c), similar to FIGS. 12(a) and (b), also illustrates only the first mirror 860 and the last mirror 861 of the mirror system of the polygon side. The rest of the mirrors and the images of the cones which they produce are also not shown and are represented by the missing part 863. The original cone is similar to the original cones in FIGS. 12(a) and (b) and consists of corner 864 (original intersection point), circular base 865 in a plane parallel to rotational plane X,Y and incident beam in different positions 866–870. The center 871 of circle 865 is located on rotational axis Z.

The last imaged cone is reflected out of the polygon by the last mirror 861 of the mirrors system of the polygon side. The scanning beam whose different positions 873–877 correspond with the positions 866–870 of the incident beams lies on the surface of cone 872 and are all aligned toward the cone corner 878 and path through this point while producing a real intersection point 878. In this rotating system this real intersection point 878 is a static point whose distance to the center of the cone base 879 which lies on the rotational axis Z is fixed. The tilted angle of the cone 872 equals the angle between axis Z and the plane in which the base of the cone is circular. In a static coordinate system the intersection point 878 rotates with the polygon with the same speed and direction and serves as a scanning point which moves along a scanned circle while maintaining constant optical path all along the scan.

FIG. 12(d), similar to FIGS. 10(b) and 11(b), illustrates the scanning beam 880 in a top view as it is projected onto a plane parallel to rotational plane X,Y in a static coordinate system. In this plane the rotational axis Z, the original intersection point (the corner of the original cone in FIGS. 12(a) and (b) and the last imaged intersection point (the corner of the last imaged cone which is reflected out of the polygon in FIGS. 12(a) and (b)) are all located at point 881. Point 881 is the center of the scanned circle 883 which is the projection of the base of the last imaged cone in FIGS. 12(a) and (b). As previously discussed in FIGS. 10(b) and 11(b), the intersection point rotates at the same angular velocity of the polygon. In this situation the intersection point is located on the axis of rotation so that its rotation appears as spinning around itself at a spinning speed $\Omega$882 which equals the rotation speed of the polygon.

The scanning beam passes through this intersection point and rotates around it at relative speed which equals $\Omega$882. Thus the rotation speed of the scanning beam relative to a static reference, such as the X axis, is the sum of these two angular velocities and equals 2×$\Omega$882—twice the angular velocity of the polygon. The distance between the scanning point and the center of the scanned circle 883 (equals the projection of the optical path on the drawing plane) is constant all along the scan. The constant optical path all along the scan with the additional scanning speed which is twice the rotational speed of the polygon is effectively like the scan of a mirror mounted directly on the axis of rotation.

FIG. 13—Examples of Polygons Designs Derived According to the Present Method Shown in U.S. Pat. Nos. 5,184,246 and 5,177,632

FIG. 13 includes three parts (a), (b) and (c) which illustrate three types of polygons in side view cross section. The polygons illustrated in parts (a) and (b) are according to the invention described in our above U.S. Pat. No. 5,184,246 for producing effective scan like a mirror which is mounted directly on rotational axis Z and are given as examples to demonstrate how these designs of the polygons can be derived according to the different method of the present invention.

The polygon illustrated in part (c) of FIG. 13 is according to the invention described in U.S. Pat. No. 5,177,632 for producing scan at the rotational speed of the polygon while maintaining a fixed optical path and is given as an example to demonstrate how this design of the polygon can also be derived according to the different method of the present invention. The description of FIG. 13 is based on the principles described above regarding the imaging of the intersection points. Since all the beams pass through the intersection points, it is sufficient to illustrate only the optical path of one beam and the corresponding intersection points resulting in drawing that are easy to understand.

FIG. 13(a) presents the most useful design of a polygon according to the invention described in our above U.S. Pat. No. 5,184,246. The mirror system of the polygon consists of a side mirror which is tilted in an arbitrary angle $\alpha$ with a secondary mirror which is placed at right angle to it and their planes intersect in a line which passes through the rotational axis Z of the polygon 892. Incident beam 890 is oriented toward the original intersection point 891 on rotational axis Z of the polygon 892. Beam 891 is reflected from mirror 893 as beam 894 and passes through real intersection point 895 which is the image of the original intersection point 891. Beam 894 is reflected as scanning beam 897 from point 889 on secondary mirror 896 and its extension passes through imaginary intersection point 898 located on rotational axis Z of the polygon. The planes of side mirror 893 and its secondary mirror 896 intersect in point 899 on the rotational axis of the polygon. According to the analysis given above for FIG. 9, side mirror 893 and its secondary mirror 896 are perpendicular bisectors of the intervals between intersection point 891,895 and 895,898 and they are also the angle bisectors of angles 895,899,891 and 895,899,898 respectively. Thus, angle 895,899,891 equals twice the tilted angle $\alpha$ of the side mirror 893 and angle 895,899,898 equals 180–2$\alpha$.

Since mirrors 893 and 896 are the angle bisectors of angles 895,899,891 and 895,899,898, respectively, the angle between these mirrors equals 90°, half of the sum of angles 895,899,891 and 895,899,898 which equals 180°, exactly as it is indicated in our above U.S. Pat. No. 5,184,246. One of the conditions according to the present invention as discussed for FIG. 12(a), i.e., that the last imaged intersection point lies on the rotational axis of the polygon is achieved as described above by placing the side mirror and its secondary mirror at a right angle where their planes intersect in a line which passes through axis Z and is vertical to this axis. The additional condition which has to be satisfied, i.e., that the scanning beam 897 has to have the same angle as the incident beam 890 relative to a plane that is parallel to rotational plane X,Y, is achieved automatically since mirrors 893 and 896 are placed at right angles and operate as a retro-reflector which produces the vertical displacement between points 891 and 898.

The mirrors in the system illustrated in FIG. 13(a) produce a right angle retro-reflector which demonstrates a very important principle which will be used later. According to the discussion above it is clear that there is a geometrical place defined as the line (axis Z) which passes through the intersection point (891) of the incident beam (890) and the cross section point (899) between the mirrors' plane of the retro-reflector. In a side view projection, the incident beam (890) having an intersection point (891) which lies on this line (axis Z) is reflected out of the retro-reflector as a reflected beam (897) oriented parallel to the incident beam (890). The reflected beam (897) is aligned along a line which passes through the hitting point (from where this beam is reflected out) and through an imaged intersection point (898) located on the above defined line (axis Z).

FIG. 13(b) illustrates another useful design of polygon according to the invention described in our above U.S. Pat. No. 5,184,246 each of whose sides produces a scan like that of a mirror mounted directly on rotational axis Z of the polygon which, unlike the polygon illustrated in FIG. 13(a), has no vertical displacement. The polygon 900 has side mirror 901 which is tilted in 45° with respect to rotational axis Z of polygon 900. All the secondary mirrors of the polygon are at a right angle to axis Z and produce a plane 902 that is parallel to the rotational plane X,Y. All the polygon mirrors intersect in a common point 903 which lies on the axis Z. Incident beam 904 is reflected from mirror 901 as beam 906 which passes through the real intersection point 907 which is the image of the original intersection point 905. Mirror 901 is tilted at a 45° angle which is half of the right angle between the axis Z which intersection point 905 lies on and reflecting plane 902. Thus mirror 901 is the angle bisector of angle 905,903,907.

According to the analysis for FIG. 9, the imaged intersection point 907 is located on plane 903. Beam 906 is reflected from intersection point 907 on mirror 902 as beam 908 which again hits mirror 901 and is reflected out of the polygon 900 as scanning beam 909. The extension of scanning beam 909 passes through the image of intersection point 907 which is produced by mirror 901 back on the original intersection point 905 located on rotational axis of the polygon 900. From simple geometrical relationships it is easy to prove that incident beam 904 and scanning beam 909 are oriented symmetrically to a plane which is parallel to rotational plane X,Y which is vertical to axis Z. These relationships are not discussed here for this specific case since a general discussion is given later for general situations which include this specific case.

Thus, the two conditions that have to be satisfied according to the method in the present invention as discussed for FIG. 12(b), i.e., the last imaged intersection point is located on rotational axis of the polygon and that the incident beam and the scanning beam are oriented symmetrically with respect to a plane parallel to rotational plane X,Y, are achieved. The incident beam 904 and the scanning beam 909 pass through a common intersection point 905, so the side mirror of the polygon 900 behaves effectively as a mirror mounted directly on the rotational axis of the polygon and produces the scan without vertical displacement.

FIG. 13(c) illustrates a side view of a cross section of a polygon designed according to the invention described in our above U.S. Pat. No. 5,177,632. Such design, as will be demonstrated, can also be derived according to the different method of the present invention. Polygon 920 has a rotational axis Z and side mirror 921. Incident beam 922 is oriented toward original intersection point 923 located on axis Z. Incident beam 922 is reflected out of the polygon by mirror 921 as scanning beam 924 which passes through the imaged intersection point 925. Point 925 is the image of point 923 produced by mirror 921 and serves as the scanning point as illustrated in FIG. 12(c).

According to the analysis corresponding to FIG. 9, mirror 921 is the perpendicular bisector of the interval between points 923,925. Thus the scanned circle along which point 925 moves as scanning point has a radius which is twice the distance between axis Z and mirror 921 exactly as indicated in U.S. Pat. No. 5,177,632.

The discussion above for FIG. 13 proves that according to the different present method, several specific designs of the invention described in our above U.S. Pat. No. 5,184,246 are derived and also the design of the invention described in our above U.S. Pat. No. 5,177,632 is derived. The following discussion for FIG. 14 demonstrates that also the general relationships which are indicated in U.S. Pat. No. 5,184,246 are derived according to the present method and these relationships are only a part of the possible designs according to the present method which is much wider and general than the combined methods described in U.S. Pat. Nos. 5,184,246 and 5,177,632.

The general relationships indicated in U.S. Pat. No. 5,184,246 state, as previously discussed, that each side of a polygon having sides including side mirrors and secondary mirrors all of whose planes intersect in one common point on rotational axis of the polygon and satisfied the mathematical formula:

$$\beta + \alpha/n$$

where $\alpha$ is the angle between rotational axis and the sides mirrors, $\beta$ is the angle between the sides mirror and their secondary mirrors and n is an integer number 1,2,3, . . . , produces a scan like a mirror mounted directly on rotational axis.

Figure 14A:
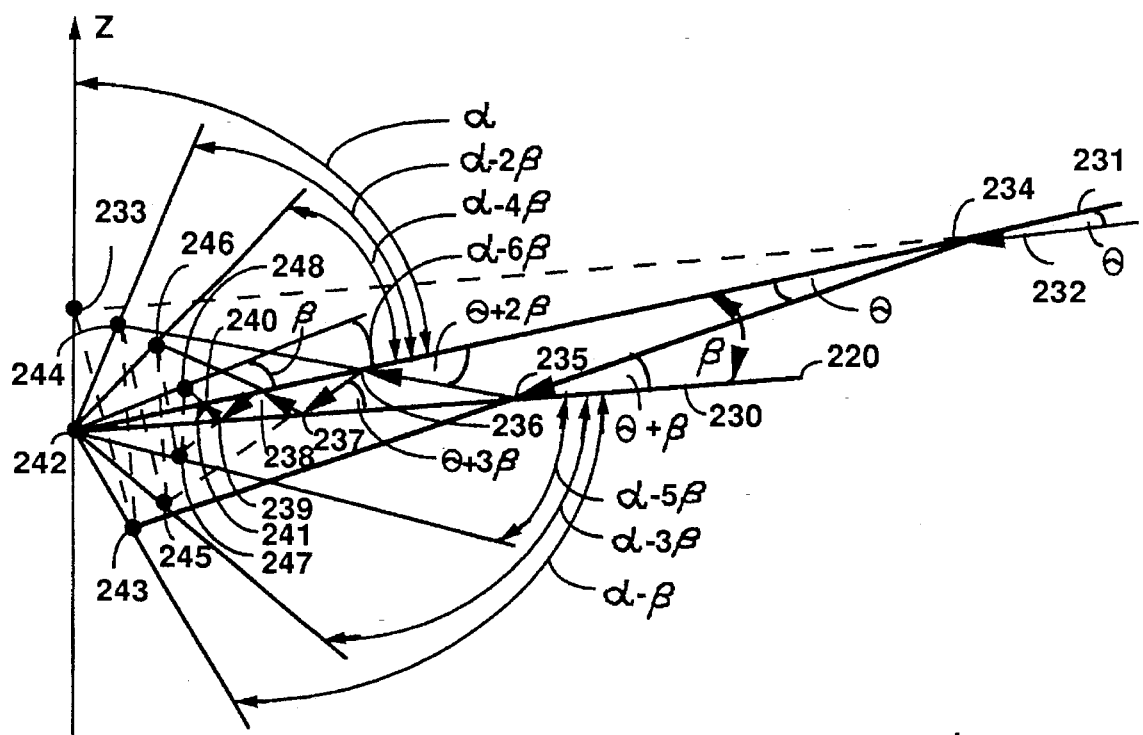
FIGS. 14(a)–(c) depict a general design shown in U.S. Pat. No. 5,184,246 of polygons derived according to the present invention as a specific case demonstrating it.
Figure 14C:
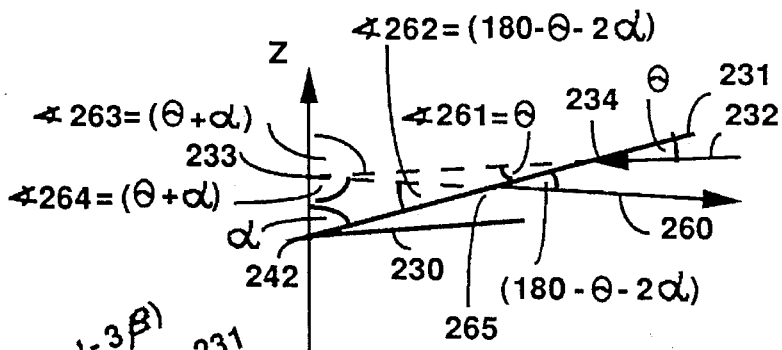
Figure 14B:
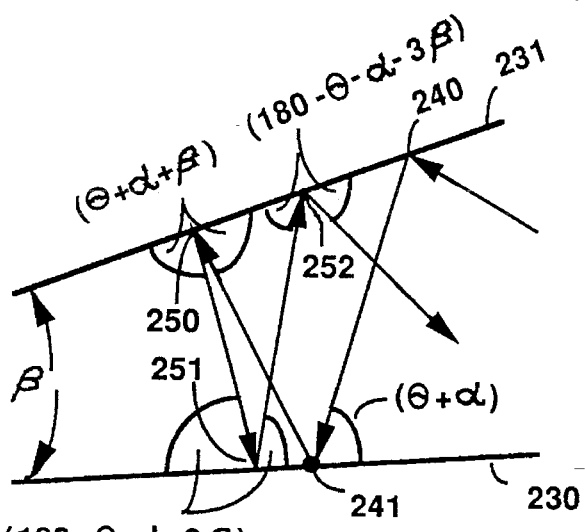

FIG. 14—General Design of Polygons Derived
According to the Present Method as a Specific
Case Demonstrating It Shown in U.S. Pat. No.
5,177,632

FIG. 14(a) illustrates a mirror system consisting of two mirrors 230 and 231 that are placed at an angle $\beta$ between them as shown in our above U.S. Pat. No. 5,284,246 patent. Mirror 231 is tilted at an angle $\alpha$ with respect to axis Z. Incident beam 232 is oriented toward the original intersection point 233 on axis Z and hits mirror 231 at point 234 at an angle $\theta$. The beam that is reflected from mirror 231 hits mirror 230 at point 235 and from there it continues to propagate by multiple internal reflections between mirror 230 and 231 that are intersect at a point 242 which is located on axis Z. The beams that propagate by the internal reflections between the mirrors hit mirror 231 at points 234, 236, 238 and 240 and hit mirror 230 at points 235, 237, 239 and 241. Beam 232 that hits mirror 231 at an incident angle $\theta$ is reflected from this mirror at point 234 at a reflected angle $\theta$ which equals the incidents' angle and then hits mirror 230 at an incident angle 234,235,220. Angle 234,235,220 is an outer angle of triangle 234,235,242 and thus equals the sum of the opposite angles 235,242,234 and 235,234,242 of triangle 234,235,242. Angle 235,242,234= $\beta$ and angle 235,234,242= $\theta$, thus angle 234,235,220= $\theta+\beta$. Similar to this analysis it is easy to see that each time that the beam hits one of the mirrors 230 or 231, its incident angle with the hit mirror increases by the amount of the angle $\beta$ between mirrors 230 and 231. Accordingly, the incident angles at points 234,235,236,237,238,239,240 and 241 are $\theta$, $\theta+\beta$, $\theta+3\beta$, $\theta+4\beta$, $\theta+5\beta$, $\theta+6\beta$, $\theta+7\beta$, respectively. The beam that propagates by internal reflections is always aligned along a line that passes through one of the intersection points. For any hit and reflection at any point on mirror 230 or 231, the incident beam is aligned along a line that passes through the hitting point and the corresponding intersection point. The beam that is reflected from this hitting point is aligned along a line which passes through the hitting point and the imaged intersection point produced by the hit mirror while the previous intersection point that the incident beam is oriented to serves as an object (original intersection point) that its image which is produced by the hit mirror is the imaged intersection point that the reflected beam is oriented to. For example, incident beam 232 that hits mirror 231 at hitting point 234 is aligned along a line which passes through hitting point 234 and original intersection point 233 on axis Z.

The beam that is reflected from hitting point 234 is oriented along a line which passes through hitting point 234 and intersection point 243 which is the image of original intersection point 233 produced by the tilted mirror 231. The beam that is reflected from hitting point 234 is the incident beam for hitting point 235 and thus is reflected along a line which passes through hitting point 235 and intersection point 244 which is the image of point 243 that serves as an original intersection point (object) for the hit mirror 230 that produces the imaged intersection point 244. It can be seen that in general, the reflected beam is oriented along a line which passes through the hitting point on the mirror and the imaged intersection point. The imaged intersection point is the image of the intersection point which the incident beam is aligned along the line passing through this intersection point and the hitting point on the hit mirror that produces the imaged intersection point. Thus, for any internal reflection of the beam that propagates between mirror 230 and 231, there exists a corresponding intersection point that is produced by the hit mirror. According to the analysis for FIG. 9, the mirror that images an intersection point is the angle bisector of the angle between the intersection point, a point on the mirrors' plane (point 242) and the imaged intersection point produced by the mirror. The angles between intersection points 233 and 243–248 are measured with respect to point 242 that is the cross section point between the planes oaf mirror 230 and 231. Accordingly, the angle between intersection point 233 (corresponding to hitting point 234) and mirror 231 (angle 233,242,234) equals the angle between this mirror and the imaged intersection point 243 (corresponding to hitting point 235) that it produces (angle 243,242,234) and both of these angles equal angle $\alpha$. Intersection point 243 (corresponding to hitting point 235) having angle 243,242,235 equals $\alpha-\beta$ with mirror 230 that produces its image as intersection point 244 (corresponding to hitting point 236) having an angle 244,242,235 with this mirror that also equals $\alpha-\beta$. Intersection point 244 having an angle 244,242,234 equals $\alpha-2\beta$ with mirror 231 which produces its image as intersection point 245 having an angle 245,242,234 also equals $\alpha-2\beta$. Intersection point 245 having an angle $\alpha-3\beta$ with respect to mirror 230 and is imaged by this mirror that produces its image 246 that have an angle 246,242,235 also equals $\alpha-3\beta$. Image 246 having an angle $\alpha-4\beta$ with respect to mirror 230 that produces its image as intersection point 247. In general, two important relationships are demonstrated:

(a) The value of the incident angle of the beam that propagates by multiple internal reflections between mirrors 230 and 231 increases in the amount of the angle $\beta$ for each additional internal reflection.

(b) For each internal reflection there exists a corresponding intersection point located on one of the two sides of the mirror system 230 and 231 that the angle between this intersection point and the closest mirror that produces its image as the next intersection point decreases in the amount of the angle $\beta$ for each additional reflection. In other words, the angle between any intersection point and the closest mirror to it is bigger in the amount of angle $\beta$ than the angle between the next intersection point (the image of the previous intersection point) and the closest mirror to it.

In case that the following relationships are valid:

$$\alpha = n\beta$$

where n= 1,2,3 . . . , is an integer number, then the angle between the intersection point and the closest mirror to it is:

$$\alpha - [(n+1)-1)]\beta + \alpha - n\beta = 0$$

which means that the (n+1)th intersection point is located on one of the mirrors 230 or 231. This situation is a turning point in which the imaging from this situation continues in a reverse imaging process which is done in an opposite order, via the same intersection points. For (n+1) more imaging periods starting from the turning point situation, the last intersection point is imaged back on the original intersection point 233 that is located on axis Z. In this case, one of the conditions according to the present method is satisfied. The other condition, i.e., that the incident beam 231 and the beam that is reflected out from the mirror system 230 and 231 are oriented symmetrically with respect to a plane that is vertical to axis Z, is proved in the following discussion for parts (b) and (c) of FIG. 14.

The same numbers are used to illustrate the same features in both the drawing of FIG. 14(a) and (b). The intersection point 241 is located on mirror 230 and correspond to the turning point situation discussed according to FIG. 14(a) above. The turning point situation occurs after (n+1) internal reflections and according to the above discussion the incident angle at the hitting point 241 equals:

$$\theta + [(n+1)-1]\beta = \theta + n\beta = \theta + \alpha.$$

From the hiring point the beam is reflected toward the next hitting point 250. The incident angle and the reflected angle at this hitting point both equal $\theta + \alpha + \beta$. From point 250 the beam is reflected toward hiring point 251 on mirror 230. The sum of the angles in triangle 250,251,242 (point 242 is the cross section point between mirror 230 and 231 that is located on axis Z and is illustrated in FIG. 14(a), but is not shown in this figure) equals 180°, thus the incident and reflected angle at the hitting point 251 equal:

$$180 - (\theta + \alpha + \beta) - \beta = 180 - \theta - \alpha - 2\beta.$$

When $180 - \theta - \alpha - 2\beta$ is less than 90° the beam that is confined between mirrors 230 and 231 changes its direction of propagation and starts to propagate by multiple internal reflections toward the exit between mirrors 230 and 231. It is clear that when the multiple internal reflection mechanism of propagation is done in the opposite direction, then any additional reflection decreases the incident (and the reflected) angle of the next hitting point in the amount of angle $\beta$, thus the incident and reflected angle of hitting point 252 equals $180 - \theta - \alpha - 2\beta - \beta = 180 - \theta - \alpha - 3\beta$. From the turning point situation till the confined beam exits mirrors system 230 and 231 (corresponding to the imaging of intersection point back onto the original intersection point 233 that is located on axis Z) (n+1) reflections take place.

Hitting point 252 is the third reflection after the turning point situation, thus, [(n+1)−3] are left to complete the process. When the process is complete the reflected (incident) angle in which the beam is reflected out of mirrors system 230 and 231 equals the incident (reflected) angle at hitting point 252 minus $\beta$ times the number of reflections left to complete the process and to reflect the beam out of the mirrors system. In this case, the beam is reflected out from the mirrors system at an angle which equals: $[180-\theta-\alpha-3\beta]31$    $[(n+1)-1-3] \times \beta = [180-\theta-\alpha-n\beta] =$

[180−θ−α−α]=180−2α and this reflected beam is oriented toward the last imaged intersection point that is located at the same point of the original intersection point 233 on axis Z.

FIG. 14(c) illustrates the mirrors system 230 and 231 their cross section point 242 located on axis Z, the incident beam 232 that hits mirror 231 at hitting point 234 and is placed at angle θ relative to it. Original intersection point 233 and beam 260 (that is reflected out of the system from hitting point 265 located on mirror 231) are both oriented toward last/original intersection point 233 that is located on axis Z. Beam 260 is placed at an angle 180−θ−2α relative to mirror 232.

Angle 261 equals angle θ. Angle 263 is the outer angle at triangle 242,233,234 and thus equals the sum of angle α and angle 261 which equals θ+α. Angle 262 equals the reflecting angle of beam 260 and thus equals 180−θ−2α. The sum of the angles in triangle 242,233,265 equals 180°, thus angle 264=180−α−[180−θ−2α]=θ+α. In this case angle 263 and 264 are equal which means that incident beam 232 and reflected beam 260 are oriented symmetrically with respect to a plane that is vertical to axis Z. This situation satisfied the second condition according to the present method, thus under the conditions that α=nβ and that the mirrors have a common intersection point on axis Z the whole system behaves effectively like a mirror mounted directly on axis Z, exactly as indicated in our above U.S. Pat. No. 5,184,246 and is derived there by a different method.

It is demonstrated that the polygons designs that are given as examples according to the invention described in U.S. Pat. No. 5,184,246 can also be derived according to the present invention as illustrated in FIGS. 13(a), 13(b) and 14 and their corresponding discussion. As mentioned before, each side of the polygons' design according to U.S. Pat. No. 5,184,246 produces effective scan like a mirror mounted on the rotational axis of the polygon with or without additional vertical displacement. Such polygons suffer from the following disadvantages:

(a) Production difficulties—The requirement that all the mirrors' planes have a common cross section point that is located on the rotational axis of the polygon demands very high precision in the production and for some cases this precision cannot be achieved.

(b) Stability problems—The same requirement mentioned above results in a polygons' structure having a long dimension along the rotational axis of the polygons. The long height of these polygons increases their inertia and amplifies the polygons' vibration and results in difficulties in maintaining stable rotation speed that is vibration free.

The disadvantages of such polygons that are listed above are eliminated while still maintaining their objectives by the improved designs of the polygons that are illustrated in FIGS. 15–18 which are derived according to the present invention.

FIG. 15—Improved Polygon with Reduced Height

Figure 15A:
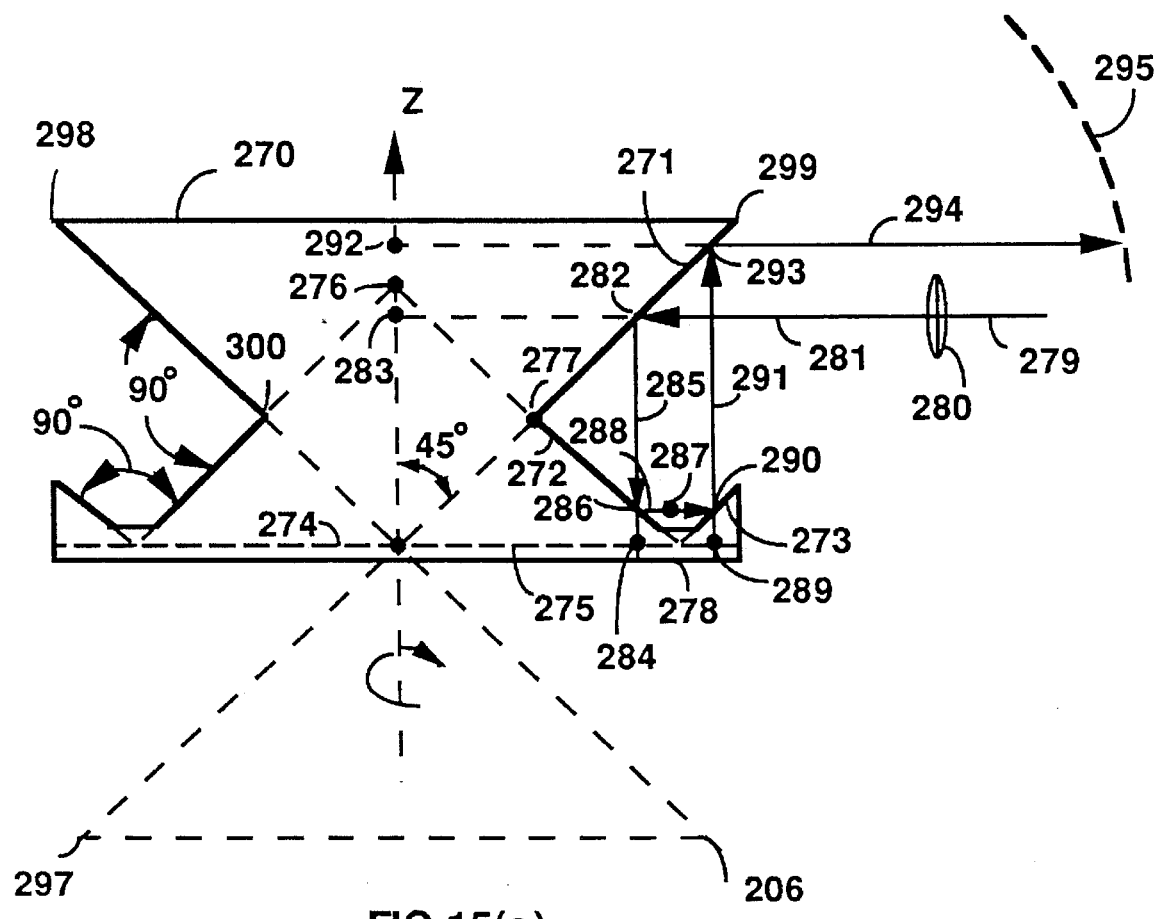
FIGS. 15(a)–(b) show an improved polygon with reduced height.

FIG. 15(a) is a side view cross section of four sides polygon 270 that rotates around its axis Z. The side mirror 271 of the polygon is tilted at an angle which equals 45° with respect to the polygon axis Z. Side mirror 272 is placed at a right angle to mirror 271 and mirror 273 is placed at a right angle to mirror 272. All the planes of side mirrors like mirror 271 intersect at one point located on the cross section point between axis Z and plane 275 that is vertical to axis Z and is parallel to the rotational plane. All the planes of side mirrors like mirror 272 intersect at one point 276 that is located on axis Z. Mirrors 271 and 272 intersect at point 277 and mirrors 272 and 273 intersect at point 278 that is located on plane (line) 275. A parallel incident beam (illustrated only by its chief ray) is converted by focusing lens 280 into a focused beam 281. Beam 281 hits polygon 270 at point 282 on mirror 271. The extension of beam 281 passes through the original intersection point 283 on axis Z. Mirror 271 is the bisector angle of the right angle between axis Z and plane 275 and thus (as illustrated in FIG. 9 and discussed before) it produces the image of original intersection point 283 (located on axis Z) onto plane 275 as an intersection point 284. Beam 281 that is reflected as beam 285 from point 282 on mirror 271 hits mirror 272 at point 286 and is aligned toward intersection point 284. Intersection point 284 is imaged to intersection point 287. Beam 285 is reflected from point 286 on mirror 272 as beam 288 that passes through intersection point 287. Intersection point 287 is imaged into intersection point 289. Beam 288 hits mirror 273 at point 290 and is reflected from this point as beam 291.

According to the general principle regarding retro-reflectors that is derived from FIG. 13(a) it is clear that intersection point 289 lays on plane (line) 275 that passes through intersection point 284 and cross section point 278 between mirrors 272 and 273 and that beam 291 is parallel to beam 285 and is oriented toward intersection point 289 on plane 275. Mirror 271 as the bisector angle between plane 275 and axis Z produces the image of intersection point 289 back onto axis Z as an intersection point 292. Beam 291 hits mirror 271 at point 293 and is reflected from this point out of the polygon 270 as a scanning/tracking beam 294. The extension of scanning beam 294 is oriented toward last imaged intersection point 292 on rotational axis Z and thus the first condition (for producing effective scan like mirror mounted directly on rotational axis) according to the present invention is satisfied. Since beam 285 (the reflected beam of incident beam 281/279) is parallel to beam 291 (that is reflected as beam 295 from the same mirror 271) then the scanning beam 294 that is reflected out of polygon 270 is parallel to the incident beam 281 and thus the second condition (for producing effective scan like a mirror mounted directly on the rotational axis with additional vertical displacement) according to the present invention is satisfied.

Figure 15B:
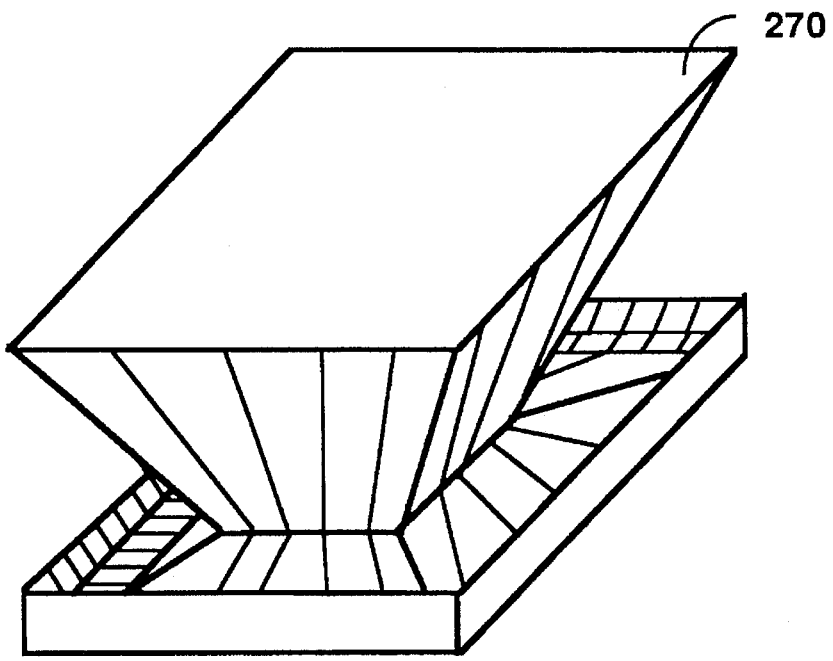

Beam 294 scan/track circle 295. Circle 295 can also be a scanned internal cylindrical surface if the rotating of the polygon is combined with a vertical movement of polygon 270 and lens 280 together along Z direction or combined with vertical movement of the scanned surface. The scanning/tracking is done in focusing conditions when the optical path between lens 280 and the scanned circle (surface) 295 via points 282, 286, 290 and 293 on polygon 270 equals the focal length of lens 280. FIG. 15(b) illustrates in a three-dimensional viewing the polygons' structure 270 that is shown in a side view cross section in FIG. 15(a).

FIG. 15(a) also schematically illustrates the side view cross section of the foot-print of a polygon defined by its corners 274, 296, 297, 298 and 299 which is designed according to the invention described in U.S. Pat. No. 5,184,246 for producing similar scan, i.e., that is effectively done like by a mirror mounted directly on the rotational axis of the polygon. It can be seen that the polygon height in the present invention is reduced into almost half of the height of the other polygon resulting in a much easier way of maintaining a fixed rotational speed and motion that is vibration free. The polygon designed according to the present invention is also much easier to produce since the only requirement for cross section point 274 (between the planes of mirrors—like mirror 271) and cross section point 276 (between the planes of mirrors—like mirror 272) is that they will be located on rotational axis Z of the polygon regardless of their position along this axis. In the design, according to the present invention, the requirement which exists in U.S. Pat. No. 5,184,246 that the point 274 and 276 be located at the same point is eliminated and all that is required is that the polygon's structure be symmetric with respect to axis Z of rotation, regardless of their distance from this axis. The only critical points in the polygon structure are the points like point 278 that have to be located precisely on plane 275. This requirement is not very difficult to achieve since this demand stands separately for each side of the polygon.

FIG. 16—Improved Designed with Adjustable and Static Facet

Figure 16A:
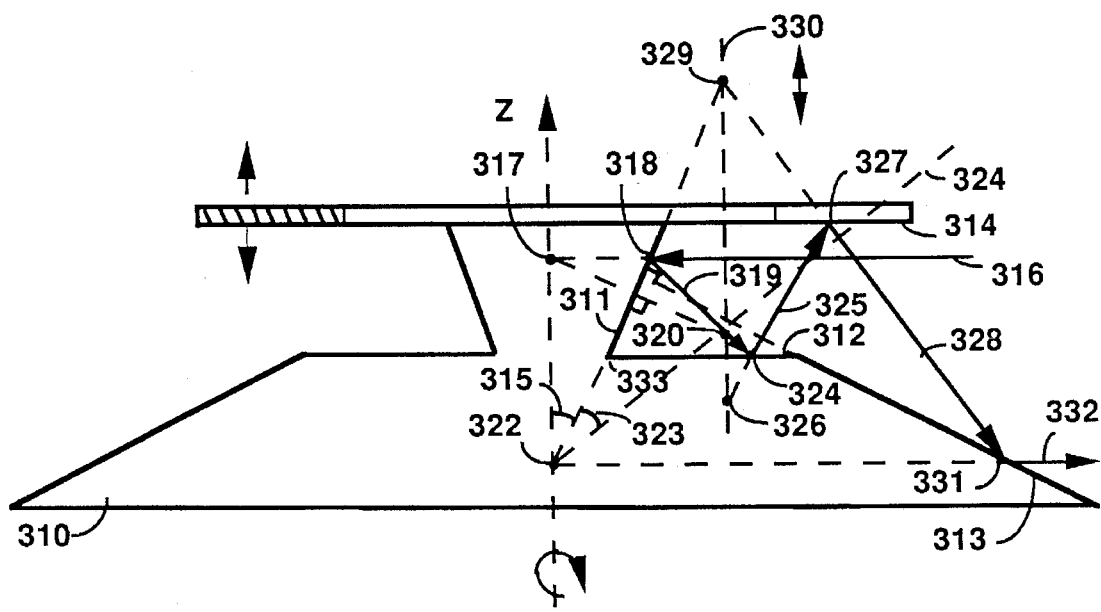
FIGS. 16(a)–(b) show an improved polygon designed with adjustable and static facet.

FIG. 16(a) illustrates a side view cross section of four sides of scanning polygon 310 that rotates around axis z. The mirrors system of the polygon sides consist of mirrors, like mirrors 311, 312, 313 and 314. Mirror 311 is tilted at an angle 315 with respect to rotational axis Z. Mirror 312 is located at a plane parallel to rotational plane of the polygon which is vertical to rotational axis Z. Mirror 313 is oriented at a right angle to mirror 311 and mirror 314 is parallel to mirror 312 and to the rotational plane of the polygon. Mirror 314 is also vertical to rotational axis Z. In the particular configuration of mirror 314 or in any other configurations where the mirrors' plane is parallel to the rotational plane of the polygon, they produce such rotational symmetry that there is no difference in the scanning performances if the mirror rotates with the other parts of the scanning polygon or if it is in a static position.

Mirrors 312 and 314 that have the same rotational symmetry demonstrate the use of the two options, where mirror 312 rotates with the other parts of the polygon 310 and mirror 314 is in a static position. Incident beam 316 is oriented toward original intersection point 317 on axis Z. Beam 316 hits mirror 311 at point 318 and is reflected form this point as beam 319. Mirror 311 produces the image of original intersection point 317 as imaged intersection point 320. According to FIG. 9 the imaged intersection point 320 lays on broken line 321 which intersect with axis Z at point 322 and produces with axis Z the angle 320,322,317 that mirror 311 is its angle bisector. Mirror 311 is also the perpendicular bisector of the interval between intersection points 317 and 320 and thus angle 315 equals angle 323. Beam 319 passes through intersection point 320, hits mirror 312 at point 324 and is reflected from this point as beam 325. Mirror 312 images intersection point 320 into imaged intersection point 326 and it is the perpendicular bisector of the interval between these intersection points 320 and 326. The extension of beam 325 passes through intersection point 326 and the beam itself hits mirror 314 at point 327. Beam 325 is reflected from point 327 on mirror 314 as beam 328. Intersection point 326 is imaged by mirror 314 into imaged intersection point 329. Intersection points 320, 326 and 329 are all located on the same line 330 that is normal to mirrors 312 and 314.

Mirror 314 is the perpendicular bisector of the interval between intersection points 326 and 329. The extension of beam 328 passes through intersection point 329 and the beam itself hits mirror 313 at point 331 and is reflected from there out of the polygon as scanning beam 332. Intersection point 329 located on the plane of mirror 311. Mirror 313 is perpendicular to mirror 311 and serves also as the perpendicular bisector of the interval between intersection point 329 and cross section point 322 between Z axis and the plane of mirror 311. In this situation the intersection point 329 is imaged by mirror 313 into another intersection point that is located at point 322 on rotational axis Z. The extension of scanning beam 332 passes through the last intersection point located at point 322 on rotational axis Z. Since mirror 314 is parallel to mirror 312 then beam 328 is parallel to beam 319. Mirror 313 is vertical to mirror 311 and produced retro reflection of scanning beam 322 parallel to the incident beam 316 for all beams that are parallel to beam 319 particularly for beam 328. Thus, scanning beam 332 fulfills the two conditions that are required according to the present invention for producing scanning which is effective like a scanning of a mirror mounted on the rotational axis with additional vertical displacement.

In the example, intersection point 329 is chosen to be located on the plane of mirror 311 just for reducing the crowdedness of the drawing. In case that point 329 is located somewhere else, mirror 313 is located in a position such that it serves as the perpendicular bisector of an interval that is oriented parallel to mirror 311 and is defined between intersection point 329 (in its new position) and the cross section between the interval and axis Z.

The static position of mirror 314 has the following advantages:

(a) It reduces the moving mass of the polygon and with additional height reduction of the polygon the inertia of the polygon is reduced dramatically resulting in an easier way to achieve constant angular velocity for the polygon.

(b) It enables to adjust the position of the mirror after the production of the polygon resulting in a much easier way to produce the polygon due to less demanding requirements for the polygons' production.

The two arrows on the left of mirror 314 illustrate the adjustment of the mirror in the vertical direction along Z axis. The arrows nearby intersection point 329 indicate the vertical movement of point 329 (along line 330 which is normal to mirror 314) due to the corresponding adjustment movements of mirror 314. In this configuration after mounting the polygon 310 on its axis of rotation that is coupled to a motor of a spinner (not shown) the mirror 314 is adjusted by simple manipulators (not shown) into a desired static position that produces the intersection point 329 in its proper corresponding position.

Figure 16B:
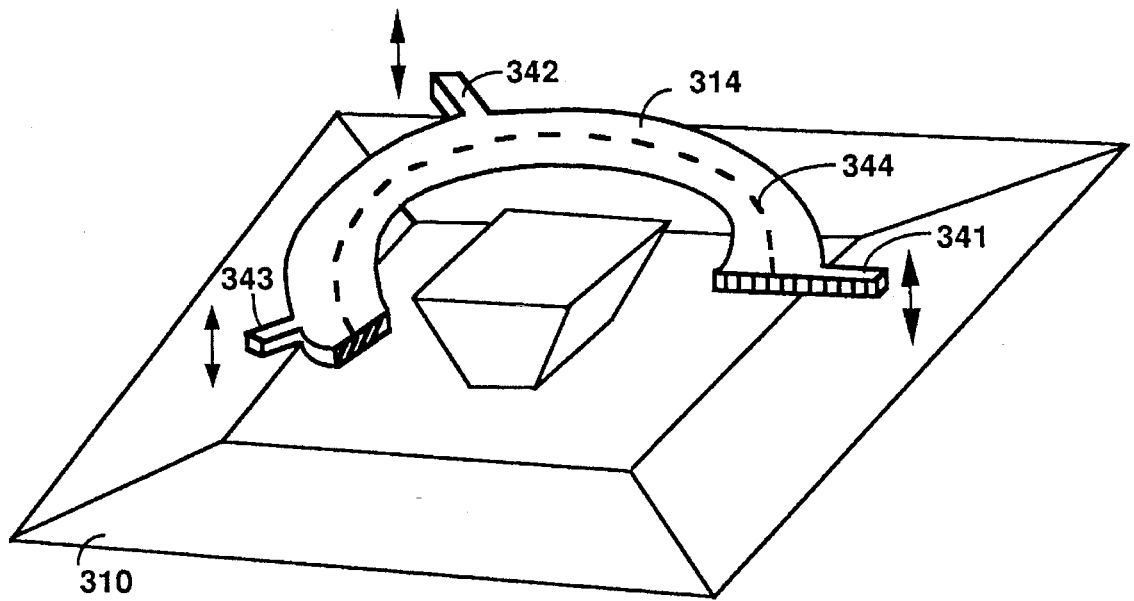

FIG. 16(b) illustrates the polygon shown in FIG. 16(a) in a three dimensional view. The same parts of the polygon corresponding to FIGS. 16(a) and 16(b) are indicated with the same numbers. Part of mirror 314 is cut off for simplifying the drawing. Parts 341, 342 and 343 of mirror 314 are coupled to three manipulators (not shown). By vertical movement in these three points 341, 342 and 343 mirror 314 can be adjusted for both to be vertical to axis Z (not shown) and to be located in the desired position for producing the intersection point 329 in its proper corresponding position. Proper position of mirror 314 means the position that results in the imaging of the last intersection point which is produced by mirror 313 onto rotational axis Z. When scanning polygon 310 rotates around its axis Z the intersection point 329 moves along mirror 314 on a circular line that is illustrated by broken line 344.

In the polygon version that is illustrated in FIG. 16 the critical points in the geometrical structure are adjusted by the static mirror 314. In this situation the most difficult requirement in the production of the polygon is to produce it symmetrically with respect to axis Z. This means that cross section points such as the cross section point 333 between mirrors 311 and 312 have to be located at the same distance from axis Z where the value of this distance is free to be chosen. Such a requirement is easier to achieve than the production requirement of the polygon illustrated in FIG. 15 and much more easier than the production requirement of the polygons that their designs is done according to our above U.S. Pat. No. 5,184,246.

FIG. 17—Scanning Polygon with Secondary Mirrors and Static Adjustable Mirror

Figure 17A:
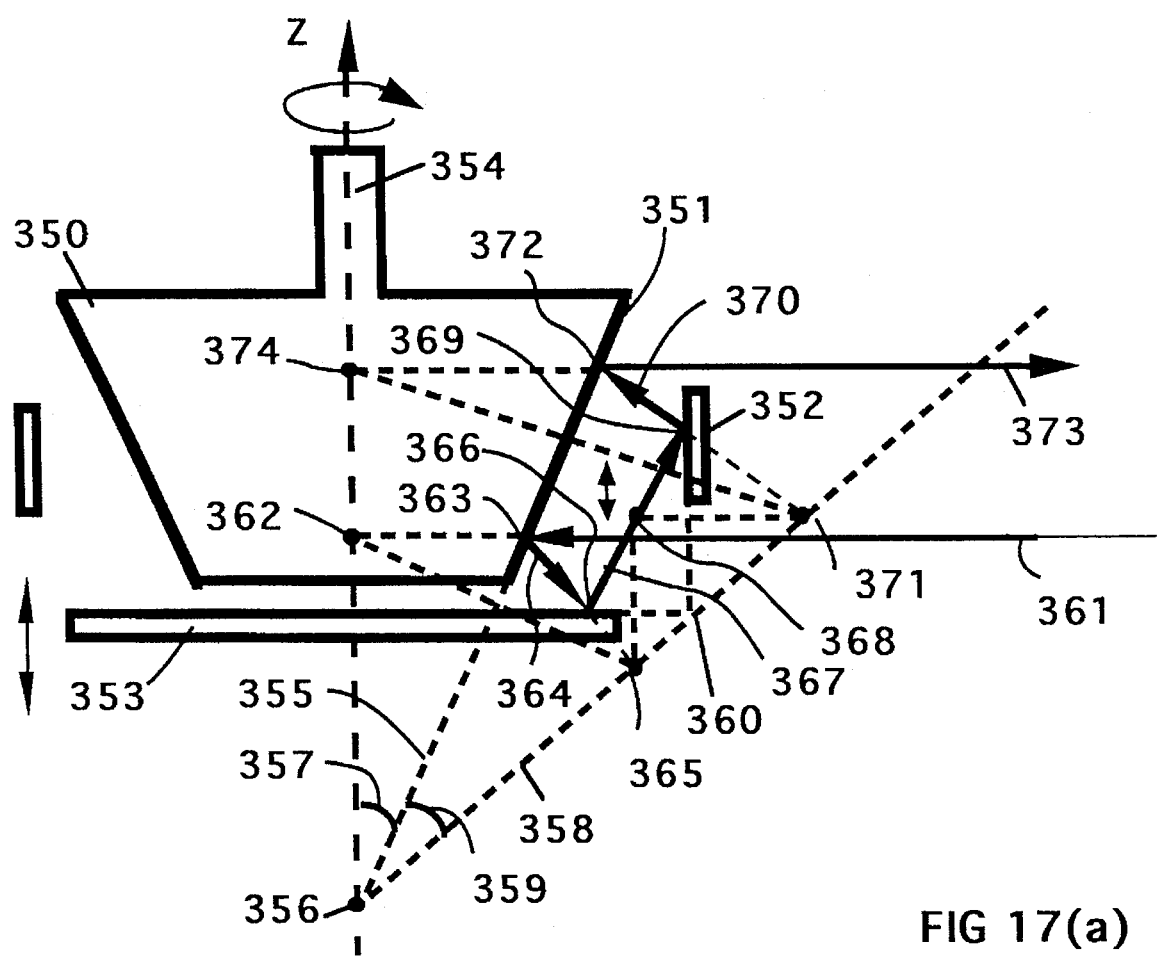
FIGS. 17(a)–(b) show a scanning polygon with secondary mirrors and static adjustable mirror.

FIG. 17(a) illustrates a side view cross section of four sided polygon 350 that is designed according to the present invention. Polygon 350 has four side mirrors like mirror 351 and four secondary mirrors like mirror 352 that correspond to their sides mirrors and are oriented parallel to axis Z. Mirror 353 is parallel to the rotational plane of the polygon and thus it is vertical to rotational axis Z of polygon 350. Due to the rotational symmetry of mirror 353 the polygon 350 produces the same scanning performances regardless on whether mirror 353 rotates with the other parts of the polygon or whether it is in a static position. In the example that is given in FIG. 17, mirror 353 is chosen to be in a static position and thus it has the advantage of being adjustable through a simple mechanical system of manipulators. Polygon 350 is driven by a spinning motor (not shown) that is coupled to polygon 350 via axis 354.

The plane of mirror 351 (illustrated by broken line 355) intersects with axis Z at point 356 and has a tilted angle 357 with respect to axis Z. Line 358 is the geometric place where every intersection point that is located on axis Z is imaged to by mirror 351. Thus the plane 355 of mirror 351 is the bisector angle of the angle that is produced between lines 358 and axis Z. In this configuration angle 357 equals angle 359 that is located between line (plane) 355 and line 358. The planes of mirrors 353 and 352 have cross section point 360 that is located on line 358. Incident beam 361 is oriented toward its original intersection point 362 located on axis Z and hits mirror 351 at point 363. Beam 361 is reflected by mirror 351 from point 363 as beam 364.

Original intersection point 362 is imaged by mirror 351 onto line 358 as intersection point 365 that beam 364 is oriented to. The plane (line) 355 of mirror 351 is also the perpendicular bisector of the interval between intersection point 362 and 365. Beam 364 hits mirror 353 at point 366 and is reflected from there as beam 367. Intersection point 365 is imaged by mirror 353 into intersection point 368 where beam 367 passes through and mirror 353 is the perpendicular bisector of the interval between point 365 and 368. Beam 367 hits mirror 352 at point 369 and is reflected from this point as beam 370. Mirrors 353 and 352 are placed at right angle to each other and create a structure of retro-reflector having cross section point 360 between the planes of its mirrors.

As previously discussed in general for retro-reflectors, beam 368 that is reflected out of this retro-reflector is parallel to beam 364 that hits this retro-reflector. Line 358 that passes through intersection point 365 (of beam 364 that hits the retro-reflector) and cross section point 360 (between the mirrors' plane of the retro-reflector) is also the geometric place where the intersection point 368 is imaged to by the retro-reflector as intersection point 371 that the extension of beam 370 (that is reflected out of the retro-reflector) is oriented to. Beam 370 hits mirror 351 at point 372 and is reflected from there out of the rotating polygon as scanning beam 373.

The plane 355 of mirror 351 is the bisector angle of the angle between axis Z and line 358 (that intersection point 371 lays on) and thus mirror 352 produces the image of intersection point 371 as the last intersection point 374 that is located on axis Z. Beam 373 is the reflected beam of beam 370 and beam 364 is the reflected beam of beam 361. Thus, since beam 364 and 370 are parallel to each other, then incident beam 361 and scanning beam 373 are parallel too. In this situation both of the conditions that are required according to the present invention for producing scan that is effectively like mirror mounted directly on the rotational axis Z with additional vertical displacement are fulfilled. This design of the polygon is also with reduced height and results in lower inertia of the polygon that helps to maintain constant speed for the polygon. The static position of mirror 353 makes it suitable for position adjustment using simple manipulators. This adjustment is done after the production and the coupling of the polygon 350 to its spinner (not shown).

The proper position of mirror 353 is where its plane is oriented vertical to axis Z and where this plane and the plane of mirror 352 have cross section point 360 that lays on line 358. The adjustment option that can be done after the production of the polygon reduces dramatically the production difficulties of the polygon and the most difficult requirement for production is reduced down to the requirement of producing the polygon mirrors in symmetrical positions relative to axis Z. Such requirement is not difficult to conform and such polygons can be produced using conventional technology that is commonly available.

Figure 17B:
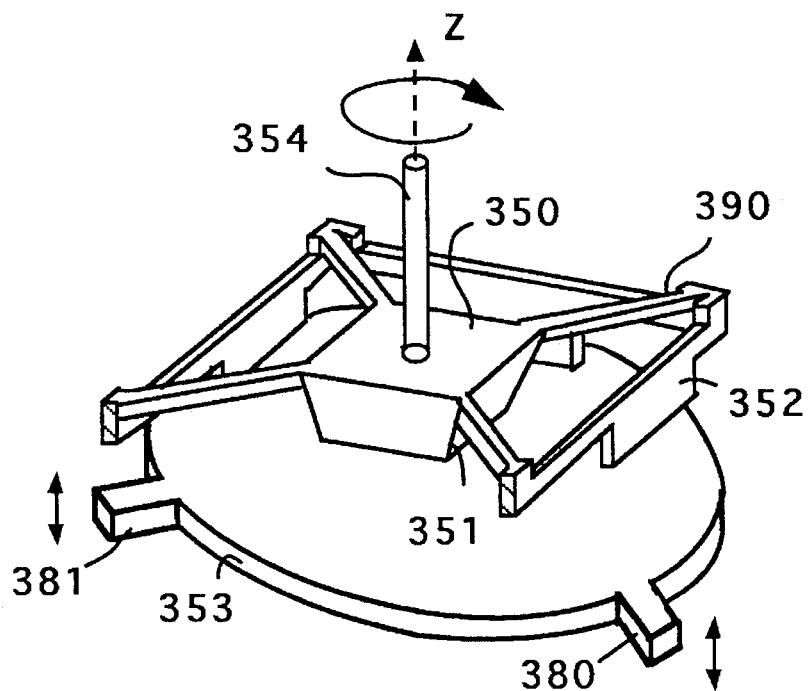

FIG. 17(b) illustrates the same polygon 350 shown in FIG. 17(a) in a three dimensional view. The same numbers are used for the same parts that are illustrated in FIGS. 17(a) and (b). One of the secondary mirrors like mirror 352 is cut off for simplifying the drawing. In this drawing the support bars of the secondary mirrors like bar 390 are also shown. The mirror 353 has three bars that only two of them, bar 380 and bar 381 are shown. These three bars are coupled to three manipulators that by separate vertical movement (along axis Z) of each of them, mirror 353 is adjusted to its proper position defined above.

Figure 18:
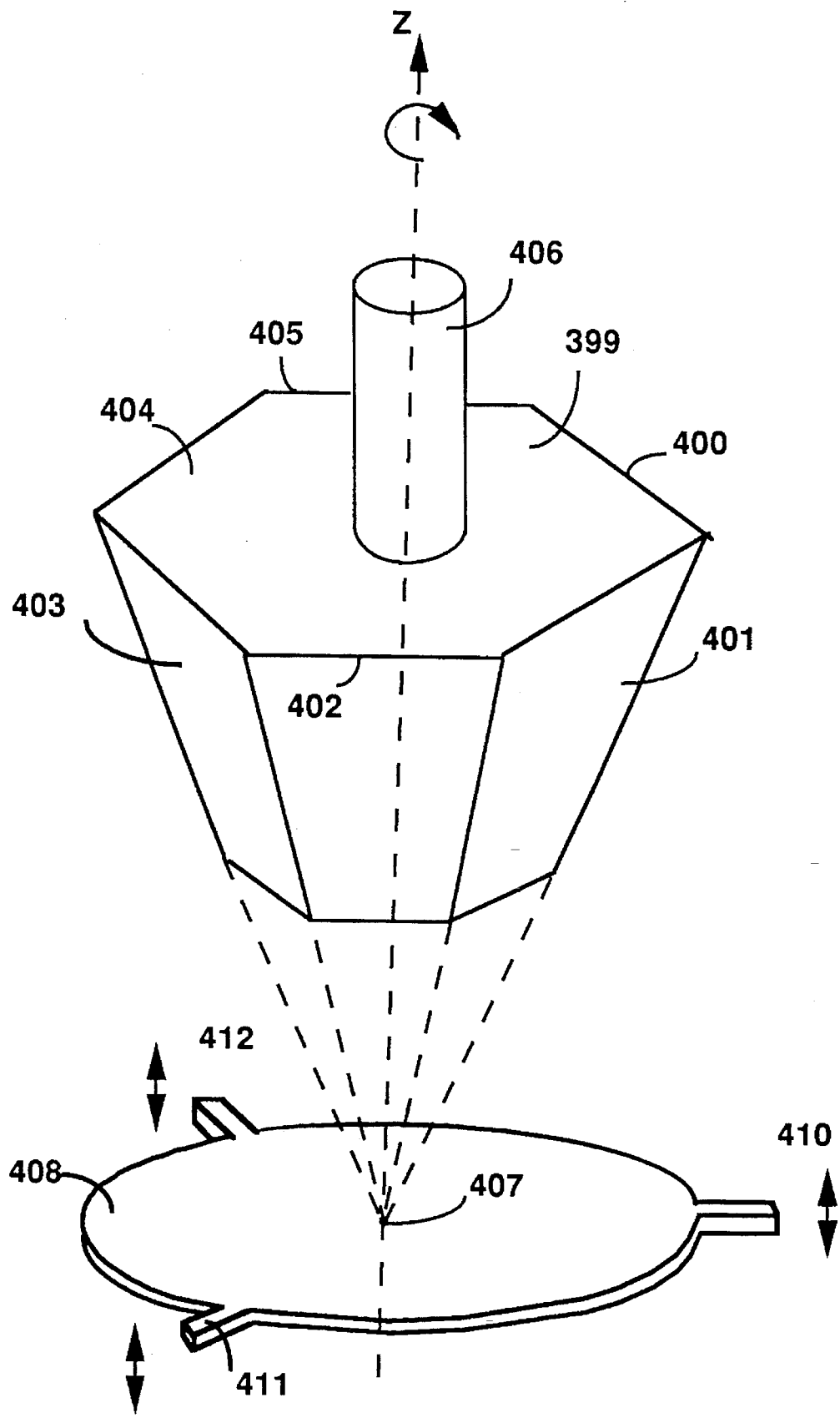
FIG. 18 shows a modified design with static and adjustable mirror.

FIG. 18—Modified Design with Static and Adjustable Mirror

FIG. 18 illustrates a rotating scanning polygon 399 having six sides, mirrors 400–405 that are tilted at an angle of 45° with respect to the rotational axis Z of the polygon and all their planes intersect at one point 407 which is located on rotational axis Z of polygon 399. The polygon 399 is coupled to a driving spinner (not shown) via its axis 406. The plane of mirror 408 is parallel to the rotational plane of the polygon 399 and is vertical to rotational axis Z of the polygon. The intersection point 407 between the planes of side mirrors 400– 405 lays on the plane of mirror 408. According to the drawing shown in FIG. 13(b) that demonstrates a polygon design done according to the invention described in our above U.S. Pat. No. 5,184,246 this polygon (illustrated in FIG. 18) produces a scan that is effective like a scan of a mirror mounted directly on rotational axis of the polygon (without vertical displacement). In this design according to the present invention (unlike the polygon design shown in FIG. 13(b), mirror 408 (corresponding to mirror 902 in FIG. 13(b)) is not attached to the polygon 399 and it is in a static position while all the other parts of the polygon rotate for producing the scan.

The static position of mirror 408 does not affect the scan performance which is done the same way like if mirror 408 would rotate with the polygon due to its rotational symmetry as discussed before. Thus, the scan is done the same way as discussed for FIG. 13(b), but without the rotation of mirror 408. The static position of mirror 408 reduces the inertia of the polygon, resulting in an easier way to maintain a constant rotational speed for the polygon 399. In addition, the position of mirror 408 can be adjusted after the production of the polygon using three simple manipulators that are coupled to it via bars 410-412. By vertical movements (along axis Z) of the three manipulators (not shown) done independently on each other, the position of mirror 408 can be adjusted into an orientation that is vertical to axis Z where point 401 lays on its plane. The possibility to adjust mirror 408 after the production of polygon 399 reduces its production difficulties and the most difficult production requirement is reduced down to the requirement of producing the polygon side mirrors in a symmetric position relative to rotational axis Z of the polygon. Such requirement is easy to fulfill and it can be achieved using conventional technology commonly available.

In the previous examples according to the present invention which are illustrated in FIGS. 15-18, each side of the scanning polygons behaves effectively like a mirror mounted directly on the rotational axis of the polygon with or without additional vertical displacement. The rotating speed of the scanning spot which is produced by such polygons is twice the rotational speed of the polygons and this linear relationship between the polygons' speed and the speed of the scanning point is maintained all along the scan. The optical length between the origin of the incident beam and the scanning point is also maintained constant all along the scan. In the following examples which are illustrated in FIGS. 19-22 and which present another version of the present invention, the scanning speed equals the rotational speed of the polygon. The linear relationship between the scan speed and the rotational speed of the polygon and the constant optical length between the origin of the incident beam and the scanning spot are all maintained all along the scan.

Figure 19:
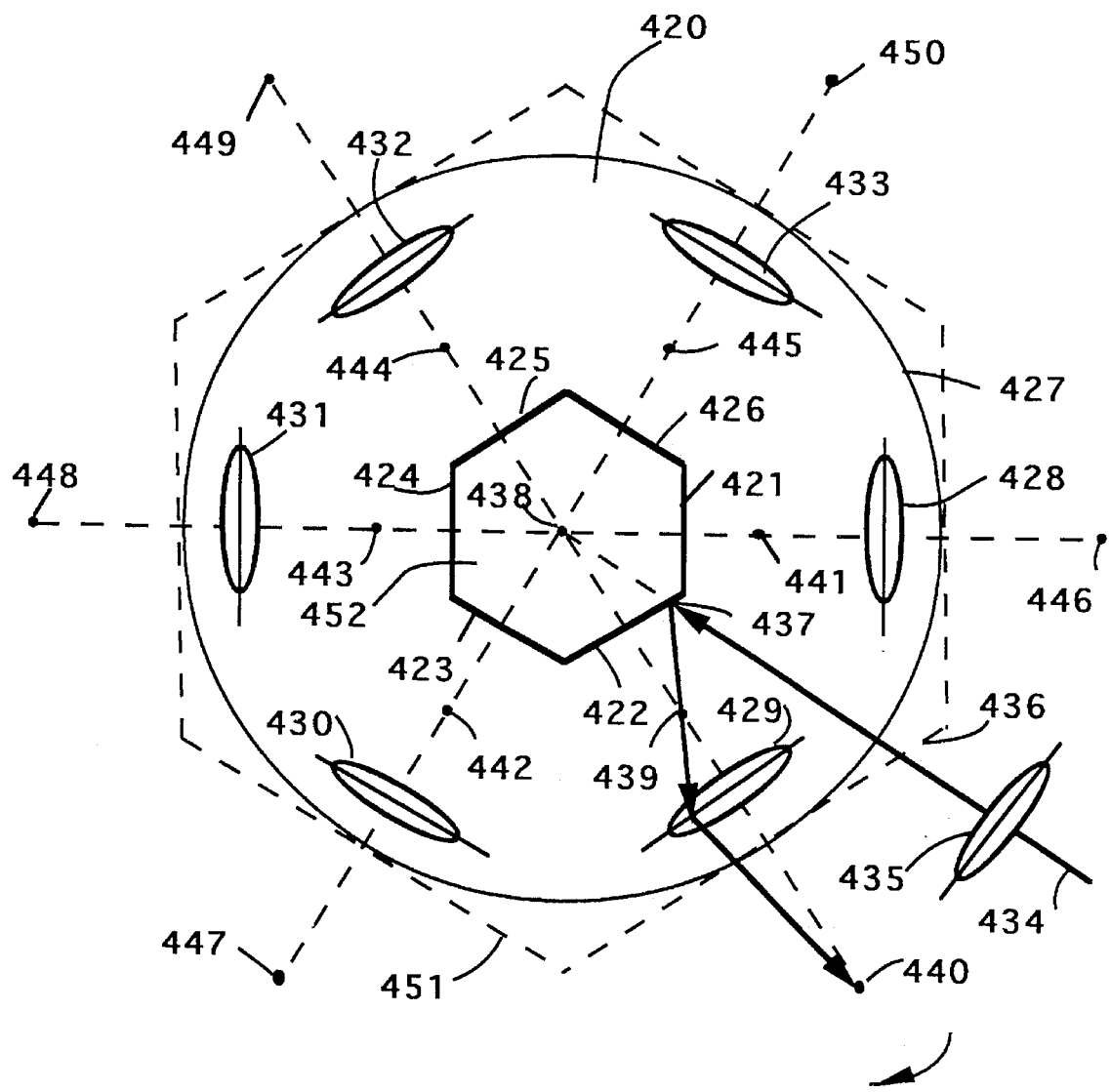
FIG. 19 shows a scan at the rotational speed of the polygon.

FIG. 19—Scan at the Rotational Speed of the Polygon

FIG. 19 is a top view of a scanning polygon 420 consisting of six side mirrors 421-426 of conventional polygon 452, base plate 427 and six lenses 428-433 which correspond to mirrors 421-426, respectively, and are mounted on base plate 427. All the parts of the polygon 420 rotate at the same angular velocity without any relative movement between them. Parallel incident beam is converted by focusing lens 435 into focused beam 436 which hits polygon 542 at point 437 located on mirror 422 and is oriented toward original intersection point 438 on the rotational axis of polygon 420. Mirror 422 produces the image of original intersection point as the imaged intersection point 439 which rotates with polygon 420 at the same angular velocity. Point 439 is also the focusing point of beam 436 after its reflection from mirror 422. Mirror 422 is the perpendicular bisector of the interval between intersection point 438 and 439. Intersection and focusing point 439 is in a static position relative to lens 429 and it serves as an object which is imaged by this lens into intersection point 440 which serves as the scanning spot. Intersection and focusing point 440 is imaged onto the scanned circle and it rotates at the same angular velocity of intersection point 439, lens 429 and polygon 420. The geometric relationship between intersection and focusing point 439 and 440 are given by $$1/v + 1/u = 1/f$$

where u is the distance of point 439 from lens 429, v is the distance of point 440 from lens 429 and f is the focal length of lens 429. The optical length between focusing lens 435 and the scanning point 440 equals the sum of the intervals 435, 438 and 439, 440. This optical length remains constant all along the scan. For producing a scan all over a complete circle—incident beams and focusing lenses (such as incident beam 434 and focusing lens 435) are coupled to each of the polygon sides 421-426, which have been omitted to reduce the crowdedness of the drawing, and they produce the intersection points 441,439,442,443,444 and 445 and their corresponding intersection points 446,440,441,448,449 and 450 which serve as the scanning spots.

In this configuration of the present invention, the polygon 420 has reduced size compared to the size of polygon 451 (shown in broken lines) which is designed according to the invention described in our above U.S. Pat. No. 5,177,632 in which its sides are the perpendicular bisectors of the intervals such as the interval between points 438 and 440. The reduced size of polygon 420 has many advantages such as compactness and reduced inertia. The main disadvantage of polygon 420 is the need for rotating optical elements which are not stabilized easily while rotating with polygon 420.

Figure 20:
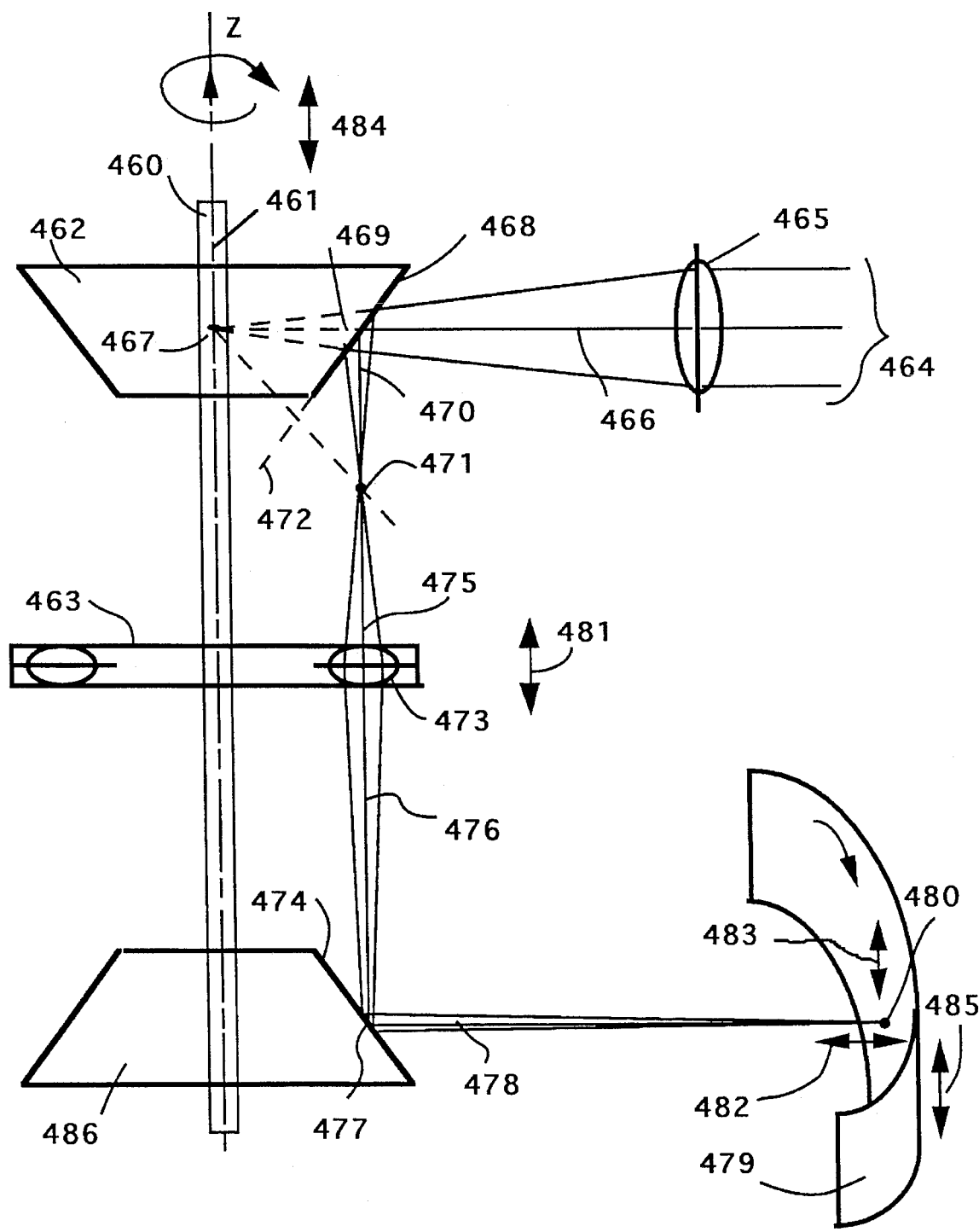
FIG. 20 shows a scan at the rotational speed of the polygon with vertical displacement.

FIG. 20—Scan at the Rotational Speed of the Polygon with Vertical Displacement FIG. 20 is a side view cross section of scanning polygon 460 which produces a scan at the same rotational speed like its own rotation maintaining constant optical path between the origin of the incident beam and the scanning spot. Polygon 460 consists of an axis 461 which is aligned along the axis of rotation Z of polygon 460, upper polygon 462 with tilted side mirrors, lower polygon 463 with tilted side mirrors and mounting disk 486 to support the optical lenses. Parallel incident beam 464 is focused by focusing lens 465 and is converted into focused beam 466 oriented toward the original intersection point 467. Point 467 is also the point where the extension of beam 466 is focused. Beam 466 hits tilted mirror 468 of the upper polygon 462 at point 469 and is reflected from this point as beam 470 which is focused at point 471. Point 471 is also the imaged intersection point of original intersection point 467 which is produced by mirror 468. The plane 472 of mirror 468 is the perpendicular bisector of the interval between intersection points 467 and 471. Lens 473 is one of the lenses which are mounted on disk 463. For each side such as side 468 of the upper polygon 462, there is a corresponding side such as side mirror 474 in the lower polygon 485 and corresponding lens (such as lens 473 which represents lens systems of one or more lenses) in disk 463.

Beam 470 after its focusing point 471 continues to propagate as beam 475 which passes lens 473 as beam 476. Beam 476 hits the side mirror 474 of the lower polygon at point 477 and is reflected from there toward the scanned surface 479 as scanning beam 478. Intersection and focusing point 471 serves as an object and it is imaged into intersection and focusing point 480 via lens 473 and mirror 474. The geometric relationship between point 471 and 480 is given by:

$$1/v + 1/u = 1/f$$

where u is the distance between point 471 and lens 473, v is the distance between point 480 and lens 473 which consists of the sum of the intervals 473, 477 and 477, 480 and f is the focal length of lens 473. Point 471 is the imaged intersection point rotating with the polygon at the same speed and thus it is in a static position relative to all the parts of polygon 460. In this situation scanning point 480 is also in a static position relative to polygon 460 and rotates with it at the same rotational speed. Point 480 moves along an arc which is part of a circle that its center is located on axis Z. The arrow 481 indicates the position adjustment of disk 463 in the vertical direction along axis Z. This adjustment also adjusts the distance u and thus also the corresponding distance v. The adjustment movement of disk 463 along axis Z results in adjustment of the focusing conditions of point 480 and in the movement of point 480 in the lateral and vertical directions as indicated by arrows 482 and 483, respectively.

As mentioned before, point 480 produces a circular scan. To scan internal cylindrical surfaces, such as surface 479, either the rotating polygon 460 has to move vertically during the scan as indicated by arrow 484 or the surface 479 has to move vertically during the scan as indicated by arrow 485. The polygons' design which is carried out according to the present invention and is illustrated in FIG. 20 is superior to the polygons' design illustrated in FIG. 19 (and also carried out according to the present invention) and to the design of the polygon described in the invention of our above U.S. Pat. No. 5,177,362 since its size in the lateral direction (radial orientation) is reduced dramatically.

An additional advantage of the polygon illustrated in FIG. 20 relative to the other polygons mentioned above is the vertical displacement between the incident beam and the scanning beam. In this situation there is no interference and blocking of the scanning beam by the optical system of the incident beam all along the scan interval of the side mirrors. For scanning all along a complete circle or a complete internal cylindrical surface, several incident beams such as beam 464 have to be coupled to several side mirrors such as mirror 468 of the polygon 460 using several focusing lenses such as lens 465.

Figure 21:
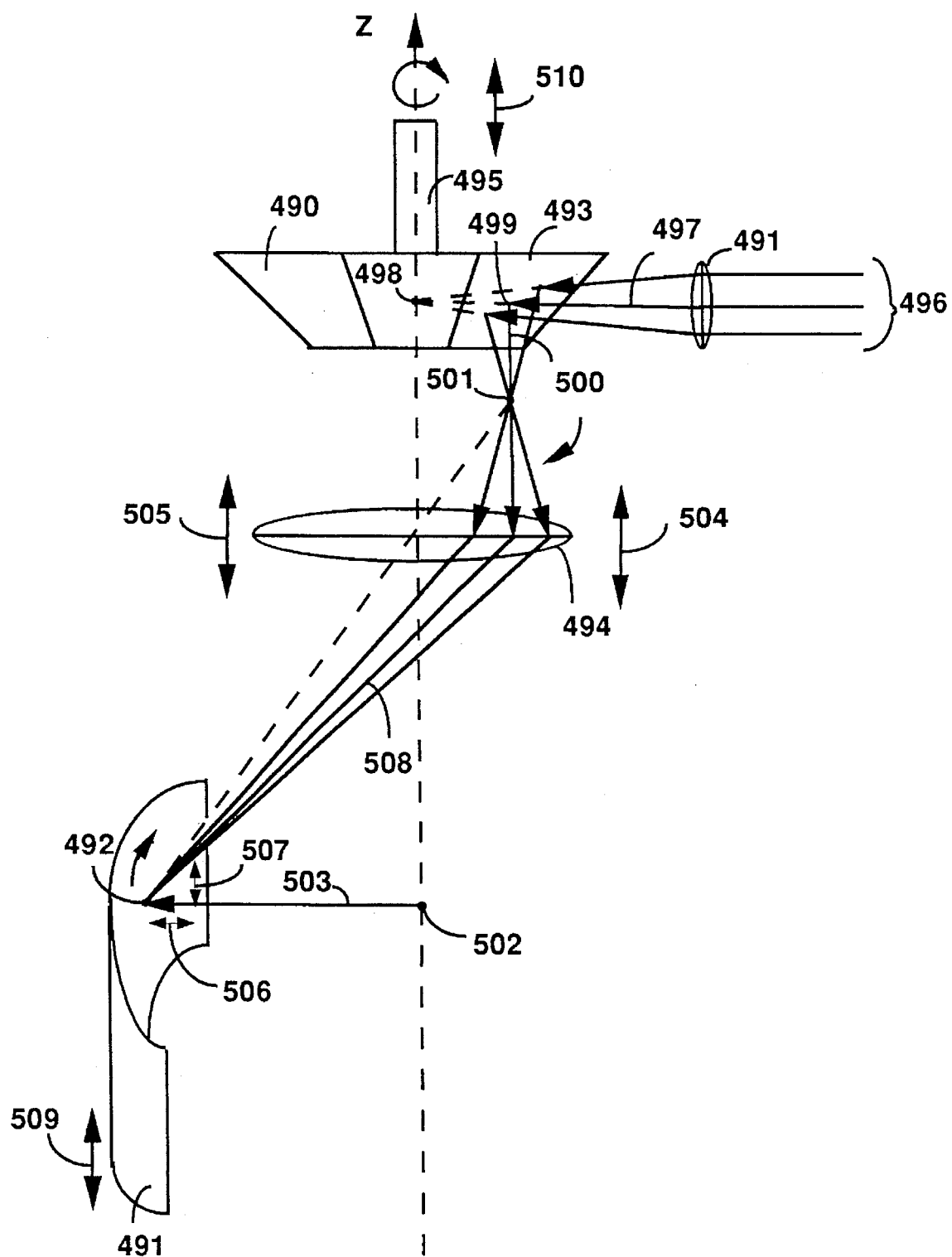
FIG. 21 depicts scanning at the rotational speed of the rotating polygon using static optics.

FIG. 21—Scanning at the Rotational Speed of the Rotating Polygon Using Static Optics FIG. 21 illustrates a side view of rotating polygon 490 for producing a scan along internal cylindrical surface with scanning speed which equals the rotational speed of the polygon while maintaining constant optical length between focusing lens 491 and the scanning spot 492 via mirror 493 of polygon 490 and imaging lens 494 of polygon 490. Polygon 490 consists of mounting axis 495 oriented along the rotational axis Z of the polygon, tilted side mirrors, such as side mirror 493, and imaging lens 494. The optical axis of lens 494 coincides with rotational axis Z of polygon 490. The plane of lens 494 is parallel to the rotational plane and is vertical to axis Z and thus it has rotational symmetry.

As discussed before, optical elements which have such rotational symmetry produce the same scanning performances if they rotate with the polygon or if they are in a static position. FIG. 21 illustrates lens 494 in a static position due to the significant advantages of this design such as reduced inertia of the polygon and the adjustment option of lens 494 using simple manipulators. Incident parallel beam 496 is focused by focusing lens 491 into focused beam 497 oriented toward axis Z while its extension is focused on this axis at the location of original intersection point 498. Beam 497 hits mirror 493 at point 499 on mirror 493 and is reflected from there as beam 500. Beam 500 is focused at the same point 501 that original intersection point 499 is imaged to by mirror 493. Intersection and focusing point 501 rotates with polygon 490 at the same angular velocity along a circle (not shown) located at a plane parallel to the rotational plane of the polygon which its center is located on the optical axis Z of lens 494. The different positions of intersection and focusing point 501 on the circle along which it moves are imaged by lens 494 to their corresponding positions of intersection and focusing point 492 on a circle (not shown) located on surface 491. This circle is defined by the cross section line between surface 491 and a plane parallel to rotational plane of polygon 490. The center 502 of this circle is located on axis Z and the circle radius 503 is measured from center 502 to scanning spot (intersection and focusing point) 492.

The adjustment of lens 494 can be carried out by three simple manipulators which move independent of each other in the vertical direction along axis Z. Such manipulators (not shown) can adjust both the position of lens 494 along axis Z and also its orientation which has to be vertical to axis Z. The vertical adjustment of lens 494 indicated by arrows 504 and 505, results in the corresponding lateral and vertical movement of scanning spot 492 which are indicated by arrows 506 and 507, respectively. In this situation the position and the focusing conditions of scanning spot 492 are adjustable.

The design of the scanning system illustrated in FIG. 21 has the advantages of reduced mass polygon, compactness, simplicity and adjustability of the system by static optical component. Its main disadvantage is that the scanning beam 508 scans the surface 491 not along its radius 503 thus the hitting orientation of the scanning beam is not along the normal to the scanned surface. For producing the scan along a complete internal cylindrical surface, several incident beams, such as incident beam 496, have to be coupled to several sides of polygon 490 such as its side mirror 493 using several focusing lenses such as focusing lens 491. In addition, the scan along the circle produced by the rotating polygon 490 has to be combined by vertical movement either of the scanned surface 491 which is indicated by arrows 509 or by vertical movement of polygon 490 together with lens 494 which is indicated by arrow 510.

Figure 22:
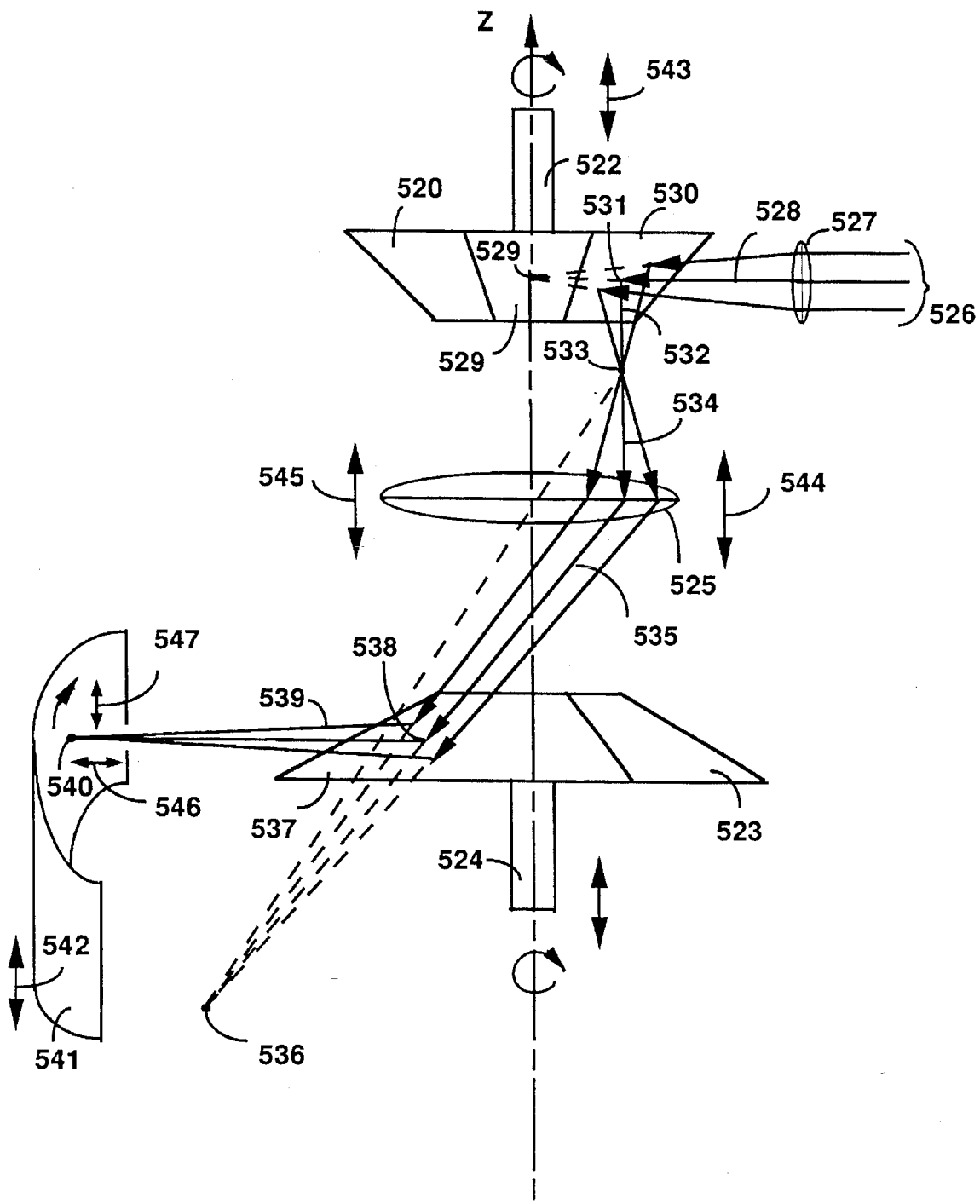
FIG. 22 depicts vertical scan produced by rotating polygon that contains static lens.

FIG. 22— Vertical Scan Produced By Rotating Polygon that Contains Static Lens FIG. 22 illustrates scanning polygon 520 which consists of upper polygon 521 with tilted side mirrors which is mounted on axis 522 which is oriented along rotational axis Z, lower polygon 523 with tilted side mirrors which is mounted on axis 524 which is oriented along rotational axis Z of polygon 520, and imaging lens 525.

The upper and the lower polygons 521 and 523 rotate exactly at the same speed which is controlled by a synchronizing system (not shown) and they have a mirror symmetry between them relative to a plane that is normal to axis Z. Imaging lens 525 is vertical to axis Z, its plane is parallel to rotational plane of polygon 520 and it has a rotational symmetry. In this situation, as mentioned previously, the scan performances of polygon 520 remain unchanged whether this lens is in a static position or if it rotates with the polygon. In FIG. 22 imaging lens 525 is in a static position and this configuration has the advantages that are listed in the description for FIG. 21.

Incident parallel beam 526 is focused by focusing lens 527 and is converted to focused beam 528. Beam 528 is oriented toward original intersection point 529 on axis Z. The extension of beam 528 is focused onto intersection point 529. Beam 528 hits the tilted side mirror 530 of polygon 520 at point 531 and is reflected from there as beam 532. Intersection and focusing point 529 is imaged by mirror 530 into intersection and focusing point 533 in which beam 532 passes through and is focused in. Beam 532, after its focusing point 533, continues to propagate toward lens 525 as beam 534. Beam 534 is focused by imaging lens 525 and is converted to focused beam 535. Intersection and focusing point 533 serves as an object for lens 525 which produces its image as intersection and focusing point 536. Beam 535 is oriented toward point 536 and its extension passes through and is focused in this point. Tilted mirror 537 in the lower polygon 523 of the scanning polygon 520 reflects beam 535 from point 538 where beam 535 hits its surface. Beam 535 is reflected from point 538 on mirror 537 as scanning beam 539. Intersection and focusing point 536 is imaged by mirror 537 into intersection and focusing point 540 in which scanning beam 539 is focused and passes through. Intersection and focusing point 540 serves as a scanning spot and is located on the scanned internal cylindrical surface 541. As discussed before, the intersection and focusing points 533, 536 and 540 rotate with polygon 520 at the same speed along circles (not shown) which are located at planes parallel to the rotational plane of polygon 520. In this situation, the scanning spot 540 moves along a circle (not shown) which is defined by the cross section line between scanned surface 541 and a plane parallel to rotational axis of polygon 520. Due to the mirror symmetry between the upper and the lower polygons 521 and 523, mirror 537 is parallel to mirror 531 and thus the axis of scanning beam 539 is parallel to the axis of incident beam 526 and is oriented vertically to the scanned surface 541 and along its radius.

The center of the scanned internal cylindrical surface is on axis Z. To produce the scan all over the scanned surface, the rotating movement of the polygon has to be combined with vertical motion of surface 541 that is indicated by arrow 542 or by vertical movement of all the parts of polygon 520 which is indicated by arrow 543. For scanning a complete cylinder, several incident beam such as incident beam 526 have to be coupled to several side mirrors such as side mirror 531 using several focusing lenses such as focusing lens 527. The static position of imaging lens 525 along axis Z and its orientation vertical to this axis can be adjusted using simple manipulators (not shown). This adjustment of lens 525 produces position adjustment of the scanning spot 540 in the lateral and the vertical directions indicated by arrows 546 and 547, respectively. In addition, the adjustment position of lens 525 controls the focusing conditions of scanning spot 540. The design of the polygon illustrated in FIG. 22 is superior to the one illustrated in FIG. 21 since it produces the scan with a scanning beam that is normal to the scanned surface and it is inferior to this illustrated in FIG. 21 since its structure is more complicated. FIGS. 15–18 illustrate several designs that are given as examples according to the present invention for producing scanning at twice the speed of the rotation of the scanning polygon.

Figure 23:
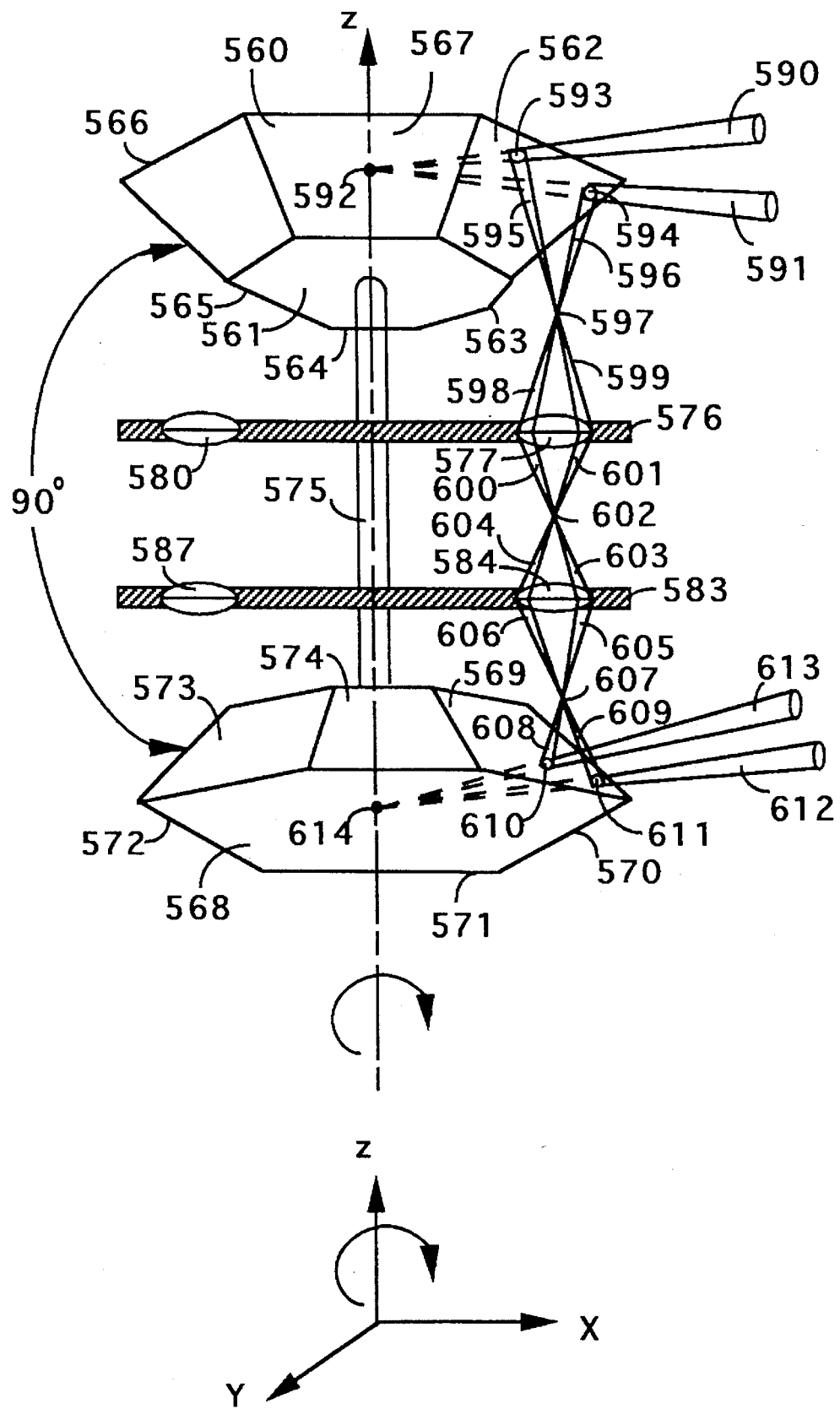
FIG. 23 shows scanning at twice the rotational speed of the polygon using polygonal mirrors and lenses.

In these examples the sides of the polygons consist of mirrors system that produces the imaging of the intersection points. FIGS. 19–22 illustrate several designs which are given as examples according to another version of the present invention for producing scanning of the same speed of the rotation of the scanning polygon. In the examples illustrated in FIGS. 19–22 the sides of the polygons consist of a combination of mirrors and lenses system which produces the imaging of the intersection points in a configuration where the intersection points and their corresponding focusing points are at the same points. FIG. 23 below demonstrates that scanning at twice the speed of the rotation of the polygon can also be achieved according to the present method in a configuration where the polygon side consists of mirrors and lenses system that produces the imaging of the intersection points in a situation where the intersection points and their corresponding focusing points are at the same points.

FIG. 23—Scanning at Twice the Rotational Speed of the Polygon Using Polygonal Mirrors and Lenses FIG. 23 illustrates scanning polygon 560 in a rotating coordinate system X,Y,Z which rotates around its axis Z. Polygon 560 and coordinate system X,Y,Z rotate around the Z axis at the same rotational speed and thus polygon 560 appears in the X,Y,Z coordinate system in a static position. Polygon 560 consists of upper polygon 561 having six tilted side mirrors 562–567, lower polygon 568 having six tilted side mirrors 569–574, axis 575 which is oriented along rotational axis Z of polygon 560, lenses disk 576 (shown in cross section) on which six lenses 577–582 are mounted (only lenses 577 and 580 are shown) and lenses disk 583 (shown in cross section) on which six lenses 584–589 are mounted (only lenses 584 and 587 are shown).

The planes of the side mirrors 562, 563, 564, 565, 566 and 567 in the upper polygon 561 are vertical to their corresponding planes of the side mirrors 569, 670, 671, 672, 673 and 674 in the lower polygon 568, respectively. The lenses disks 576 and 583 are vertical to axis 575. Each side of polygon 560 consists of mirror and lens systems such as the system of one of its sides which consists of mirrors 562 and 569 (in the upper and lower polygons 561 and 568, respectively) and their corresponding lenses 577 and 584 (in lenses disks 576 and 583, respectively).

An incident beam which is in a static position in a static coordinate system, appears as a rotating beam in this rotating coordinate system. The rotating speed of an incident beam equals the rotating speed of the coordinate system X,Y,Z (and the polygon 560), but in the opposite direction. The incident beam is illustrated in two different positions as two different incident beams 590 and 591 corresponding to two different rotational positions of polygon 560 in a static coordinate system. Incident beams 590 and 591 are oriented toward original intersection point 592 and their extensions are focused at this point. Beams 590 and 591 hit mirror 562 at points 593 and 594 and are reflected from these points as beams 595 and 596, respectively. Original intersection and focusing point 592 is imaged by mirror 562 into intersection and focusing point 597 that beams 595 and 596 pass through and are focused at. Beams 595 and 596 continue after their intersection at focusing point 597 as beams 598 and 599, which propagate toward lens 577 which convents them into focused beams 600 and 601 respectively. Lens 577 is located at distance 2f (f is the focal length of lens 577) from intersection and focusing point 597 which serves as an object and its image as intersection and focusing point 602 located at distance 2f from lens 577 on its other side that beams 600 and 601 pass through and are focused at. Beam 600 and 601 continue to propagate after point 602 as beams 603 and 604, respectively. Beams 604 and 603 which propagate from intersection and focusing point 602 are the converted form of beams 599 and 598 which propagate from intersection and focusing point 597. Lens 577 images point 597 to point 602 with magnification which equals 1 and thus the angle between beams 598 and 599 equals the angle between beams 604 and 603.

In spite of the explanation above, intersection and focusing point 602 is not identical to intersection and focusing point 597 because of the switching between the orientation of beams 603 and 604 with respect to their corresponding beams 599 and 598. In this situation, if intersection and focusing point 602 would be imaged by a mirror onto axis Z the beams that are oriented toward this imaged intersection and focusing point and are parallel to the incident beam with respect to the rotational axis of polygon 560 would not produce any scan and they will be in a static position parallel to the incident beam. Thus, intersection and focusing point 602 is not suitable to be imaged onto axis Z. Lens 584 converts beams 604 and 603 into focused beams 605 and 606, respectively. Intersection and focusing point 602 is imaged (with magnification which equals unity) by lens 584 into another intersection and focusing point 607 that beams 605 and 606 pass through and are focused in. Beams 605 and 606 continue to propagate from point 607 as beams 608 and 609, respectively. Beams 598 and 599 with their intersection and focusing point 597 are identical in their size, orientation, and the opening angle between the beams to their corresponding converted forms that appears as beams 608 and 609 with their intersection and focusing point 607. In this situation, point 607 is suitable to be used according to the present invention. Beams 608 and 609 hit mirror 569 at points 610 and 611 and are reflected as scanning beam whose different positions correspond to the different positions 590 and 591 of the incident beam, are indicated by beams 612 and 613, respectively.

Mirror 569 produces the image of intersection and focusing point 607 as last intersection and focusing point 614 which is located on axis Z and through which the extension of scanning beams 612 and 613 pass and in which they are focused. Mirror 569 is vertical to mirror 562 and thus the scanning beam is the retro-reflection of the incident beam and is parallel to it. In this situation, both of the conditions for producing a scan at twice the rotational speed of the polygon are satisfied according to the present invention, i.e., original and last intersection points are located on rotational axis Z of the polygon and the incident and scanning beams are parallel.

In the design the vertical displacement between the incident beam and the scanning beam can be extended using additional lenses such as lenses 577 and 584 which are mounted on lenses disks such as 576 and 583 for producing lenses guide between the side mirrors 562 and 569 of the upper polygon 561 and the lower polygon 568, respectively. The main disadvantage of this scanning polygon is that it produces a diverge scanning beam that its scanning spot is not focused.

Figures 24A, 24B:
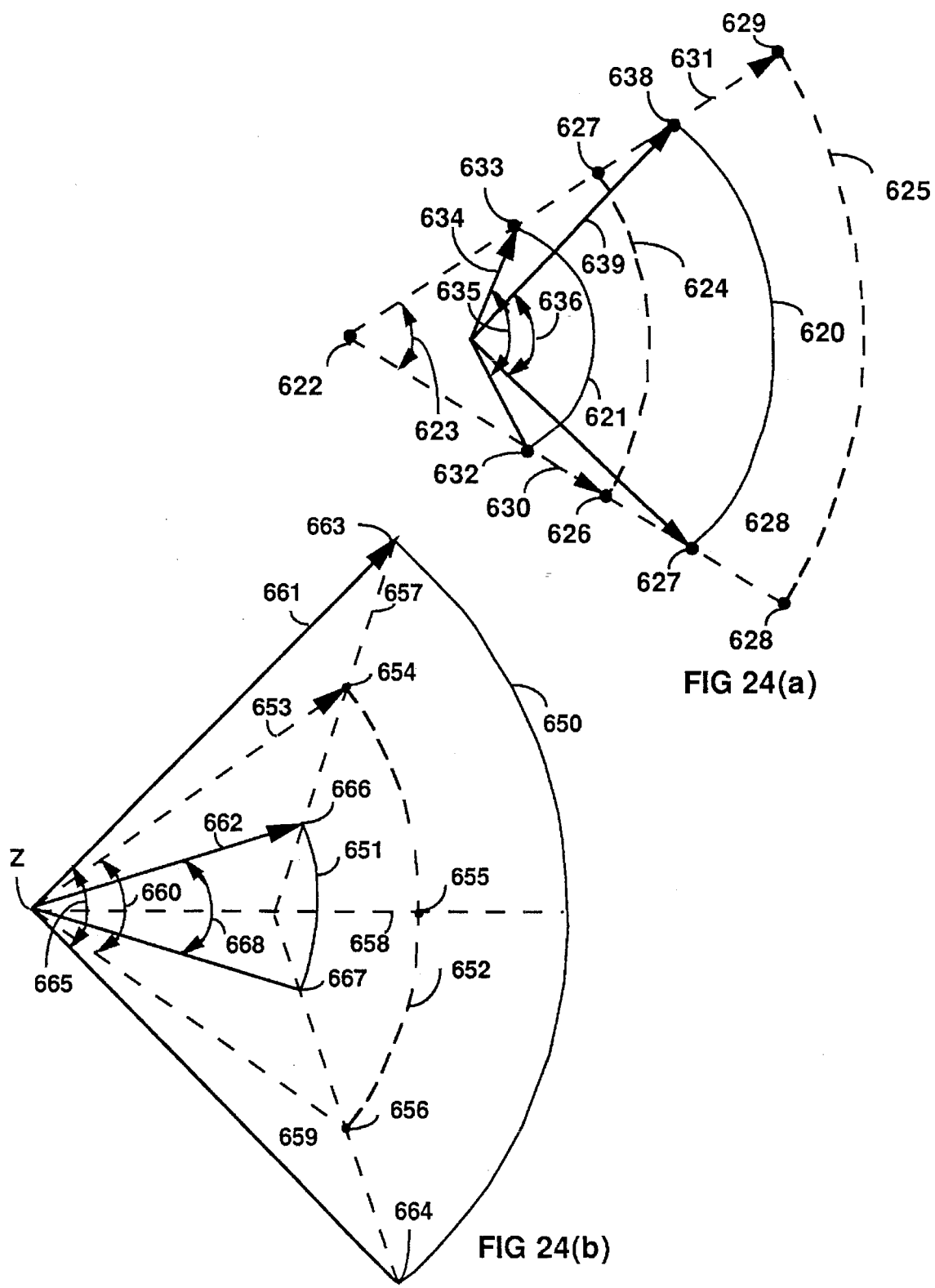
FIGS. 24(a)–(b) show radius adjustment of the scanned region corresponding to deviations from the method requirements.

FIG. 24, described below, illustrates situations where the relationships between the scanning polygon and the scanned surface have some deviation from the conditions required according to the present invention for producing perfect tracking/scanning at twice the rotational speed of the rotating polygon or at the same speed. The most significant deviation where using the technique version of scanning at twice the rotational speed of the polygon is the deviation of the last intersection point from the rotational axis of the scanning polygon (not shown). Such situation is illustrated in FIG. 24(a) in rotating coordinate system which rotates around the rotational axis Z of the polygon at the same rotational speed of the polygon. The most significant deviation where using the technique version of scanning at the same speed of the rotational speed of the polygon is the deviation of the scanning intersection point from the scanned surface. Such situation is illustrated in FIG. 24(b). For both of the above mentioned situations where the scanning in imperfect conditions is acceptable (imperfect linear relationships between the scanning speed and the rotational speed of the polygon and non fixed focusing conditions) the periodical scanning of the polygon is adjusted to fit the desired scanned region.

FIG. 24—Radius Adjustment of the Scanned Region Corresponding to Deviations from the Method Requirements FIG. 24(a) is a top view of two different scanned regions which are represented by arcs 620 and 621 whose center is located on the rotational axis Z of the scanning polygon (not shown). The scanning polygon is of the type which is designed to produce scanning at twice the rotational speed of the polygon but it deviates from the required conditions according to the present invention due to the displacement deviation of the last imaged intersection point 622 from the rotational axis Z.

The scanning angle 623 which is measured between the edges of the scanned arc and the last intersection point 622 is independent of the arc radius when the center of the arc is located at intersection point 622 as is demonstrated for arcs 624 and 625 with their corresponding edges 626,627 and 628,629 both of which have the same scanning angle 623 while their radii 630 and 631 are different. In a situation where there is no deviation between point 622 and axis Z the scanning angle of the desired arc which is measured between the edges of the scanned arc and axis Z equals the scanning angle from the last intersection point and thus is also independent of the radius of the desired scanned arc. In the situation illustrated in FIG. 24(a), the scanning angle measured from axis Z does depend on the radius of the desired scanned surface due to the deviation between points 622 and axis Z. This dependency is demonstrated for arc 621 having radius 634 whose edges 632 and 633 produce with axis Z the corresponding scanning angle 635 which is different from the scanning angle 636 which is measured between axis Z and the edges 637 and 638 of the scanned arc 620 having radius 639 which is different from radius 634. The deviation between point 622 and axis Z creates performance deviations from the performances according to the previously discussed method, i.e., imperfect linear relationships between the rotating speeds of the polygon and the scanning spot and non-constant focusing conditions for the scanning spot.

In a situation where such performance deviations are acceptable the radii of the scanned surfaces such as radii 634 and 639 of the scanned surfaces 621 and 620, respectively, are adjusted to fit the scanning angle measured from the last intersection point such as the scanning angle 623 which is measured from the last intersection point 622.

FIG. 24(b) is a top view of two different scanned regions which are represented by arcs 650 and 651 whose center is located on the rotational axis Z of the scanning polygon (not shown). The scanning polygon is of the type which is designed to produce a scan at the same rotational speed that it rotates using the last intersection point as the scanning spot. Arc 652 has the proper radius to assure that the last intersection point which serves as scanning point will be projected on.

Points 654, 655 and 656 illustrate the scanning spot at different positions corresponding to different rotational positions of the scanning polygon. Broken lines 657, 658 and 659 indicate the orientations of the scanning beam which passes through the scanning spot (last intersection point) corresponding to its different positions 654, 655 and 656, respectively. In this situation, the scanning angle 660 of the polygon equals the rotational angle of the polygon and is defined between the edges 654 and 656 of the scanned arc 652 and axis Z. If the scanned region has a radius which differs from the correct radius 653, such as radius 661 of arc 650 or radius 662 of arc 651, the scanning performances deviate from the performances according to the method, i.e., non linear relationship between the rotational speeds of the scanning spot and the polygon and non-constant focusing conditions for the scanning spot. If such deviations are acceptable for certain purposes, the scanning angle of the scanned arc no longer equals the rotational angle of the polygon. The scanned arc 650 is defined between the two cross section points 663 and 664 which are produced where the scanning beam that is oriented along lines 657 and 659 crosses arc 650. The corresponding scanning angle 665 for arc 650 is defined between the edges 663 and 664 of arc 650 and axis Z. Similarly, in another situation, the scanned arc 651 is defined between the two cross section points 666 and 667 which are produced where the scanning beam which is oriented along lines 657 and 659 crosses arc 651. The corresponding scanning angle 668 for arc 651 is defined between the edges 666 and 667 of arc 651 and axis Z.

In such situations the radii of the scanned arcs such as radius 661 and 662 of arcs 650 and 651, respectively, are adjusted to fit the relationships between the scanning angle 660 of the polygon and the scanning angles such as angles 665 or 668 of scanned surfaces 650 or 651, respectively. In general, the periodic rotational angle of a polygon equals the symmetry angle of the polygon defined as 360/N where N is the number of sides of the polygon. The periodic scanning angle corresponding to the periodic rotational angle of the polygon depends on the type of the polygon. For a polygon which produces scanning at twice its rotational speed, the periodic scanning angle is twice the periodic rotational angle of the polygon. For a polygon which produces scanning at its same rotational speed, the periodic scanning angle equals the periodical rotation angle of the polygon.

For both of the situations illustrated in FIG. 24(*a*) and (*b*) and for both of their corresponding types of polygons, the radii of the periodic scanned surface (or its periodic scanning angle) is adjusted to fit the periodic rotational angle of the polygon. For example, scanned arc 620 (illustrated in FIG. 24(*a*)) having radius 639 with periodic scanning angle 636 is suitable to be scanned by periodic scanning angle 623 of the polygon. For the type of the polygon in this situation the corresponding periodic rotational angle of the polygon equals half of angle 623 and thus the number of the polygon sides N equals 2×360/(angle 623), where N has to be integer number (1,2,3 . . . ). In case that tracking of moving object is done along arc 620, the ratio between the angular velocities of this object and the polygon equals 2×(angle 636)/(angle 623).

Another example is scanned arc 650 (illustrated in FIG. 24(*b*)) having radius 661 with periodic scanning angle 660 of the polygon. For the type of the polygon in this situation the corresponding periodic rotational angle of the polygon equals angle 660 and thus the number of the polygon sides N equals 360/(angle 660) where N has to be an integer number (1,2,3, . . . ). In the case that tracking of moving object is carried out along arc 650, the ratio between the angular velocities of this moving object and the polygon equals (angle 665)/(angle 660).

The examples which were previously given for scanning/tracking polygons and scanning/tracking system illustrate configurations which are usually used for writing, printing, engraving and exposing where a light source that produces incident beams at a fixed orientation are deflected by rotational polygons to produce scanning beams (with or without focusing) that project their radiation energy on the scanned regions. It is clear that the same polygons or system are suitable for operation where the radiation beams propagate in the reverse direction. Such configuration is generally used for the applications of reading and inspecting the scanned/tracked regions. In reading and inspection, the scanning/tracking beams are beams which are collected from the scanned regions at different orientations and are deflected from the rotating polygon at a fixed orientation toward optical sensors such as detectors, cameras or CCD cameras.

Figure 25A:
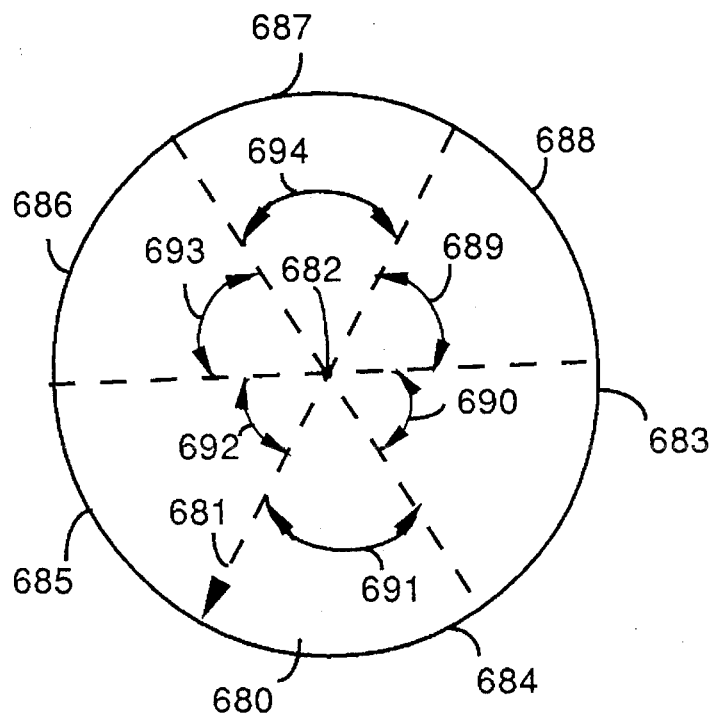
FIGS. 25(a)–(b) show examples of scanned/tracked regions.
Figure 25B:
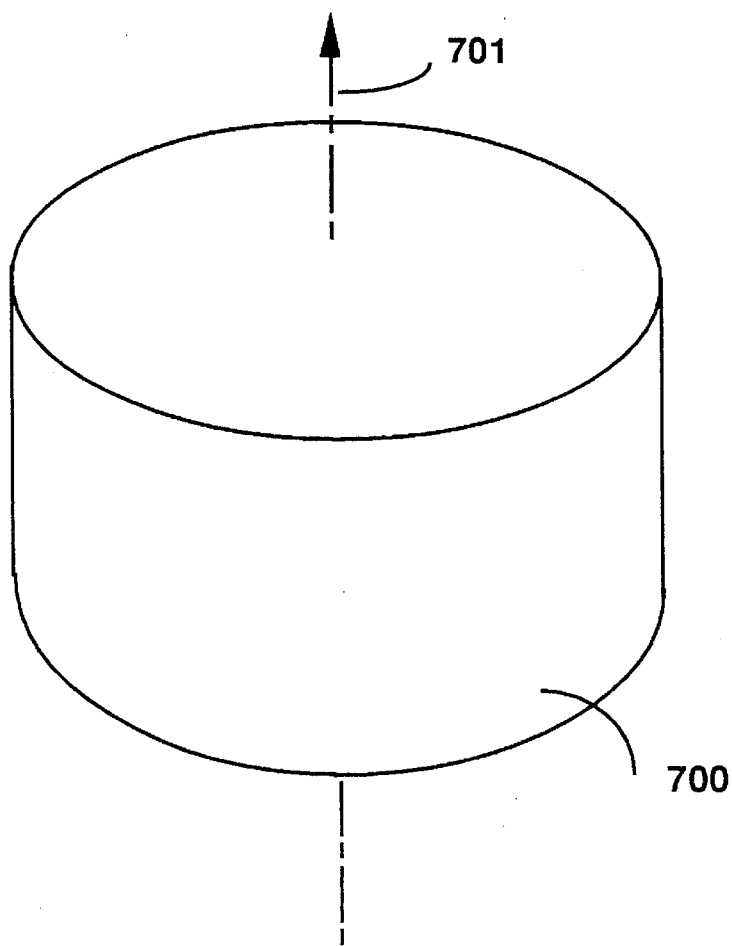

FIG. 25—Examples for Scanned/Tracked Regions

FIG. 25 illustrates the basic examples for the scanned regions. In these examples the scanning polygon (not shown) is designed according to the present invention (for producing scan speed that is twice or equals the rotational speed of the polygon) where its rotational axis is located in the center of the scanned region and its axis is oriented vertically to the rotational plane in which the scanning/tracking is done.

FIG. 25(*a*) illustrates a scanned region which is in a shape of a circle 680 having radius 681 and its center located at point 682. The rotational axis of the scanning/tracking polygon (not shown) passes through point 682. Circle 680 consists of six segments 683–688 in the shape of arcs having equal scanned angles (60°) 689–694, respectively. Each arc of the arcs 683–688 is scanned periodically at, or at twice, the rotational speed of the polygon. Accordingly, the symmetry angle of the scanning polygon is 30° or 60° and then the polygon has 12 or 6 sides, respectively.

FIG. 25(*b*) illustrates a scanned surface in the shape of an internal cylindrical surface. Each surface can be scanned/tracked using the same rotational polygons that are used to produce circular scan (illustrated in FIG. 25(*a*)) with additional vertical movement of the scanned region or of the rotating polygon. Alternatively, scanned region 700 can be scanned using the configuration of circular scan where the light beam is expanded along the vertical direction or when using linear or matrix CCD camera. The rotational axis 701 of the scanning polygon coincides with the symmetry axis of the scanned region 700. The scanned region illustrated in FIG. 25(*a*) can represent a line scan/track along an object having rotational symmetry such as circumference of static or rotating carousel. The scanned region illustrated in FIG. 25(*a*) can represent a surface scan/track along an object having cylindrical symmetry such as drums of printers, drums of plotters and masks that are used in the printing industry.

FIG. 26—Additional Examples for Scanned/Tracked Regions

FIG. 26 illustrates scanned/tracked regions commonly used in the inspection field. In all the examples, the scanning/tracking polygon (not shown) is mounted in the center of the scanned/tracked regions.

Figure 26A:
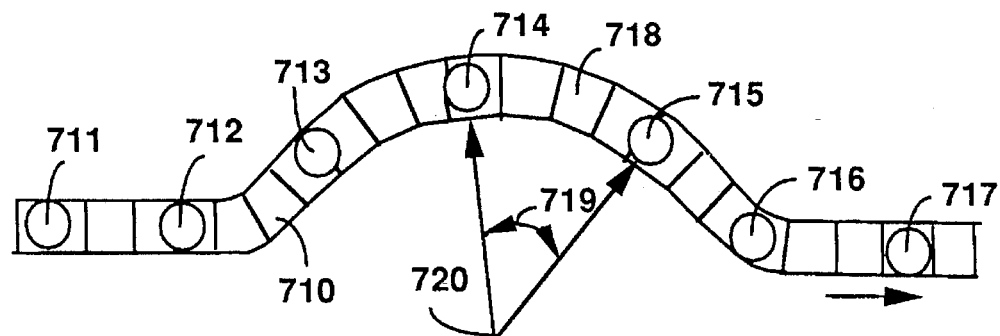
FIGS. 26(a)–(c) show additional examples of scanned/tracked regions.

FIG. 26(a) illustrates a conveyer 710 for transferring objects 711–717 to be inspected in a configuration that part of it is bent to a shape of an arc 718 for producing the scanned/tracked region. The objects 711–717 move on conveyer 710 and are separated by equal spaces. Each space between two following objects which are located on arc 718 produces a scanning angle 719 with center 720 of arc 718.

Figure 26B:
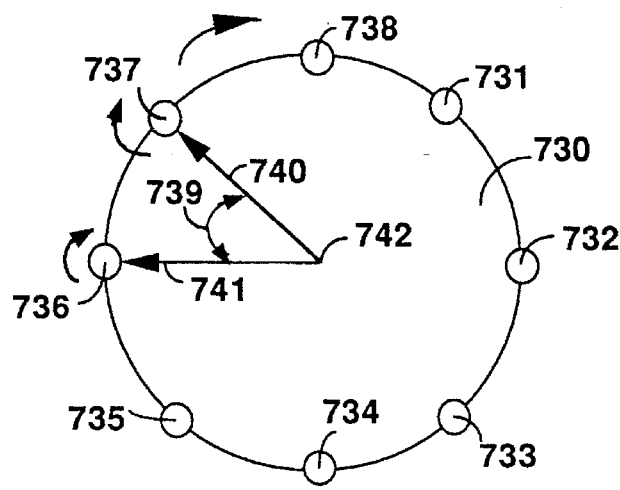

FIG. 26(b) illustrates rotating carousel 730 with objects 731–738 to be inspected (or engraved) which are located along the circumference of carousel 730 and are distributed symmetrically with equal spaces between them. The periodic scanning angle 739 equals the arc angle between two following objects and is defined between radii 740 and 741 of carousel 730 whose center is located at point 742. The inspected objects spin around their axis and complete a full turn around themselves while moving along the tracked arc and thus allowing the inspection of their side walls all around.

Figure 26C:
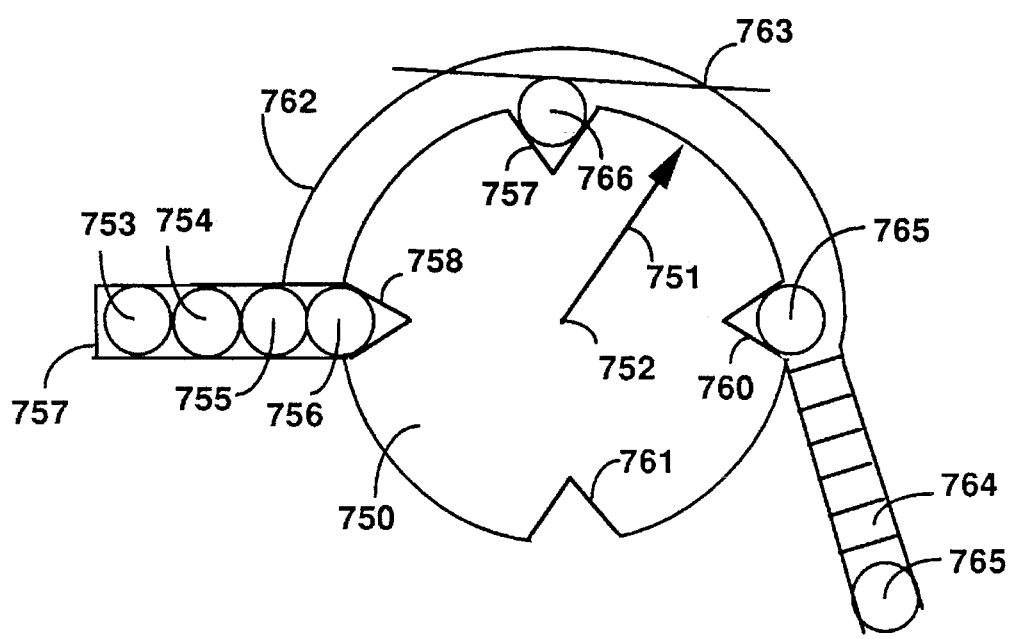

FIG. 26(c) illustrates rotating carousel 750 having radius 751 and center 752. Linear conveyer 757 feeds objects 753–756 into carousel 750 by sliding under these objects. Carousel 750 collects the objects from conveyer 757 into its grooves 758–761 which are distributed symmetrically at equal spaces between them. Carousel 758 slides the object along circular surface 762 where in the scanned/tracked region a spinning motion of object 766 is produced by friction belt 763. Conveyer 764 has linear velocity greater than the tangential velocity of carousel 750 and thus it collects the inspected objects such as object 765 and 766 out of carousel 750.

SUMMARY, RAMIFICATIONS, AND SCOPE

While the above description contains many specificities, these should not be construed as limitations on the scope of the invention, but as exemplifications of the presently preferred embodiments thereof. Many other ramifications and variations are possible within the teachings to the invention. For example, the polygon can be produced with a different number of sides, different radii, and different angles. It also can be used as a mirror system when only parts of the polygon are built. Although the invention has been described using the example of scanning of bottles, it can be used to scan or inspect other objects, such as printed matter, glass, mechanical, electronic, or optical parts. Although the mirrors of the polygon are shown as contiguous the adjacent side mirrors can be spaced apart. Although polygons with six sides have been shown, the polygons can have any number of sides from one to several dozen or more. The illustrated dimensions and rotational speeds given can be changed within wide ranges.

Thus the scope of the invention should be determined by the appended claims and their legal equivalents, and not by the examples given.

What is claimed is:

1. A system for scanning, tracking, engraving, printing, plotting, writing, or reading, comprising:
    (a) a polygon means rotatable about a rotational axis throughout a range of rotation with a first angular velocity, said polygon means comprising a polygon having at least one side, said side including at least one optical means;
    (b) a radiation source means for providing a plurality of radiation beams having a plurality of relative orientations and directing said plurality of radiation beams onto said optical means of said polygon means, such that said plurality of radiation beams travel to said optical means of said polygon means;
    (c) a medium support means providing a medium having a region;
    (d) said optical means arranged to project said plurality of radiation beams from said optical means onto said region to form, on said region, a corresponding plurality of radiation spots which move on said region at a second angular velocity about said rotational axis of said polygon means, said second angular velocity being linearly proportional to said first angular velocity;
    (e) said region being positioned to receive said plurality of radiation beams from said optical means of said polygon means, such that said plurality of radiation beams travel along an optical path from said radiation source means to said optical means, and then to said region;
    (f) said radiation source means and said region being positioned so that they are spaced from said rotational axis and are spaced from each other; and
    (g) a relative movement means for moving said plurality of radiation beams parallel to said rotational axis.

2. The system of claim 1 wherein said relative movement means also causes the relative orientations of said plurality of radiation beams directed to said optical means and then from said optical means to be substantially preserved.

3. The system of claim 1 wherein said medium support means is also arranged to maintain the length of said optical path between said radiation source means and said region constant throughout rotation of said polygon means.

4. The system of claim 1 wherein said medium support means is also arranged to maintain said medium, and hence said region, static about said rotational axis of said polygon means and wherein said second angular velocity and said first angular velocity are related by a ratio of two to one.

5. The system of claim 1 wherein said medium support means is also arranged to maintain said medium, and hence said region, static about said rotational axis of said polygon means and wherein said second angular velocity and said first angular velocity are related by a ratio of one to one.

6. The system of claim 5, further including means for causing said plurality of radiation beams to converge to a single beam.

7. The system of claim 1 wherein said medium support means is also arranged to rotate said medium, and hence said region, about said rotational axis of said polygon means.

8. The system of claim 7 wherein said relative movement means for moving said plurality of radiation beams parallel to said rotational axis is also arranged to move said plurality of radiation beams independent of the movement of said region.

9. The system of claim 1 wherein said medium support means is also arranged to maintain said medium, and hence said region, static.

10. The system of claim 1 wherein said medium support means is, at least in part, an internal cylinder that is centered about said rotational axis.

11. The system of claim 1 wherein said relative movement means for moving said plurality of radiation beams parallel to said rotational axis is also arranged to move said polygon means parallel to said rotational axis.

12. The system of claim 11 wherein said medium support means is also arranged to maintain said medium, and hence said region, static.

13. The system of claim 1 wherein said relative movement means for moving said plurality of radiation beams parallel to said rotational axis is also arranged to move said plurality of radiation beams independent of the movement of said polygon means.

14. The system of claim 1 wherein said medium support means is also arranged to maintain said medium, and hence said region, static along a path parallel to said rotational axis.

15. The system of claim 1 wherein said medium support means is, at least in part, a conveyer belt.

16. The system of claim 15 wherein said conveyor belt is, at least in part, in a circular form.

17. The system of claim 1 wherein said medium support means is at least a part of a carousel.

18. The system of claim 17 wherein said carousel includes means for spinning objects mounted on said carousel.

19. The system of claim 1 wherein said medium support means is a film coated with light-sensitive material having an arclike internal cylindrical surface.

20. The system of claim 1 wherein said medium support means is a printer drum.

21. The system of claim 1 wherein said medium support means is a plotter.

22. The system of claim 1 wherein said optical means includes at least one mirror.

23. The system of claim 1 wherein said optical means includes at least one mirror and at least one lens.

24. The system of claim 1 wherein said optical means includes at least one lens.

25. The system of claim 1, further including, adjacent said polygon means, at least one non-rotating facet whose position and orientation is adjustable, said facet being oriented perpendicular to said rotational axis of said polygon means.

26. The system of claim 25 wherein said non-rotating facet includes at least one mirror.

27. The system of claim 25 wherein said non-rotating facet includes at least one lens.

28. The system of claim 25 wherein said non-rotating facet includes at least one mirror and at least one lens.

29. The system of claim 1 wherein said optical means is arranged to cause said plurality of radiation spots to be focused onto said region.

30. The system of claim 1, further including means for adjusting the distance of said region from said rotational axis of said polygon means to compensate for deviations in mechanical dimensions of said scanning system.

31. The system of claim 1 wherein said medium support means is at least part an internal cylinder that is centered about said rotational axis and said region is at least on part of said internal cylinder.

32. A method for scanning, tracking, engraving, printing, plotting, writing, or reading, comprising:

(a) providing a polygon means rotatable about a rotational axis throughout a range of rotation with a first angular velocity, said polygon means including a polygon having at least one side, said side including at least one optical means;

(b) providing a radiation source means for providing a plurality of radiation beams having a plurality of relative orientations and directing said plurality of radiation beams onto said optical means of said polygon means, such that said plurality of radiation beams travel to said optical means of said polygon means;

(c) providing a medium support means having a region;

(d) said optical means arranged to project said plurality of radiation beams onto said region to form, on said region, a corresponding plurality of radiation spots which move on said region at a second angular velocity about said rotational axis of said polygon means, said second angular velocity being linearly proportional to said first angular velocity;

(e) said region being positioned to receive said plurality of radiation beams from said optical means of said polygon means, such that said plurality of radiation beams travel along an optical path from said radiation source means to said optical means, and then to said region;

(f) positioning said radiation source means and said region being so that they are spaced from said rotational axis and are spaced from each other; and (g) moving said plurality of radiation beams parallel to said rotational axis.

33. The method of claim 32, further including preserving the relative orientations of said plurality of radiation beams as they are directed to and then from said optical means.

34. The method of claim 32 wherein the length of said optical path between said radiation source means and said region is maintained constant throughout rotation of said polygon means.

35. The method of claim 32, further including adjusting the distance of said region from said rotational axis of said polygon means to compensate for deviations in mechanical dimensions of said scanning system.

36. A system for scanning, tracking, engraving, printing, plotting, writing, or reading, comprising:

(a) a polygon means rotatable throughout a range of rotation with a first angular velocity about a rotational axis, said polygon means comprising a polygon having at least one side, said side including at least one optical means;

(b) a medium support means having a region;

(c) a radiation sink means;

(d) said optical means arranged to form, on said region, a field of view which moves on said region at a second angular velocity about said rotational axis of said polygon means, said second angular velocity being linearly proportional to said first angular velocity of said polygon means throughout said range of rotation of said polygon means;

(e) said field of view on said region of said medium support means being arranged to emit a plurality of radiation beams and direct said plurality of radiation beams to said optical means;

(f) said optical means arranged to receive said plurality of radiation beams from said field of view on said region and then to project said plurality of radiation beams in a fixed orientation throughout the rotation of said polygon means to said radiation sink means;

(g) said radiation sink means arranged to receive said plurality of radiation beams from said optical means, such that said plurality of radiation beams travels along an optical path from said field of view on said region to said optical means and then from said optical means to said radiation sink means;

(h) said medium support means, and hence said region and said radiation sink means, being positioned so that they are spaced from said rotational axis and are spaced from each other; and (i) a relative movement means for moving said plurality of radiation beams parallel to said rotational axis.

37. The system of claim 36 wherein said relative movement means is also arranged to preserve the relative orientations of said plurality of radiation beams directed to said polygon means and then from said optical means.

38. The system of claim 36 wherein medium support means is arranged to maintain constant the length of said optical path between said radiation sink means and said region throughout the rotation of said polygon means.

39. The system of claim 36 wherein said radiation sink means includes at least one camera.

40. The system of claim 36, further including means for adjusting the distance of said region from said rotational axis of said polygon means to compensate for deviations in a mechanical dimensions of said scanning system.

41. A method for scanning, tracking, engraving, printing, plotting, writing, or reading, comprising:

(a) providing a polygon means rotatable throughout a range of rotation with a first angular velocity about a rotational axis, said polygon means comprising a polygon having at least one side, said side including at least one optical means;

(b) providing medium support means having a region;

(c) providing a radiation sink means;

(d) said optical means arranged to form, on said region, a field of view which moves on said region at a second angular velocity about said rotational axis of said polygon means, said second angular velocity being linearly proportional to said first angular velocity of said polygon means throughout said range of rotation of said polygon means;

(e) said field of view on said region of said medium support means being arranged to emit a plurality of radiation beams and direct said plurality of radiation beams to said optical means;

(f) said optical means arranged to receive said plurality of radiation beams from said field of view on said region and then to project said plurality of radiation beams in a fixed orientation throughout the rotation of said polygon means to said radiation sink means;

(g) said radiation sink means arranged to receive said plurality of radiation beams from said optical means, such that said plurality of radiation beams travels along an optical path from said field of view on said region to said optical means and then from said optical means to said radiation sink means;

(h) positioning said medium support means, and hence said region and said radiation sink means, so they are spaced from said rotational axis and are spaced from each other; and (i) moving said plurality of radiation beams parallel to said rotational axis.

42. The method of claim 41, further including preserving the relative orientations of said plurality of radiation beams as they are directed to and then from said optical means.

43. The method of claim 41 wherein said the length of said optical path between said region and said radiation sink means is maintained constant throughout rotation of said polygon means.

44. The method of claim 41 wherein said radiation sink includes at least one camera.

45. The method of claim 41, further including adjusting the distance of said region from said rotational axis of said polygon means to compensate for deviations in mechanical dimensions of said scanning system.

46. A system for scanning, tracking, engraving, printing, plotting, writing, or reading, comprising:

(a) a polygon means rotatable about a rotational axis throughout a range of rotation with a first angular velocity, said polygon means comprising a polygon having at least one side, said side including at least one optical means;

(b) a medium support means which provides a medium having a region; and (c) a radiation source means for providing at least one radiation beam and directing said one radiation beam onto said optical means of said polygon means;

(d) said optical means arranged to project said one radiation beam onto said region to form, on said region, a radiation spot which moves at a second angular velocity about said rotational axis of said polygon, said second angular velocity being linearly proportional to said first angular velocity, said radiation spot projected onto said region being static relative to said medium support means while said medium support means is rotating;

(e) said region being positioned to receive said one radiation beam from said optical means of said polygon means, such that said one radiation beam will travel along an optical path from said radiation source means to said optical means, and then to said region;

(f) said radiation source means and said region being positioned so that they are spaced from said rotational axis and are spaced from each other.

47. The system of claim 46 wherein said medium support means also maintains the length of said optical path between said radiation source means and said region constant throughout rotation of said polygon means.

48. The system of claim 46 wherein said medium support means is at least in part a conveyor belt.

49. The system of claim 48 wherein said conveyor belt is at least in part in a circular form.

50. The system of claim 46 wherein said medium support means is at least a part of a carousel.

51. The system of claim 50 wherein said carousel includes means for spinning objects mounted on said carousel.

52. The system of claim 46 wherein said optical means includes at least one mirror.

53. The system of claim 46 wherein said optical means includes at least one mirror and at least one lens.

54. The system of claim 46 wherein said optical means includes at least one lens.

55. The system of claim 46, further including, adjacent said polygon means, at least one non-rotating facet whose position and orientation is adjustable, said facet being oriented perpendicular to said rotational axis of said polygon means.

56. The system of claim 55 wherein said non-rotating facet includes at least one mirror.

57. The system of claim 55 wherein said non-rotating facet includes at least one lens.

58. The system of claim 55 wherein said non-rotating facet includes at least one mirror and at least one lens.

59. The system of claim 46 wherein said radiation source means is arranged to direct said one radiation beam so that said one radiation beam forms a focused spot on said region.

60. The system of claim 46, further including means for adjusting the distance of said region from said rotational axis of said polygon means to compensate for deviations in mechanical dimensions of said scanning system.

61. A method for scanning, tracking, engraving, printing, plotting, writing, or reading, comprising:

(a) providing a polygon means rotatable about a rotational axis throughout a range of rotation with a first angular velocity, said polygon means comprising a polygon having at least one side, said side including at least one optical means;

(b) providing a medium support means having a region;

(c) providing a radiation source for providing at least one radiation beam and directing said one radiation beam onto said optical means of said polygon means;

(d) said optical means being arranged to project said one radiation beam onto said region to form, on said region, a radiation spot which moves on said region at a second angular velocity about said rotational axis of said polygon means, said second angular velocity being linearly proportional to said first angular velocity, said radiation spot projected onto said region being static relative to said medium support means while said medium support means is rotating;

(e) positioning said region to receive said one radiation beam from said optical means of said polygon means, such that said one radiation beam travels along an optical path from said radiation source means to said optical means, and then to said region; and (f) positioning said radiation source means and said region so that they are spaced from said rotational axis and are spaced from each other.

62. The method of claim 61 wherein said medium support means is arranged to maintain the length of said optical path between said radiation source means and said region constant throughout the rotation of said polygon means.

63. The method of claim 61, further including means for adjusting the distance of said region from said rotational axis of said polygon means to compensate for deviations in mechanical dimensions of said scanning system.

64. A system for scanning, tracking, engraving, printing, plotting, writing, or reading, comprising:

(a) a polygon means rotatable throughout a range of rotation with a first angular velocity about a rotational axis, said polygon means comprising a polygon having at least one side, said side including at least one optical means;

(b) a medium support means having a region; and (c) a radiation sink means;

(d) said optical means arranged to form, on said region, a field of view which moves on said region at a second angular velocity about said rotational axis of said polygon means, said second angular velocity being linearly proportional to said first angular velocity throughout said range of rotation of said polygon means;

(e) said field of view on said region on said medium support means being arranged to emit at least one radiation beam and direct said one radiation beam to said optical means;

(f) said optical means arranged to receive said one radiation beam from said field of view on said region and then to project said one radiation beam in a fixed orientation throughout the rotation of said polygon means to said radiation sink means;

(g) said radiation sink means arranged to receive said one radiation beam from said optical means, such that said one radiation beam travels along an optical path from said field of view on said region to said optical means and then from said optical means to said radiation sink means;

(h) said medium support means, and hence said region and said radiation sink means, being positioned so that they are spaced from said rotational axis and are spaced from each other; and (g) means for collecting said one radiation beam from said region and moving said medium support means such that said field of view is static relative to said medium support means.

65. The system of claim 64 wherein said relative movement means is arranged to move said medium support means around an axis in a rotational manner.

66. The system of claim 64 wherein medium support means is arranged to maintain the length of said optical path between said region and said radiation sink means constant throughout the rotation of said polygon means.

67. The system of claim 64 wherein said radiation sink includes at least one camera.

68. The system of claim 64, further including means for adjusting the distance of said region from said rotational axis of said polygon means to compensate for deviations in mechanical dimensions of said scanning system.

69. A method for scanning, tracking, engraving, printing, plotting, writing, or reading, comprising:

(a) providing a polygon means rotatable throughout a range of rotation with a first angular velocity about a rotational axis, said polygon means comprising a polygon having at least one side, said side including at least one optical means;

(b) providing medium support means having a region;

(c) providing a radiation sink means;

(d) said optical means arranged to form, on said region, a field of view which moves on said region at a second angular velocity about said rotational axis of said polygon means, said second angular velocity being linearly proportional to said first angular velocity throughout said range of rotation of said polygon means;

(e) said field of view of said region on said medium support means being arranged to emit at least one radiation beam and direct said one radiation beam to said optical means;

(f) said optical means arranged to receive said one radiation beam from said field of view on said region and then to project said one radiation beam in a fixed orientation throughout the rotation of said polygon means to said radiation sink means;

(g) said radiation sink means arranged to receive said one radiation beam from said optical means, such that said one radiation beam travels along an optical path from said region to said optical means and then from said optical means to said radiation sink means;

(h) positioning said medium support means, and hence said region and said radiation sink means, so they are spaced from said rotational axis and are spaced from each other, and (i) collecting said one radiation beam from said region and moving said medium support means such that said field of view is static relative to said medium support means.

70. The method of claim 69 wherein the length of said optical path between said radiation sink means and said region is maintained constant throughout rotation of said polygon means.

71. The method of claim 69 wherein said radiation sink includes at least one camera.

72. The method of claim 69, further including means for adjusting the distance of said region from said rotational axis of said polygon means to compensate for deviations in mechanical dimensions of said scanning system.

* * * * *

UNITED STATES PATENT AND TRADEMARK OFFICE
CERTIFICATE OF CORRECTION

PATENT NO. : 5,557,438
DATED : Sep. 17, 1996
INVENTOR(S) : N. Schwartz et al.

It is certified that error appears in the above-identified patent and that said Letters Patent is hereby corrected as shown below:

Col. 24, line 45, change "carded" to —carried—.

Signed and Sealed this

Fourteenth Day of April, 1998

*Attest:*

BRUCE LEHMAN

*Attesting Officer*   *Commissioner of Patents and Trademarks*